US008699379B2

(12) United States Patent
Kholaif et al.

(10) Patent No.: US 8,699,379 B2
(45) Date of Patent: Apr. 15, 2014

(54) CONFIGURING MOBILE STATION ACCORDING TO TYPE OF WIRELESS LOCAL AREA NETWORK (WLAN) DEPLOYMENT

(75) Inventors: Ahmad Mohammad Mohammad Kholaif, Waterloo (CA); Nayef Fawaz Mendahawi, Kichener (CA); Ion Barbu, Waterloo (CA); Krishna Kumar Bakthavathsalu, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 349 days.

(21) Appl. No.: 13/082,662

(22) Filed: Apr. 8, 2011

(65) Prior Publication Data

US 2012/0257536 A1 Oct. 11, 2012

(51) Int. Cl.
*H04L 12/28* (2006.01)
(52) U.S. Cl.
USPC ........................................... 370/254; 370/351
(58) Field of Classification Search
None
See application file for complete search history.

(56) References Cited

U.S. PATENT DOCUMENTS

| 7,289,478 | B1 | 10/2007 | Kim et al. |
| 7,907,945 | B2 * | 3/2011 | Deprun ...................... 455/432.1 |
| 2007/0147317 | A1 * | 6/2007 | Smith et al. ................... 370/338 |
| 2009/0022076 | A1 | 1/2009 | Canpolat et al. |
| 2009/0245176 | A1 | 10/2009 | Balasubramanian et al. |
| 2011/0085447 | A1 | 4/2011 | Kholaif et al. |
| 2011/0088078 | A1 | 4/2011 | Kholaif et al. |

FOREIGN PATENT DOCUMENTS

| EP | 1991018 | 11/2008 |
| EP | 2309790 | 4/2011 |
| WO | 0163843 | 8/2001 |
| WO | 2006066181 | 6/2006 |
| WO | 2008061347 | 5/2008 |

OTHER PUBLICATIONS

"Cisco Wireless LAN Controller", 2005, www.awesometechhome.com/How-To/WLAN/4100_Wireless_LAN_controllers_q_and_a.pdf.
"Enterprise WLAN Design Guide vol. 1", Motorola, Nov. 2008, www.scantexas.com/asset/support/Motorola%20Enterprise%20WLAN%20Design%20Guide.pdf.
"Inter Access Point Protocol (IAPP) 802.11f", Computer Network Laboratory, Aug. 10, 2004.
"Location Profiler 1.1 for the BlackBerry®", ToySoft inc., User Documentation, 2009, www.toysoft.ca/downloads/LocationProfiler_Manual.pdf.
"The Benefits of Wireless LAN Controller in Small and Mid-sized Business Networks", Netgear®, 2007, netgear.de/images/Wireless_LAN_White_Paper22-17318.pdf.

(Continued)

*Primary Examiner* — Ayaz Sheikh
*Assistant Examiner* — Blanche Wong
(74) *Attorney, Agent, or Firm* — Integral Intellectual Property Inc.; Miriam Paton

(57) ABSTRACT

A target access point is selected from the results of a discovery scan so that a mobile station can attempt a connection with the target access point. The mobile station determines whether the target access point belongs to a small office/home office (SOHO)-type wireless local area network (WLAN) deployment or to a corporate/enterprise-type WLAN deployment. The mobile station then configures itself according to the determination of the type of WLAN deployment to which the target access point belongs.

22 Claims, 35 Drawing Sheets

(56) References Cited

OTHER PUBLICATIONS

"Voice over WLAN Roaming", Cisco, Chapter 5, Jan. 18, 2010, www.cisco.com/en/US/docs/solutions/Enterprise/Mobility/vowlan/41dg/vowlandg.pdf.
Acker, Steve, "Enterprise WLAN Architecture", Cisco, 2008, www.netcraftsmen.net.
O'Hara, Bob, "802.11F Inter-AP Protocol", www.ieee802.org/21/archived_docs/Documents/OtherDocuments/Handoff_O%27Hara.pdf.
Matt, Stefan, Extended European Search Report for EP 11161792.4, Nov. 3, 2011.
Devicescape: "The Benefits of CCX for Mobile Devices" devicescape whitepaper, Feb. 1, 2009, pp. 1-7, XP002648202, retrieved from the Internet: URL:http://devicescape.com/assets/docs/CCX_whitepaper_09.pdf.
Matt, Stefan, Partial Search Report for EP 11161792.4, Jul. 20, 2011.
Tam, Allan, First Office Action for CA 2,736,346, Mar. 20, 2013.
Second Office Action for CA 2,736,346, Oct. 7, 2013.

* cited by examiner

CONFIGURING MOBILE STATION ACCORDING TO TYPE OF WIRELESS LOCAL AREA NETWORK (WLAN) DEPLOYMENT

TECHNICAL FIELD

The technology described in this document generally relates to wireless local area networks.

BACKGROUND

For ease of illustration, the various techniques disclosed in this document are discussed below in the context of IEEE 802.11-based wireless networking. This context is described in the IEEE 802.11 specifications for wireless local area network (WLAN) media access control (MAC) and Physical Layer (PHY). However, those of ordinary skill in the art, using the teachings provided in this document, may implement the disclosed techniques in other wireless networks. Accordingly, references to techniques and components specific to IEEE 802.11 apply also to the equivalent techniques or components in other wireless network standards unless otherwise noted.

A WLAN is identified by its network name, which in IEEE 802.11 is known as a service-set identifier (SSID). An infrastructure basic service set (BSS) is defined in IEEE 802.11 as a single access point (AP) together with all its associated mobile stations, and is uniquely identified by its basic service-set identifier (BSSID). Since an AP is uniquely identified by its MAC address, the MAC address of the AP is typically used as the BSSID. BSSs may be connected to one another via networks denoted distribution systems (DS). Multiple DSs may be interconnected by routing devices. A subnetwork is a portion of a network that shares a common address component and operates at Layers 1 and 2 (physical and data link) of the OSI (Open System Interconnection) reference model. On TCP/IP (Transmission Control Protocol/Internet Protocol) networks, subnetworks are all devices whose Internet Protocol (IP) addresses have the same prefix. Routers, and the process of routing, operate at Layer 3 (network) of the OSI reference model. In IEEE 802.11 an Extended Service Set (ESS) includes two or more BSSs that use the same SSID, and is uniquely identified by an extended service set identifier (ESSID).

In order to enable a mobile station to be truly mobile, the mobile station is typically powered by a battery. Power consumption and battery drain are issues of concern.

BRIEF DESCRIPTION OF THE DRAWINGS

The technology described in this document is illustrated by way of example and not limitation in the figures of the accompanying drawings, in which like reference numerals indicate corresponding, analogous or similar elements, and in which:

FIG. 1-2 is an illustration of an example multiple-AP WLAN deployment, where each access point (AP) is configured separately from the other access points in the WLAN deployment, and where each AP comprises its own dynamic host configuration protocol (DHCP) server;

FIG. 1-3 is an illustration of another example multiple-AP WLAN deployment, where each AP is configured by a central controller, and where one or more centralized or distributed DHCP servers are coupled to the multiple APs in the WLAN deployment;

FIG. 2 is a flowchart illustrating an example method to be performed by a mobile station for joining a BSS;

FIG. 3 is a flowchart illustrating an example method to be performed by a mobile station for determining a type of WLAN deployment and configuring the mobile station according to the type of WLAN deployment;

FIGS. 4-1, 4-2, 4-3, 4-4, 4-5, 4-6, 4-7, 4-8 and 4-9 are flowcharts illustrating different example methods to be performed by a mobile station for determining a type of WLAN deployment;

FIG. 5 is a flowchart illustrating an example method to be performed by a mobile station for configuring the mobile station according to the type of WLAN deployment;

FIG. 6 is a flowchart illustrating another example method to be performed by a mobile station for configuring the mobile station according to the type of WLAN deployment;

FIG. 7 is a flowchart illustrating another example method to be performed by a mobile station for configuring the mobile station according to the type of WLAN deployment;

FIG. 8 is a flowchart illustrating another example method to be performed by a mobile station for configuring the mobile station according to the type of WLAN deployment;

FIG. 9 is a flowchart illustrating an example method to be performed by a mobile station for banning a connection profile;

FIGS. 11-1, 11-2, 11-3 and 11-4 are flowcharts illustrating specific example methods to be performed by a mobile station for un-banning one or more connection profiles;

FIGS. 16-1, 16-2 and 16-3 are illustrations of example screenshots displayed at a mobile station;

FIGS. 17-1 and 17-2 are flowcharts illustrating example methods to be performed by a mobile station for un-banning one or more access points;

FIGS. 21-1, 21-2 and 21-3 are flowcharts illustrating specific example methods to be performed by a mobile station for un-suppressing one or more access points;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

For ease of illustration, the various techniques disclosed in this document are discussed below in the context of IEEE 802.11-based wireless networking. However, those of ordinary skill in the art, using the teachings provided in this document, may implement the disclosed techniques in other wireless networks. Accordingly, references to techniques and components specific to IEEE 802.11 apply also to the equivalent techniques or components in other wireless network standards unless otherwise noted.

Seamless roaming is a solution for a mobile device to move between different access points with smooth transitions so there is no disturbance in applications running over the wireless connection. Throughout this document, the phrase "small office/home office (SOHO)-type WLAN deployment" is used to refer to a WLAN deployment that is not expected to support seamless roaming, because the WLAN deployment involves either a single access point or multiple access points that are not served by a common dynamic host configuration protocol (DHCP) server. A SOHO-type WLAN deployment is not necessarily found in a small office or home office. For example, a hotspot WLAN deployment in a coffee shop may be a SOHO-type WLAN deployment, even though the coffee shop is neither a small office nor a home office.

Throughout this document, the phrase "corporate/enterprise-type WLAN deployment" is used to refer to a WLAN deployment supported by multiple access points that is expected to support seamless roaming among the multiple access points, because the multiple access points are served by a common DHCP server. A corporate/enterprise-type WLAN deployment is not necessarily found in a corporate environment or in a large enterprise. For example, a sophisticated home user may set up a corporate/enterprise-type WLAN deployment. In another example, a corporate/enterprise-type WLAN deployment may be found in a hotel.

Description of Environment

Figure 1:
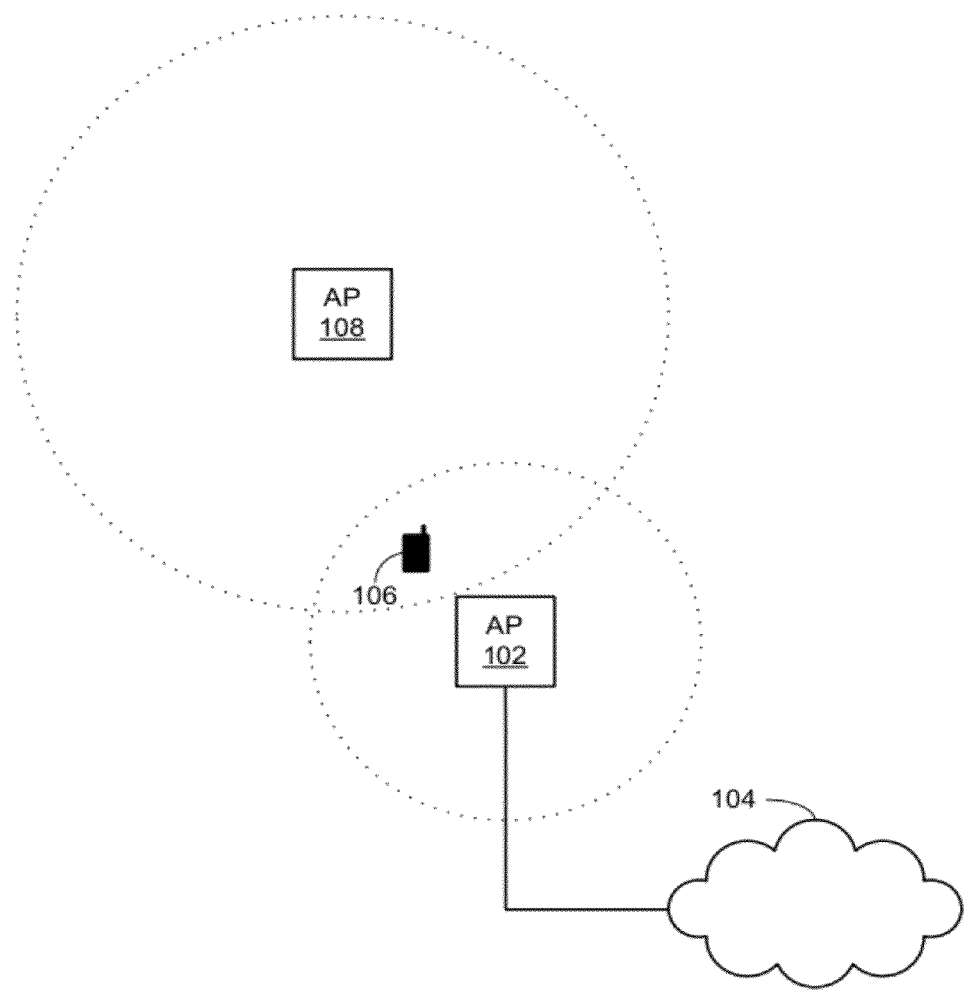
FIG. 1-1 is an illustration of an example single-access point (AP) wireless local area network (WLAN) deployment.
Figures 1, 2:
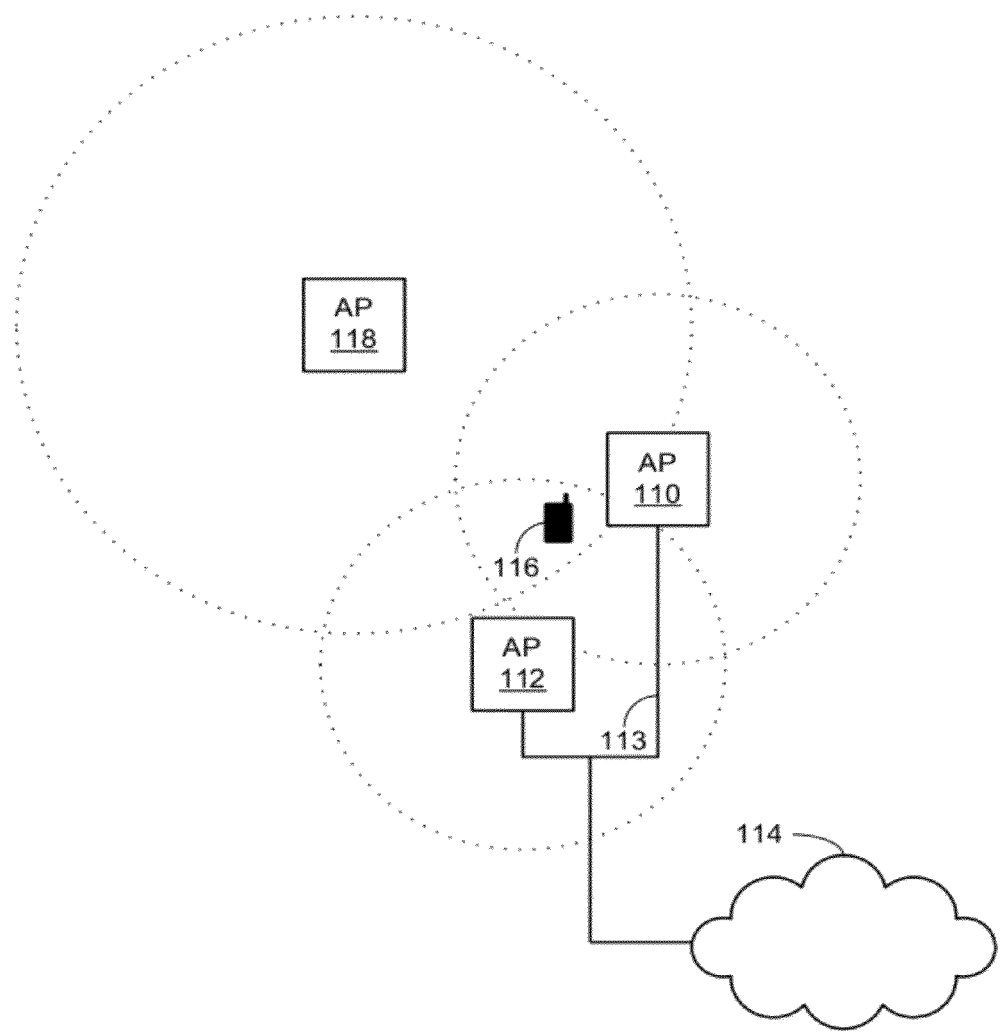
Figures 1, 2, 3:
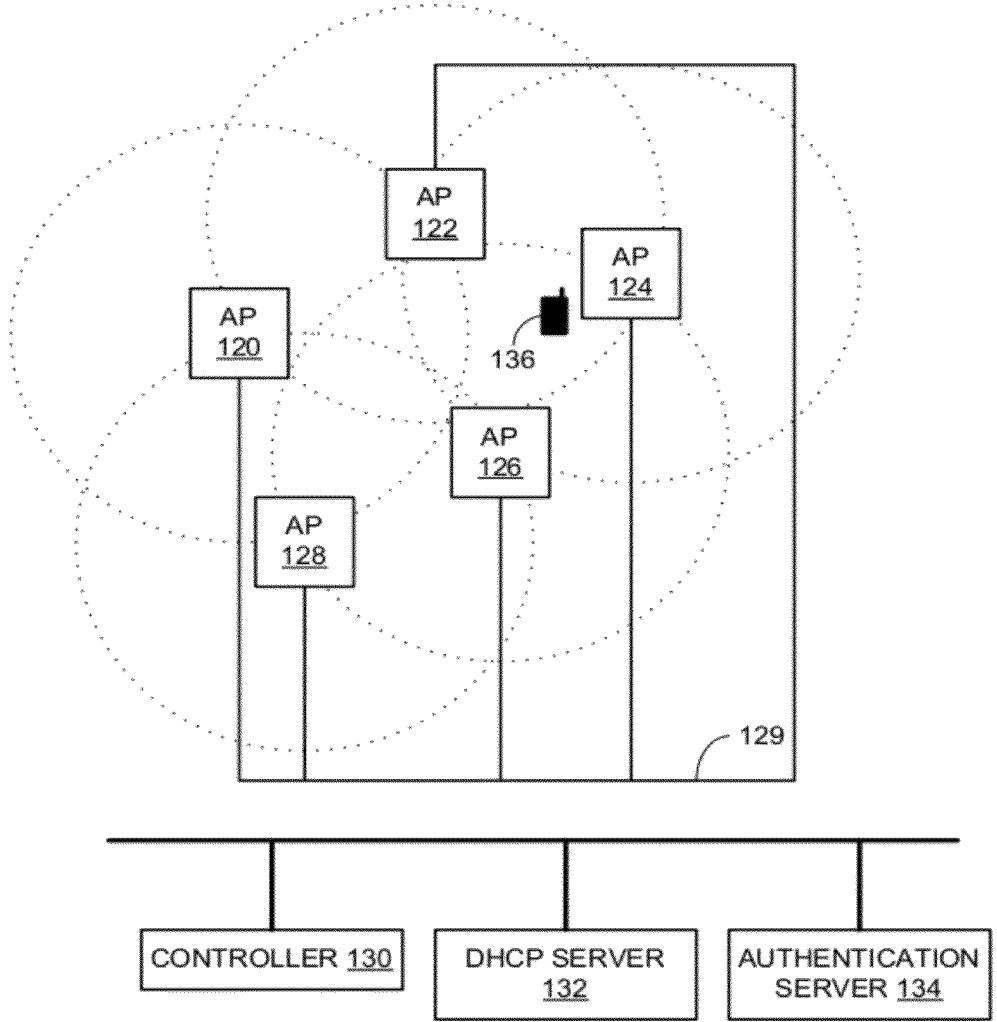
Figure 2:
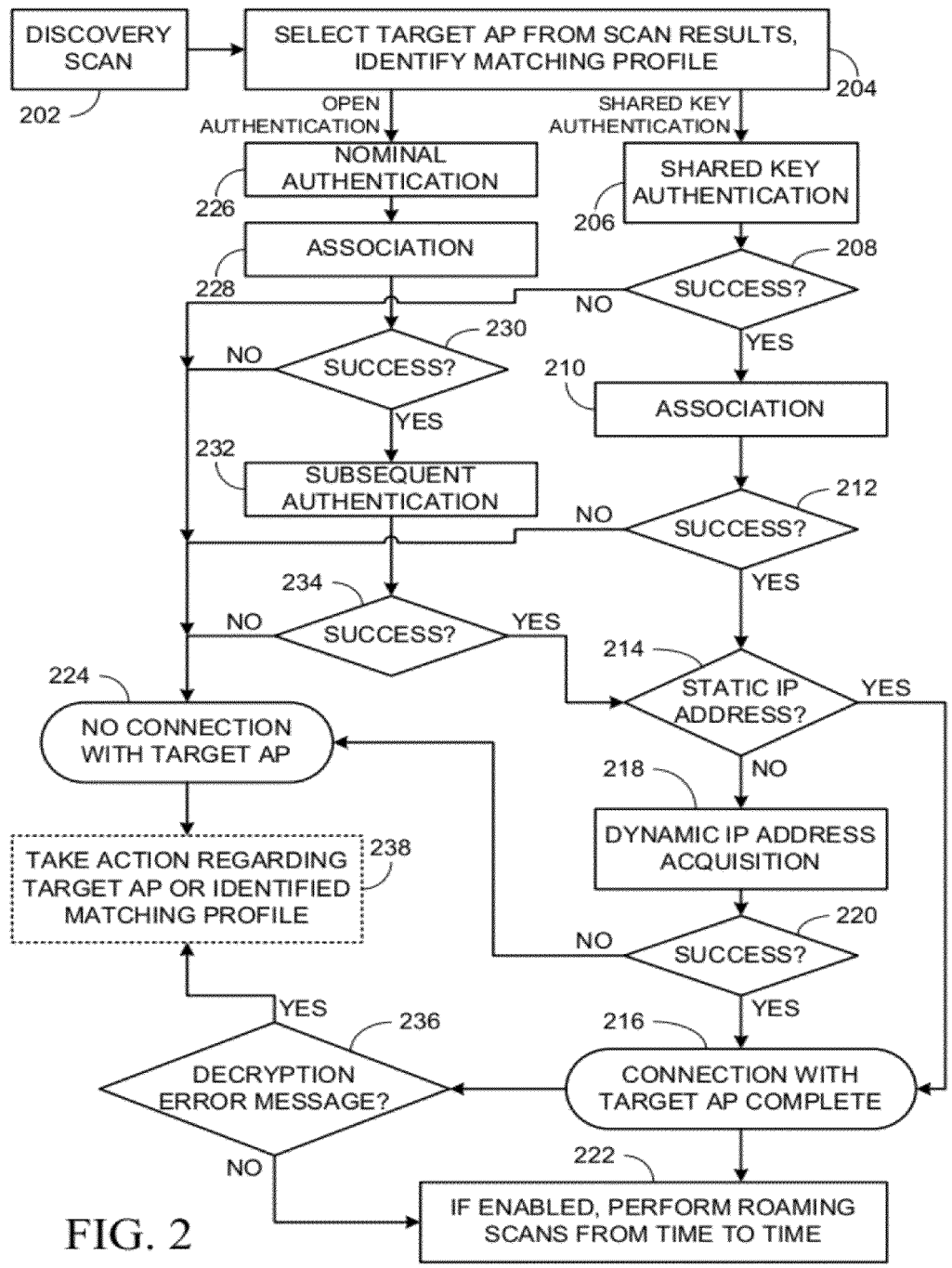
Figure 3:
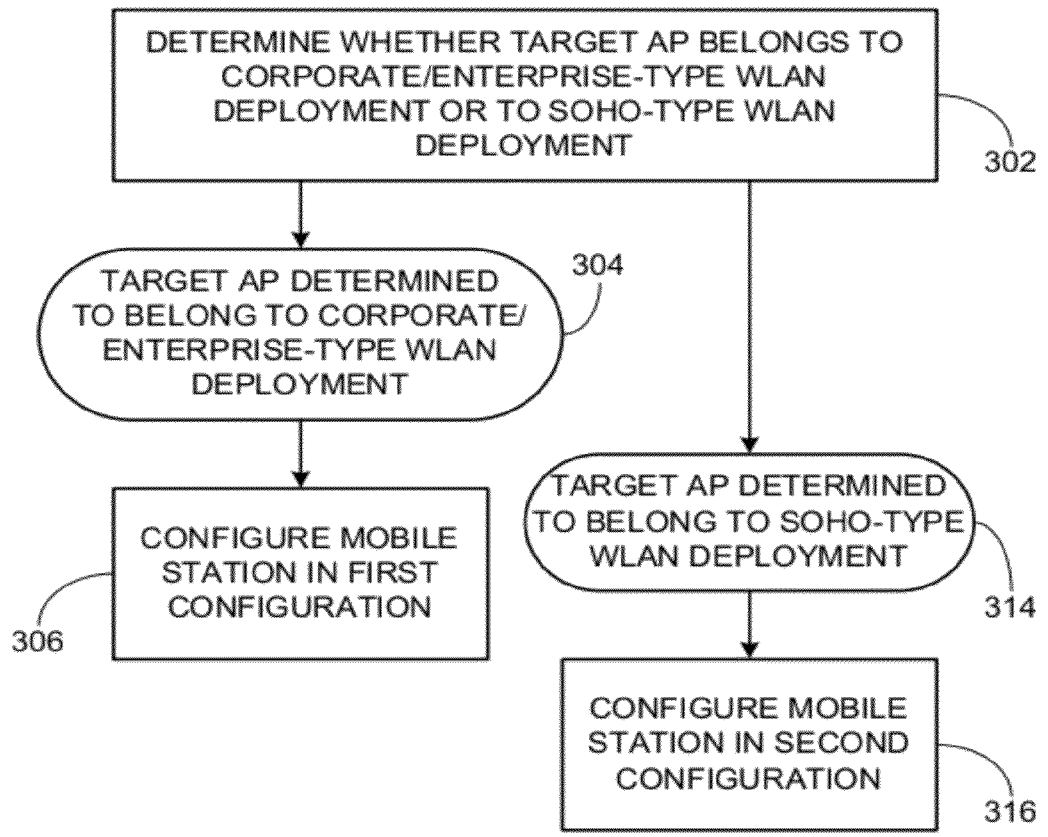

FIGS. 1-1, 1-2 and 1-3 are illustrations of different WLAN deployments. An example single-AP SOHO-type WLAN deployment is illustrated in FIG. 1-1. An example multiple-AP SOHO-type WLAN deployment is illustrated in FIG. 1-2. An example corporate/enterprise-type WLAN deployment is illustrated in FIG. 1-3.

FIG. 1-1 is an illustration of an example single-AP WLAN deployment. Coverage areas of APs are illustrated in FIG. 1-1 by dashed circles. A single AP 102 supports a WLAN and is connected, directly or indirectly, to an external network 104 (for example, the Internet). A mobile station 106 within communication range of AP 102 may identify AP 102 during a discovery scan for available WLANs. Optionally, mobile station 106 is within communication range of another AP 108, and AP 108 is also identified in the results of the discovery scan. Because AP 102 provides a single-AP WLAN deployment, the WLAN supported by AP 108 is different from the WLAN supported by AP 102. AP 102 and AP 108 may differ in one or more of the following respects: a vendor identifiable from a MAC address of the access point, a network name also known as an SSID, a security type, credentials for the security type. AP 102 may optionally comprise a DHCP server to provide associated mobile stations with a dynamic IP address. The example single-AP WLAN deployment illustrated in FIG. 1-1 is not able to support seamless roaming, and is therefore an example of a SOHO-type WLAN deployment.

For example, AP 102 may provide a single-AP WLAN deployment in a home with the SSID "@Home" and the security type "PSK", whereas AP 108 may provide a single-AP WLAN deployment in a neighboring home with the SSID "D-Link" and the security type "Open System". In another example, AP 102 may provide a single-AP WLAN deployment in a home with the SSID "D-Link" and the security type "WEP" and the password "123456", and AP 108 may provide a single-AP WLAN deployment in a neighboring home with the SSID "D-Link" and the security type "WEP" and the password "homeoffice". In a further example, AP 102 may provide a single-AP WLAN hotspot deployment in a coffee shop with the SSID "CoffeeShop" and the security type "WEP" and the password "guest".

FIG. 1-2 is an illustration of an example multiple-AP WLAN deployment, where each AP is configured separately from the other access points in the WLAN deployment, and where each AP comprises its own DHCP server. Coverage areas of APs are illustrated in FIG. 1-2 by dashed circles. AP 110 and AP 112 jointly support a WLAN and may be connected via a distribution system 113. AP 110 and AP 112 are connected, directly or indirectly, to an external network 114 (for example, the Internet). A mobile station 116 within communication range of AP 110 or AP 112 or both may identify AP 110 or AP 112 or both during a discovery scan for available WLANs. Optionally, mobile station 116 is within communication range of another AP 118, and AP 118 is also identified in the results of the discovery scan. The WLAN supported by AP 110 and AP 112 is different from the WLAN supported by AP 118. AP 110 and AP 112 are alike in at least the following respects and may differ from AP 118 in one or more of the following respects: a vendor identifiable from a MAC address of the access point, a network name also known as an SSID, a security type, credentials for the security type. AP 110 may optionally comprise a DHCP server to provide associated mobile stations with a dynamic IP address. AP 112 may optionally comprise a DHCP server to provide associated mobile stations with a dynamic IP address. The example multiple-AP WLAN deployment illustrated in FIG. 1-2 is not able to support seamless roaming, and is therefore an example of a SOHO-type WLAN deployment.

For example, AP 110 and AP 112 may provide a multiple-AP WLAN deployment in a small office with the SSID "@Work" and the security type "PSK", whereas AP 118 may provide a single-AP WLAN deployment in a neighboring office with the SSID "D-Link" and the security type "Open System". In another example, AP 110 and AP 112 may provide a multiple-AP WLAN deployment in a small office with the SSID "D-Link" and the security type "WEP" and the password "123456", and AP 118 may provide a single-AP deployment in a neighboring office with the SSID "D-Link" and the security type "WEP" and the password "office".

FIG. 1-3 is an illustration of another example multiple-AP WLAN deployment. Coverage areas of APs are illustrated in FIG. 1-3 by dashed circles. AP 120, AP 122, AP 124, AP 126, and AP 128 jointly support a WLAN and have at least the following parameters in common: a network name also known as an SSID, a security type, credentials for the security type. APs 120, 122, 124, 126 and 128 may be connected via a distribution system 129. A central controller 130 coupled to APs 120, 122, 124, 126 and 128 enables configuration of the access points with the common parameters. One or more centralized or distributed DHCP servers 132 are coupled to APs 120, 122, 124, 126 and 128. An authentication server 134 is coupled to APs 120, 122, 124, 126 and 128. A mobile station 136 within communication range of one or more of APs 120, 122, 124, 126 and 128 may identify one or more of APs 120, 122, 124, 126 and 128 during a discovery scan for available WLANs. During the connectivity process, if a mobile station does not have a static IP address, then once the mobile station is associated with the target AP, the mobile station performs a dynamic IP address acquisition process with the target AP, which passes the request on to one of the DHCP servers 132. If encryption is implemented in the WLAN, the dynamic IP address acquisition process may involve encrypted data packets. APs 120, 122, 124, 126 and 128 may be connected, directly or indirectly, to another internal network or to an external network (for example, the Internet). The example single-AP WLAN deployment illustrated in FIG. 1-1 is able to support seamless roaming, and is therefore an example of a corporate/enterprise-type WLAN deployment.

Joining a BSS

FIG. 2 is a flowchart illustrating an example method to be performed by a mobile station, for example, any one of mobile stations 106, 116 and 136, for joining a BSS. Having a mobile station join an existing BSS is a multi-stage process, involving scanning, selection of a target AP, authentication, association, and IP address acquisition.

At 202, the mobile station performs a discovery scan, using passive scanning or active scanning or any combination thereof, to identify APs within communication range of the mobile station. A discovery scan may be a user-requested scan. Additionally, a discovery scan may be triggered automatically, for example, if the mobile station is displaying a list of available wireless local area networks.

In active scanning, the mobile station transmits at least one probe request specifying a particular network name and may receive a probe response from an AP configured with the particular network name. The mobile station extracts details about the AP and the WLAN from the received probe response(s) and adds the details for each received probe response as a record to the scan results of active scanning. In passive scanning, the mobile station receives management frames from APs, which may include any or any combination of beacon frames, probe responses destined for other mobile stations, and association responses or reassociation responses destined for other mobile stations. The mobile station extracts details about the AP and the WLAN from the received management frame(s) and adds the details for each received management frame as a record to the scan results of passive scanning.

A record in the results of the discovery scan, referred to as "scan results", may include at least the following extracted details about the AP and the WLAN: a unique identifier of the AP, for example, its MAC address; the network name of the WLAN; an identification of the frequency band on channels of which communication in the WLAN is conducted; an identification of the channel on which the beacon frame or probe response was received; an indication of the security type implemented in the WLAN; and if applicable to the security type, an indication of the encryption type implemented in the WLAN. The record may also include an indication of the strength of the received signal.

Security Types fall into one of two categories: 1) Shared Key Authentication, which uses a shared Wired Equivalent Privacy (WEP) key to authenticate a mobile station to an AP, and 2) Open Authentication. Open Authentication security types include, for example, "Open System", Wi-Fi Protected Access (WPA)/WPA2-Personal, which involves Temporal Key Integrity Protocol (TKIP) or Advanced Encryption Standard (AES) encryption, WPA-Enterprise, which involves Counter-Mode/CBC-Mac Protocol (CCMP) encryption, and all flavors of the Extensible Authentication Protocol (EAP) security type. An "Open System" security type means no encryption and no authentication. The EAP security type has several flavors, for example, Lightweight EAP (LEAP), Protected EAP (PEAP), EAP Transport Layer Security (EAP-TLS), EAP Tunneled Transport Layer Security (EAP-TTLS), EAP-Flexible Authentication via Secured Tunneling (EAP-FAST), EAP for GSM Subscriber Identity Modules (EAP-SIM), and EAP-Authentication and Key Agreement (EAP-AKA).

At 204, the mobile station selects from the scan results a target AP with which to attempt a connection. The target AP may be automatically selected by the mobile station without user intervention. Alternatively, selection of the target AP may be indicated to the mobile station through activation by the user of the mobile station of a user input component of the mobile station. For example, a list of available WLANs may be presented via a user output component of the mobile station and the target AP may be selected from that list.

A mobile station may store in its memory one or more connection profiles, which are editable via a user interface component of the mobile station. Each connection profile includes a network name of the WLAN. The network name uniquely identifies the connection profile in the mobile station, so that no two connection profiles stored in the same mobile station include the same network name. A connection profile is optionally labeled with a profile label. A connection profile may include indications of other network details, for example, one or more of the following: a security type, a security subtype, an authentication method, and an encryption type. A connection profile may also include credentials for use with the implemented security type or with the authentication method or with both. A non-exhaustive list of examples of credentials includes a passphrase, a username, a password, an IMSI (International Mobile Subscriber Identity), a certificate, and a certificate having an expiry date. A connection profile may also include other information, for example, Internet Protocol (IP) network parameters. Connection profiles are ordered in the mobile station by their priority relative to one another. The priority of a connection profile may affect the order in which it is compared to scan results.

Selecting a target AP may involve comparing the scan results to one or more of the connection profiles stored in the mobile station. A target AP whose management frame is in the scan results is considered a match to a particular connection profile if the following network details of the particular connection profile and the network details of the management frame are identical: network name, security type, and encryption type.

Where selection of the target AP is indicated to the mobile station through activation by the user of the mobile station of a user input component of the mobile station, there may not be a matching connection profile stored in the mobile station. Where there is no matching connection profile stored in the mobile station, parameters that would otherwise be taken from the matching connection profile may be provided to the mobile station through activation by the user of the mobile station of a user input component of the mobile station. Even where there is a matching connection profile stored in the mobile station, some parameters used in the authentication process may be missing from the matching connection profile and may instead be provided to the mobile station through activation by the user of the mobile station of a user input component of the mobile station.

What happens after selection of a target AP depends on the security type employed by the target AP. If the security type employed by the target AP involves Shared Key Authentication, the mobile station proceeds to initiate at 206 a Shared Key Authentication process with the target AP. In the Shared Key Authentication Process, the mobile station sends an authentication request to the target AP. The target AP responds to the authentication request by sending a challenge to the mobile station. The mobile station then encrypts the challenge with its copy of a Wired Equivalent Privacy (WEP) key and sends the encrypted challenge to the target AP. The target AP decrypts the encrypted challenge with its copy of the WEP key. If the mobile station and the target AP share the same WEP key, then the decrypted challenge will match the challenge originally sent from the target AP to the mobile station, and the target AP sends an authentication response indicative of successful authentication to the mobile station. The mobile station's copy of the WEP key may be stored in a connection profile that matches the target AP, or may have been provided to the mobile station through activation by the user of the mobile station of a user input component of the mobile station.

If the Shared Key Authentication process is successful, as checked at 208, the mobile station proceeds to initiate at 210 an association process with the target AP. The association process typically involves the mobile station sending an association request that is addressed to a unique identifier of the target AP, and the target AP replying with an association response. If the association process is successful, as checked at 212, the association response includes an association identifier (AID) granted to the mobile station by the target AP.

Following successful completion of the association process, if the mobile station has a static IP address, as checked at 214, then the connection of the mobile station and the target AP is complete, as indicated at 216. If the mobile station does not have a static IP address, as checked at 214, then the mobile station initiates at 218 with the target AP a process of dynamic IP address acquisition. Data packets exchanged during the dynamic IP address acquisition process may be encrypted using the shared WEP key. The target AP may comprise a DHCP server or may be coupled to one or more centralized or distributed DHCP servers. If the dynamic IP address acquisition process is successful, as checked at 220, then the connection of the mobile station and the target AP is complete, as indicated at 216.

Completion of the connection means that the mobile station is considered to have joined the BSS. While the mobile station is a member of the BSS, data packets exchanged between the mobile station and the target AP will be encrypted using the shared WEP key. While the mobile station is connected to the target AP, the mobile station may at 222 perform roaming scans from time to time, if the mobile station is configured to enable roaming scans. Roaming scans are described in further detail with respect to FIGS. 5-1 and 5-2.

If any of the Shared Key Authentication process, the association process, and the dynamic IP address acquisition process is unsuccessful, as checked at 208, 212 and 220, respectively, then the mobile station and the target AP have failed to establish a connection, as indicated at 224, and the mobile station has failed to join the BSS.

As mentioned above, what happens after selection of a target AP depends on the security type employed by the target AP. If the security type employed by the target AP involves Open Authentication, the mobile station proceeds to initiate at 226 a nominal authentication process with the target AP. In the nominal authentication process, the mobile station sends an authentication request to the target AP, and the target AP responds to the authentication request by sending to the mobile station an authentication response indicative of success.

Following the nominal authentication process, the mobile station proceeds to initiate at 228 an association process with the target AP. The association process typically involves the mobile station sending an association request that is addressed to a unique identifier of the target AP, and the target AP replying with an association response. If the association process is successful, as checked at 230, the association response includes an AID granted to the mobile station by the target AP.

Following successful completion of the association process, the mobile station proceeds to initiate at 232 a subsequent authentication process. If the security type is Open System, then the subsequent authentication process is merely the mobile station sending an authentication request to the target AP and the target AP responding to the authentication request by sending to the mobile station an authentication response indicative of success. If the security type is WPA/WPA2-Personal, then the subsequent authentication process involves an authenticator, for example, an AAA server, and uses a four-way handshake between the mobile station and the authenticator. If the security type is WPA/WPA2-Enterprise, then the subsequent authentication process involves an EAP authentication process with an EAP authentication server to secure the association between the mobile station and the target AP, followed by a four-way handshake. If the security type is any flavor of EAP, then the subsequent authentication process involves an EAP authentication process with an EAP authentication server to secure the association between the mobile station and the target AP. A AAA server and a Remote Dial In User Service (RADIUS) server are both examples of an EAP authentication server.

Parameters used in the subsequent authentication process may have been retrieved by the mobile station from a connection profile stored in the mobile station that matches the target AP, or may have been provided or indicated to the mobile station through activation by the user of the mobile station of a user input component of the mobile station.

Following successful completion of the subsequent authentication process, as checked at 234, if the mobile station has a static IP address, as checked at 214, then the connection of the mobile station and the target AP is complete, as indicated at 216. If the mobile station does not have a static IP address, as checked at 214, then the mobile station initiates at 218 with the target AP a process of dynamic IP address acquisition. If the security type involves encryption, data packets exchanged during the dynamic IP address acquisition process may be encrypted. The target AP may comprise a DHCP server or may be coupled to one or more centralized or distributed DHCP servers. If the dynamic IP address acquisition process is successful, as checked at 220, then the connection of the mobile station and the target AP is complete, as indicated at 216.

Completion of the connection means that the mobile station is considered to have joined the BSS. While the mobile station is a member of the BSS, data packets exchanged between the mobile station and the target AP will be encrypted if the security type involves encryption. While the mobile station is connected to the target AP, the mobile station may at 222 perform roaming scans from time to time, if the mobile station is configured to enable roaming scans. Roaming scans are described in further detail with respect to FIGS. 5-1 and 5-2.

If any of the association process, the subsequent authentication process, and the dynamic IP address acquisition process is unsuccessful, as checked at 230, 234 and 220, respectively, then the mobile station and the target AP have failed to establish a connection, as indicated at 224, and the mobile station has failed to join the BSS.

As is evident from the foregoing description, there can be many different reasons for the mobile station and the target AP to fail to establish a connection, including, for example, authentication failure due to a mismatch in credentials, authentication failure due to an authentication timeout (failure of an authentication process to successfully complete before expiry of an authentication timer started by the mobile station when initiating the authentication process), failures due to the target AP being unresponsive, failure to acquire a dynamic IP address, and the target AP having refused to authenticate or associate with the specific mobile station (identified by its MAC address in an authentication request or in an association request).

Even where there mobile station has successfully joined the target AP's BSS, if encryption is employed in the BSS, then a mismatch in the encryption key(s) used by the mobile station and the target AP may result in the target AP sending the mobile station a decryption error message, as checked at 236.

The mobile station may optionally take some action at 238 if the mobile station and the target AP have failed to establish a connection, or if the mobile station has received a decryption error message from the target AP. The action to be taken may depend upon the type of WLAN deployment to which the target AP belongs, and may further depend upon the reason that the mobile station and the target AP have failed to establish a connection or whether a decryption error message was received.

Authentication is a power-intensive process. Failure of a mobile station to successfully conclude an authentication process with a target AP or authentication server can significantly drain the battery that powers the mobile station, especially if the same AP or another AP matching the same connection profile as the target AP is repeatedly selected as a target for connection.

Various techniques to be implemented by a mobile station are described in this document. In some of the techniques described in this document, a connection profile that stores parameters used by the mobile station in a failed authentication process or a failed dynamic IP address acquisition process is banned. As explained in more detail below, the banning of a connection profile affects how subsequent scans—other than discovery scans—and connection attempts are handled. Alternatively, the connection profile could have its priority reduced, relative to other connection profiles stored in the mobile station. In other techniques described in this document, a unique identifier of the target AP with which the mobile station has failed to connect or from which the mobile station has received a decryption error message is banned or suppressed. As explained in more detail below, the banning or suppression of a target AP affects how subsequent scans and connection attempts are handled.

WLAN Deployment Type and Configuration of Mobile Station

FIG. 3 is a flowchart illustrating an example method to be performed by a mobile station, for example, any one of mobile stations 106, 116 and 136, for determining a type of WLAN deployment and configuring the mobile station according to the type of WLAN deployment.

At 302, the mobile station determines whether the target AP belongs to a corporate/enterprise-type WLAN deployment or to a SOHO-type WLAN deployment. Various techniques may be employed, alone or in any combination, during the discovery and connectivity process, in order to determine the type of WLAN deployment. Examples of such techniques are described in more detail with respect to FIGS. 4-1 through 4-9. Some techniques may provide a determination of type of WLAN deployment with more confidence than other techniques. The mobile station may assign different confidence levels to the results of the determinations in order to make an ultimate determination as to the type of WLAN deployment.

In the event that the mobile station has determined that the target AP belongs to a corporate/enterprise-type WLAN deployment, as indicated at 304, the mobile station configures itself at 306 in a first configuration.

In the event that the mobile station has determined that the target AP belongs to a SOHO-type WLAN deployment, as indicated at 314, the mobile station configures itself at 316 in a second configuration that is different from the first configuration in at least one respect.

Figures 1, 4:
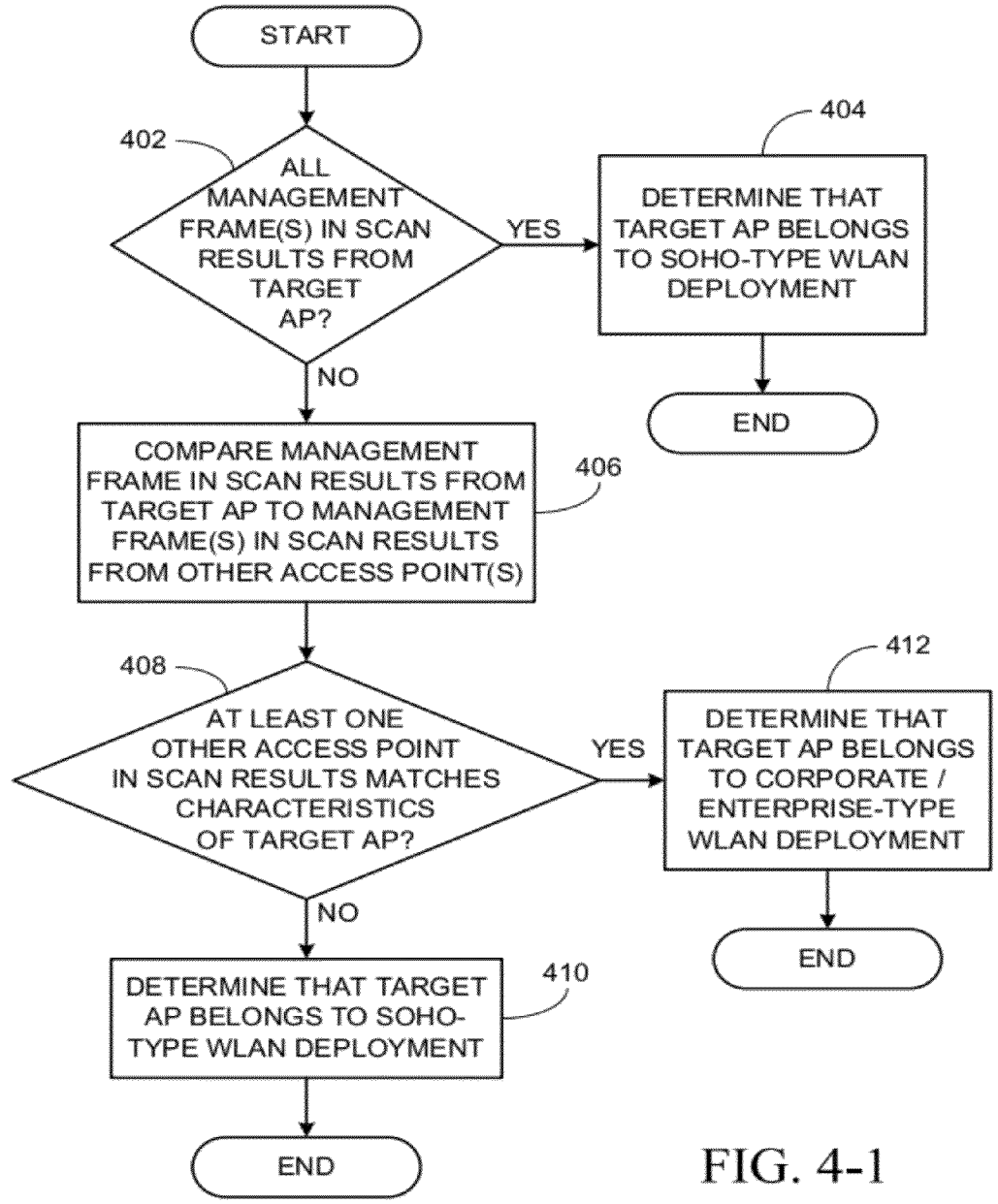
Figures 2, 4:
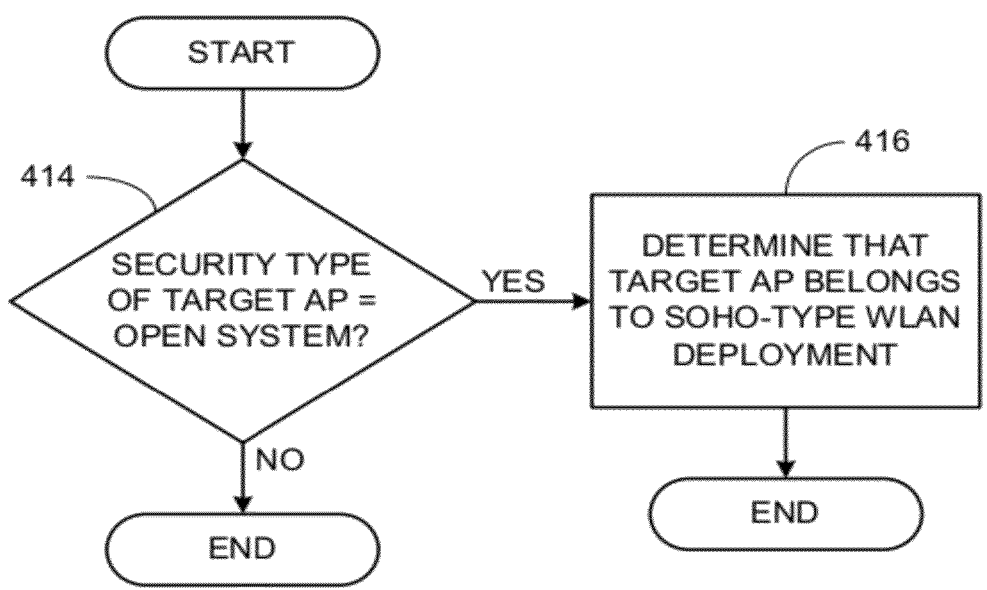
Figures 3, 4:
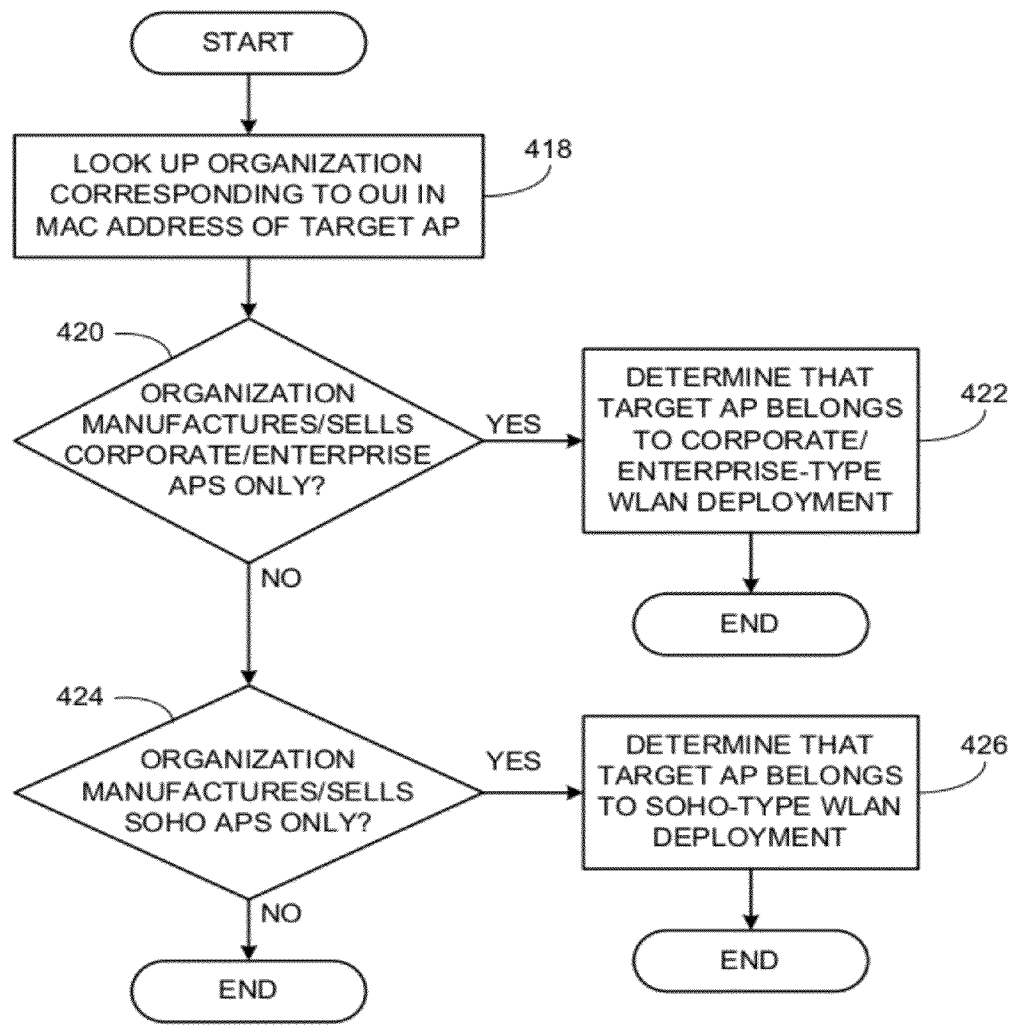
Figure 4:
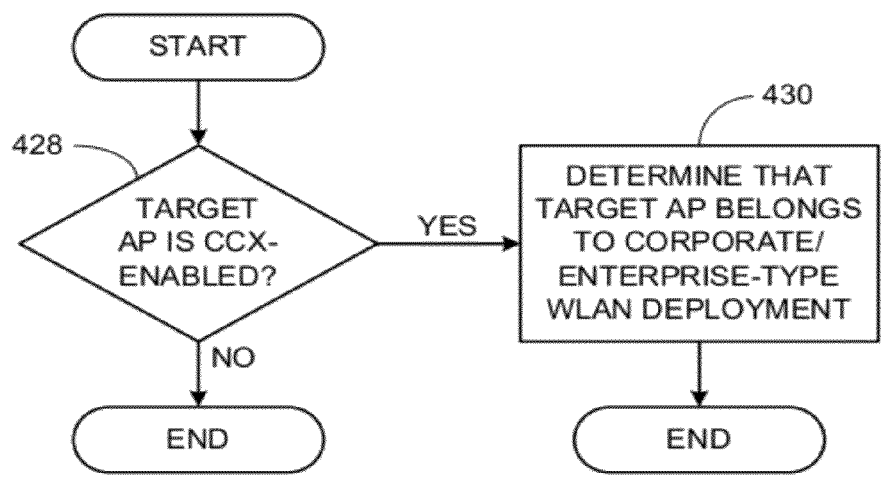
Figures 4, 5:
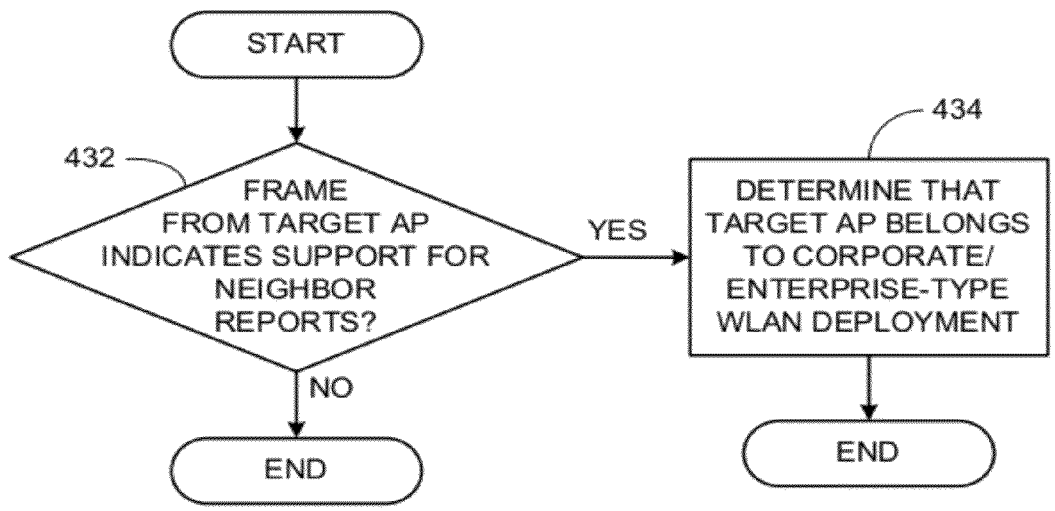

For example, as described in more detail with respect to FIG. 5, where the mobile station determines that the target AP belongs to a corporate/enterprise-type WLAN deployment, the mobile station may configure itself to enable roaming scans, and where the mobile station determines that the target AP belongs to a SOHO-type WLAN deployment, the mobile station may configure itself to disable roaming scans.

Figures 4, 5, 6:
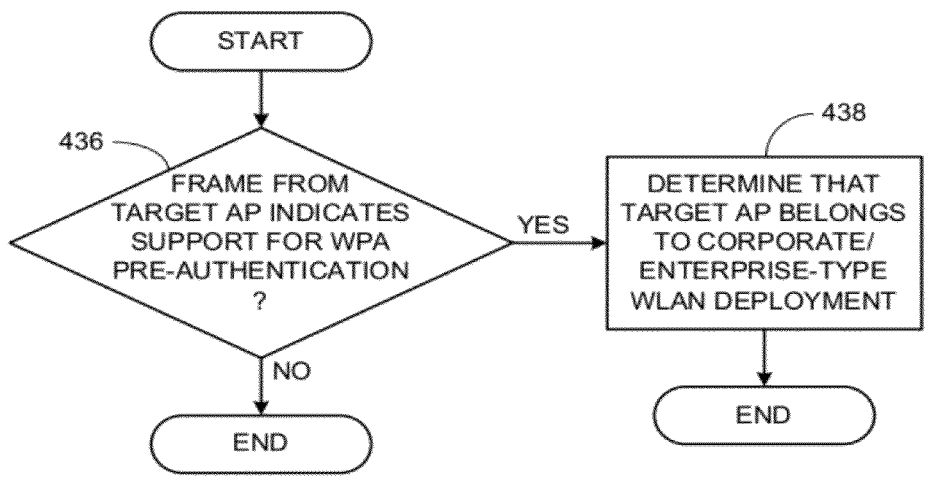

In another example, as described in more detail with respect to FIG. 6, where the mobile station determines that the target AP belongs to a corporate/enterprise-type WLAN deployment, the mobile station may configure itself to react to failure to establish a connection with the target AP by banning a connection profile identified as matching the target AP, and where the mobile station determines that the target AP belongs to a SOHO-type WLAN deployment, the mobile station may configure itself to react to failure to establish a connection with the target AP by banning the target AP. As an alternative to banning the connection profile, the mobile station may reduce the priority of the connection profile.

Figures 4, 5, 6, 7:
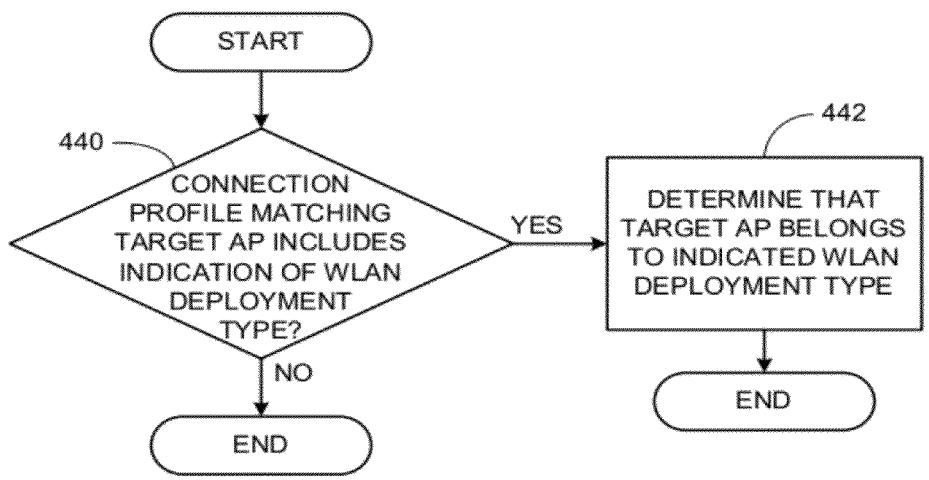

In yet another example, as described in more detail with respect to FIG. 7, where the mobile station determines that the target AP belongs to a corporate/enterprise-type WLAN deployment, the mobile station may configure itself to react to failure to establish a connection with the target AP by banning a connection profile identified as matching the target AP, and where the mobile station determines that the target AP belongs to a SOHO-type WLAN deployment, the mobile station may configure itself to react to failure to establish a connection with the target AP by suppressing the target AP. As an alternative to banning the connection profile, the mobile station may reduce the priority of the connection profile.

Figures 4, 5, 6, 7, 8:
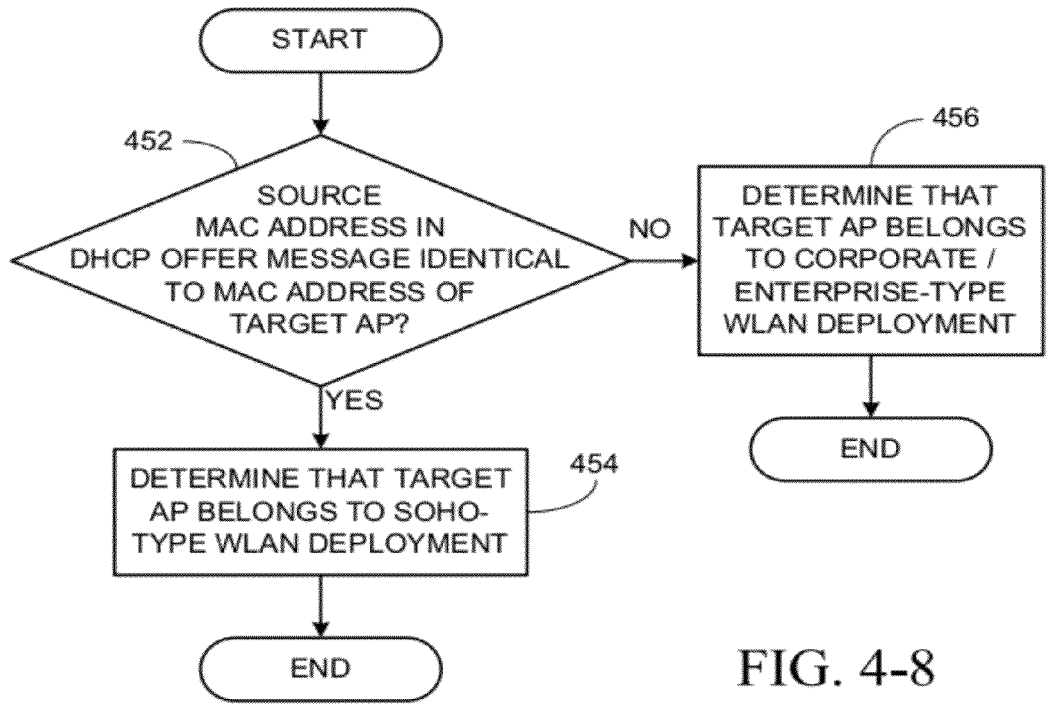

In another example, as described in more detail with respect to FIG. 8, where the mobile station determines that the target AP belongs to a corporate/enterprise-type WLAN deployment, the mobile station may configure itself to react to failure to establish a connection with the target AP by banning a connection profile identified as matching the target AP, and where the mobile station determines that the target AP belongs to a SOHO-type WLAN deployment, the mobile station may configure itself to react to failure to establish a connection with the target AP due to invalid credentials by suppressing the target AP and due to any other cause by banning the target AP. As an alternative to banning the connection profile, the mobile station may reduce the priority of the connection profile.

Determination of WLAN Deployment Type

FIG. 4-1 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan.

Each management frame in the scan results includes a unique identifier of the access point that sent the management frame. For example, the MAC address of the access point that sent the management frame may be included in a field of the management frame and may uniquely identify the access point that sent the management frame.

At 402, the mobile station may check whether all of the one or more management frames in the scan results were received from the target AP. If so, then the discovery scan has failed to identify any access points other than the target AP, and the mobile station may determine, with some confidence, that the target AP belongs to a SOHO-type WLAN deployment.

If not all management frames in the scan results were received from the target AP, then the discovery scan has identified more than one AP, and at 406, the mobile station may compare a management frame in the scan results that was received from the target AP with a management frame in the scan results that was received from another access point.

The target AP is considered to match the other access point if one or more characteristics of the target AP discernible from the target AP's management frame have values identical to the values of the same one or more characteristics of the other AP discernible from the other AP's management frame.

The one or more characteristics may include, for example, SSID, security type, encryption type, and presence or absence of a call admission control information element in the management frame.

If none of the one or more other access points matches the target AP, as checked at 408, then the mobile station may determine at 410 that the target AP belongs to a SOHO-type WLAN deployment. The greater the number of characteristics that are checked, the greater the confidence in the determination at 410 that the target AP belongs to a SOHO-type WLAN deployment.

If at least one other access point matches the target AP, as checked at 408, then the mobile station may determine at 412 that the target AP belongs to a corporate/enterprise-type WLAN deployment. The greater the number of characteristics that are checked, the greater the confidence in the determination at 412 that the target AP belongs to a corporate/enterprise-type WLAN deployment. The greater the number of other access points that match the target AP, the greater the confidence in the determination at 412 that the target AP belongs to a corporate/enterprise-type WLAN deployment.

FIG. 4-2 is a flowchart illustrating another example method to be performed by a mobile station, for example, any one of mobile stations 106, 116 and 136, for determining a type of WLAN deployment of a target AP. The example method may be performed by the mobile station as soon as a target AP has been selected from results of a discovery scan.

At 414, the mobile station checks the security type of the target AP, which is discernible from a management frame in the scan results received from the target AP. If the security type is "Open System", that is, no authentication and no encryption is implemented in the WLAN, then the mobile station determines at 416 that the target AP belongs to a SOHO-type WLAN deployment. The assumption inherent in this example method is that corporate/enterprise-type WLAN deployments implement security and therefore have a security type other than "Open System". Thus confidence in the determination at 416 that the target AP belongs to a SOHO-type WLAN deployment may be high. If the security type of the target AP is not "Open System", the mobile station cannot determine the type of WLAN deployment solely from the security type of the target AP.

FIG. 4-3 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan.

At 418, the mobile station looks up the organization identified by the organizationally unique identifier (OUI) portion of the MAC address of the target AP.

If the identified organization is known to manufacture or sell access points for corporate/enterprise WLAN deployments only, as checked at 420, then the mobile station may determine at 422 that the target AP belongs to a corporate/enterprise-type WLAN deployment. For example, Hewlett Packard is currently known to manufacture or sell access points for corporate/enterprise WLAN deployments only.

If the identified organization is known to manufacture or sell access points for SOHO WLAN deployments only, as checked at 424, then the mobile station may determine at 426 that the target AP belongs to a SOHO-type WLAN deployment. For example, Belkin Corporation and D-Link Corporation are currently known to manufacture or sell access points for SOHO WLAN deployments only.

If the identified organization is known to manufacture or sell access points for both types of WLAN deployment, as is the case, for example, with Cisco Systems, then the mobile station cannot determine the type of WLAN deployment solely from the OUI portion of the MAC address of the target AP.

In an alternative implementation, the check at 424 whether the identified organization is known to manufacture or sell access points for SOHO WLAN deployments only may precede the check at 420 whether the identified organization is known to manufacture or sell access points for corporate/enterprise WLAN deployments only.

FIG. 4-4 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan.

At 428, the mobile station checks whether the target AP is enabled for Cisco Compatible Extensions (CCX). The mobile station may determine this, for example, by checking whether a management frame from the target AP in the scan results includes a vendor-specific information element (IE) that indicates a CCX version.

If the target AP is CCX-enabled, then the mobile station may determine at 430 with high confidence that the target AP belongs to a corporate/enterprise-type WLAN deployment. If the target AP is not CCX-enabled, the mobile station cannot determine the type of WLAN deployment solely from this fact.

FIG. 4-5 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan.

At 432, the mobile station checks whether a beacon frame, probe response, association response or reassociation response in the scan results received from the target AP includes in its Radio Resource Measurement (RRM) Enabled Capabilities information element a bit indicating support for Neighbor Reports. A Neighbor Report response frame sent in response to a Neighbor Report request includes a list of candidate APs for roaming. If the beacon frame or probe response or association response or reassociation response includes a bit indicating support for Neighbor Reports, then the mobile station may determine at 434 with some confidence that the target AP belongs to a corporate/enterprise-type WLAN deployment. If the beacon frame or probe response or association response or reassociation response does not include a bit indicating support for Neighbor Reports, the mobile station cannot determine the type of WLAN deployment solely from this fact.

FIG. 4-6 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan.

At 436, the mobile station checks whether a beacon frame or probe response in the scan results received from the target AP includes in the Robust Security Network (RSN) Capabilities field of its RSN information element a bit indicating support for WPA pre-authentication. If the beacon frame or probe response includes a bit indicating support for WPA pre-authentication, then the mobile station may determine at 438 with complete confidence that the target AP belongs to a corporate/enterprise-type WLAN deployment. If the beacon frame or probe response does not include a bit indicating support for WPA pre-authentication, the mobile station cannot determine the type of WLAN deployment solely from this fact.

FIG. 4-7 is a flowchart illustrating an example method to be performed by a mobile station, for example, any one of mobile stations 106, 116 and 136, for determining a type of WLAN deployment of a target AP. The example method may be performed by the mobile station as soon as a target AP has been selected from results of a discovery scan and a matching connection profile stored in the mobile station has been identified.

As mentioned above, a connection profile stored in the mobile station includes a network name of a WLAN. The network name uniquely identifies the connection profile in the mobile station, so that no two connection profiles stored in the same mobile station include the same network name. A connection profile is optionally labeled with a profile label. A connection profile may include indications of other network details, for example, one or more of the following: a security type, a security subtype, an authentication method, and an encryption type. A connection profile may also include credentials for use with the implemented security type or with the authentication method or with both. A connection profile may also include other information, for example, Internet Protocol (IP) network parameters.

A connection profile may optionally include an indication of the type of deployment of the WLAN. For example, the connection profile may include a parameter which if set to a first value indicates that the WLAN identified by the network name included in the connection profile is a SOHO-type WLAN deployment and which if set to a second value that differs from the first value indicates that the WLAN identified by the network name included in the connection profile is a corporate/enterprise-type WLAN deployment.

Selecting a target AP may involve comparing the scan results to one or more of the connection profiles stored in the mobile station. A target AP whose management frame is in the scan results is considered a match to a particular connection profile if the following network details of the particular connection profile and the network details of the management frame are identical: network name, security type, and encryption type.

If the connection profile that matches the target AP also stores an indication of the type of deployment of the WLAN, as checked by the mobile station at 440, then the mobile station may determine at 442 with high confidence that the target AP belongs to a WLAN deployment of the type that corresponds to the indication stored in the connection profile that matches the target AP. For example, if the indication has the first value, the mobile station may determine that the target AP belongs to a SOHO-type WLAN deployment, and if the indication has the second value, the mobile station may determine that the target AP belongs to a corporate/enterprise-type WLAN deployment.

FIG. 4-8 is a flowchart illustrating an example method to be performed by a mobile station, for example, any one of mobile stations 106, 116 and 136, for determining a type of WLAN deployment of a target AP. The example method is applicable only for mobile stations that do not have a static IP address. The example method may be performed by the mobile station as soon as an offer message including an offered IP address is received from a DHCP server as part of a dynamic IP address acquisition process.

If a source MAC address included in the offer message is identical to the MAC address of the target AP, as checked by the mobile station at 452, then the mobile station may determine at 454 with complete confidence that the target AP belongs to a SOHO-type WLAN deployment.

If the source MAC address included in the offer message is not identical to the MAC address of the target AP, as checked by the mobile station at 452, then the mobile station may determine at 456 with complete confidence that the target AP belongs to a corporate/enterprise-type WLAN deployment.

FIG. 4-9 is a flowchart illustrating an example method to be performed by a mobile station, for example, any one of mobile stations 106, 116 and 136, for determining a type of WLAN deployment of a target AP. The example method is applicable only for mobile stations that do not have a static IP address. The example method may be performed by the mobile station as soon as an offer message including an offered IP address is received from a DHCP server as part of a dynamic IP address acquisition process.

If the offered IP address is of the form 192.168.X.X, as checked by the mobile station at 462, then the mobile station may determine at 464 with high confidence that the target AP belongs to a SOHO-type WLAN deployment. Access points for SOHO-type WLAN deployments that have internal DHCP servers are often configured by default to offer IP addresses of the form 192.168.X.X.

If the offered IP address is not of the form 192.168.X.X, as checked by the mobile station at 462, then the mobile station may determine at 466 with some confidence that the target AP belongs to a corporate/enterprise-type WLAN deployment.

Configuration of Mobile Station: Enablement/Disablement of Roaming Scans

Roaming scans, also known as neighbor scans, are scans that occur from time to time in the background without user intervention, when the mobile station is connected to an access point. The scan is a search for access points that have the same SSID as the AP to which the mobile station is currently connected. Precisely how and under what conditions a mobile station determines to perform a roaming scan is beyond the scope of this document. Precisely how the mobile station handles results of the roaming scan is beyond the scope of this document.

If a SOHO-type WLAN deployment is a single-AP WLAN deployment, then performing roaming scans is a waste of the mobile station's resources because either there are no nearby APs with the same SSID as the AP to which the mobile station is connected, or any such nearby APs with the same SSID as the AP to which the mobile station is connected belong to a different WLAN and therefore roaming to such nearby APs is not desirable.

If a SOHO-type WLAN deployment has multiple APs, then performing roaming scans may be undesirable, because roaming will not be seamless, due to the absence of a centralized DHCP server for the multiple APs.

FIG. 5 is a flowchart illustrating an example method to be performed by a mobile station, for example, any one of mobile stations 106, 116 and 136, for configuring the mobile station.

In the event that the mobile station has determined that the target AP belongs to a corporate/enterprise-type WLAN deployment, as indicated at 304, the mobile station may configure itself at 506 to enable roaming scans. In other words, the first configuration may include that roaming scans are enabled.

In the event that the mobile station has determined that the target AP belongs to a SOHO-type WLAN deployment, as indicated at 314, the mobile station may configure itself at 516 to disable roaming scans. In other words, the second configuration may include that roaming scans are disabled.

If, prior to the mobile station performing the example method illustrated in FIG. 5, the mobile station is already configured, for example by default, to enable roaming scans, then the mobile station can forego configuring itself at 506 to enable roaming scans.

If, prior to the mobile station performing the example method illustrated in FIG. 5, the mobile station is already configured, for example by default, to disable roaming scans, then the mobile station can forego configuring itself at 516 to disable roaming scans.

Configuration of Mobile Station: Reaction to Failure to Connect or to Receipt of a Decryption Error Message Overview—Banning of Connection Profiles A mobile station excludes a banned connection profile from active scanning other than active scanning performed as part of a discovery scan. The mobile station filters results of passive scanning—other than passive scanning performed as part of a discovery scan—to remove from the results records including the network name of a banned connection profile. APs configured with the network name of a banned connection profile will therefore not be eligible for selection as a target AP by the mobile station, thus preventing repeated failed attempts to connect to the target AP.

Suppose the mismatch in credentials is due to misconfiguration of a particular AP and the WLAN is also supported by one or more other APs in which the credentials are not misconfigured. While the connection profile for the network name of the WLAN is banned, the mobile station will not be able to select any of the properly-configured APs as a target AP.

In the techniques described in this document, a connection profile is banned only temporarily, and the mobile station will "un-ban" a connection profile when a condition is met. The condition may be one of a set of conditions, and whichever condition is met first will cause the mobile station to un-ban the connection profile. For example, the condition may be the expiry of a timer, known as a "timeout". When configuring the duration of the timeout, one balances two competing considerations: increased mobile station power savings (for longer durations), and faster ability to reconnect to a WLAN (for shorter durations). The duration of the timeout may be, for example, in the range of 1 minute to 15 minutes, or in the range of 2 minutes to 10 minutes, or approximately 5 minutes, or any other duration. In another example, the condition may be the editing of the banned connection profile. In a further example, detection by the mobile station of user input indicative of an explicit request to connect to a banned connection profile may cause the mobile station to un-ban the banned connection profile. In yet another example, the mobile station may un-ban a banned connection profile if the mobile station determines that it is no longer in the coverage area of an AP supporting a WLAN with the network name of the banned connection profile. In a further example, turning the WLAN radio off or switching the WLAN mode of the mobile station to mobile hotspot (MHS) mode or some other non-client mode that is supported by the WLAN functionality of the mobile station may cause the mobile station to un-ban all banned connection profiles. In yet another example, detection by the mobile station of user input that is indicative of selection of a banned connection profile from results of a discovery scan may cause the mobile station to un-ban the selected banned connection profile.

The mobile station may optionally generate a notification that a connection profile has been banned, with the notification to be displayed or provided via any suitable user output component of the mobile station to a user of the mobile station. Examples for such notifications, in which Label refers to the label assigned to the connection profile, either by the user or automatically by the mobile station, include: "Profile Label has temporarily been blocked from associations due to an inability to obtain an IP address"; "Profile Label has temporarily been blocked from associations due to invalid credentials"; and "Profile Label has temporarily been blocked from associations due to authentication timeouts".

When displayed as part of a list of connection profiles stored in the mobile station, any banned connection profile may optionally have its banned status indicated by a visual indication. Banned connection profiles may be displayed in a separate list from un-banned connection profiles.

Overview—Banning of Access Points

The mobile station may ignore any received communications from a banned access point. The mobile station refrains from transmitting any communications addressed to the unique identifier of a banned access point. In one implementation, outgoing communications are screened to block transmission of any communications addressed to the unique identifier of any banned access point. In another implementation, outgoing communications are screened to block addressing of any communications to the unique identifier of any banned access point.

In yet another implementation, the mobile station filters probe responses received during active scanning to remove from the scan results records for any probe responses received from any banned access point, and the mobile station filters beacon frames received during passive scanning to remove from the scan results records for any probe responses received from any banned access point. Banned APs will therefore not be eligible for selection as a target AP by the mobile station, thus preventing repeated failed attempts to connect to the target AP. Conditions for "un-banning" an access point are also described in this document.

As mentioned previously in this document, a banned AP will not be selected as a target AP. This restriction may be implemented by filtering banned APs from the scan results prior to selection of a target AP. Alternatively, or additionally, this restriction may be implemented in the process of selecting a target AP.

Because the mobile station refrains from sending communications addressed to the unique identifier of a banned AP, the mobile station will not initiate an association process or an authentication process with a banned AP.

Suppose the mismatch in credentials is due to misconfiguration of a particular AP, and the WLAN is also supported by one or more other APs in which the credentials are not misconfigured. While the particular AP is banned, the mobile station will still be able to select a properly-configured AP as a target AP if the mobile station detects the properly-configured AP during scanning This situation may occur in a SOHO-type WLAN deployment, where although multiple APs are configured with the same network name, the same security type and the same credentials, each AP is configured independently of the others. In a corporate/enterprise-type WLAN deployment, configuration of the APs is controlled centrally, and it is unlikely that a single AP in the WLAN deployment is misconfigured. Rather, it is more common that either (i) all the APs in the enterprise are properly configured, and the mismatch in credentials is due to a misconfiguration of the connection profile in the mobile station; or (ii) all the APs in the WLAN deployment are identically misconfigured, and hence the mismatch in credentials with the connection profile. If a mobile station were to ban the target AP in a corporate/enterprise-type WLAN deployment after experiencing an authentication process failure with the target AP, the mobile station would likely experience authentication process failure with all other APs in the WLAN deployment. In view of this distinction, in some implementations, the mobile station may react to failure of the authentication process where the target AP belongs to a SOHO-type WLAN deployment by banning the target AP, and may react to failure of the authentication process where the target AP belongs to a corporate/enterprise-type WLAN deployment by banning or reducing the priority of the matching connection profile.

FIG. 6 is a flowchart illustrating an example method to be performed by a mobile station, for example, any one of mobile stations 106, 116 and 136, for configuring the mobile station.

In the event that the mobile station has determined that the target AP belongs to a corporate/enterprise-type WLAN deployment, as indicated at 304, the mobile station may configure itself at 606 to react to failure to connect to the target AP or to receipt of a decryption error message from the target AP by banning the connection profile that matches the target AP. In other words, the first configuration may include reacting to failure to connect to the target AP or to receipt of a decryption error message from the target AP by banning the connection profile that matches the target AP. As an alternative to banning the connection profile that matches the target AP, the mobile station may reduce the priority of the connection profile that matches the target AP.

In the event that the mobile station has determined that the target AP belongs to a SOHO-type WLAN deployment, as indicated at 314, the mobile station may configure itself at 616 to react to failure to connect to the target AP or to receipt of a decryption error message from the target AP by banning the target AP. In other words, the second configuration may include reacting to authentication failure by banning the target AP.

As mentioned previously in this document, a problem with an authentication server may lead to an authentication timeout. If a subsequent attempt by the mobile station to authenticate with the target AP involves the redirection of the authentication request to a different authentication server, the subsequent attempt may succeed. Therefore, in a modified version (not shown) of the method illustrated in FIG. 6, the mobile station configures itself at 616 to react to failure to connect to the target AP by banning the target AP only if the cause for failure is invalid credentials.

Overview—Suppression of Access Points

The mobile station will address communications to the unique identifier of a suppressed access point less often than to the unique identifier of an access point that is neither suppressed nor banned.

In one implementation, the mobile station occasionally filters probe responses received during active scanning to remove from the scan results records for any probe responses received from any suppressed access point, and the mobile station occasionally filters beacon frames or other management frames received during passive scanning to remove from the scan results records for any beacon frames or other management frames received from any suppressed access point. Suppressed APs will therefore be eligible for selection as a target AP by the mobile station less often, thus reducing the frequency of failed authentication processes. Conditions for "un-suppressing" an access point are described in this document. Conditions for converting the status of an access point from suppressed to banned are described in this document.

As mentioned previously in this document, a suppressed AP will be eligible for selection as a target AP only occasionally. This restriction may be implemented by occasionally filtering suppressed APs from the scan results prior to selection of a target AP. Alternatively, or additionally, this restriction may be implemented in the process of selecting a target AP.

In some implementations, the mobile station may react to failure of the authentication process where the target AP belongs to a SOHO-type WLAN deployment by suppressing the target AP, and may react to failure of the authentication process where the target AP belongs to a corporate/enterprise-type WLAN deployment by banning the connection profile that matches the target AP.

FIG. 7 is a flowchart illustrating an example method to be performed by a mobile station, for example, any one of mobile stations 106, 116 and 136, for configuring the mobile station.

In the event that the mobile station has determined that the target AP belongs to a corporate/enterprise-type WLAN deployment, as indicated at 304, the mobile station may configure itself at 706 to react to failure to connect to the target AP or to receipt of a decryption error message from the target AP by banning the connection profile that matches the target AP. In other words, the first configuration may include reacting to failure to connect to the target AP or to receipt of a decryption error message from the target AP by banning the connection profile that matches the target AP. As an alternative to banning the connection profile that matches the target AP, the mobile station may reduce the priority of the connection profile that matches the target AP.

In the event that the mobile station has determined that the target AP belongs to a SOHO-type WLAN deployment, as indicated at 314, the mobile station may configure itself at 716 to react to failure to connect to the target AP or to receipt of a decryption error message from the target AP by suppressing the target AP. In other words, the second configuration may include reacting to failure to connect to the target AP or to receipt of a decryption error message from the target AP by suppressing the target AP.

As mentioned previously in this document, a problem with an authentication server may lead to an authentication timeout. If a subsequent attempt by the mobile station to authenticate with the target AP involves the redirection of the authentication request to a different authentication server, the subsequent attempt may succeed. Therefore, in a modified version (not shown) of the method illustrated in FIG. 7, the mobile station configures itself at 716 to react to failure to connect to the target AP by suppressing the target AP only if the cause for failure is invalid credentials.

In other implementations, the mobile station may react to the failure of the authentication process where the target AP belongs to a SOHO-type WLAN deployment by banning the target AP if the cause of the failure is 'invalid credentials' and by suppressing the target AP if the cause of failure is something other than 'invalid credentials', and may react to failure of the authentication process where the target AP belongs to a corporate/enterprise-type WLAN deployment by banning the connection profile that matches the target AP.

FIG. 8 is a flowchart illustrating an example method to be performed by a mobile station, for example, any one of mobile stations 106, 116 and 136, for configuring the mobile station.

In the event that the mobile station has determined that the target AP belongs to a corporate/enterprise-type WLAN deployment, as indicated at 304, the mobile station may configure itself at 806 to react to failure to connect to the target AP or to receipt of a decryption error message from the target AP by banning the connection profile that matches the target AP. In other words, the first configuration may include reacting to failure to connect to the target AP or to receipt of a decryption error message from the target AP by banning the connection profile that matches the target AP. As an alternative to banning the connection profile that matches the target AP, the mobile station may reduce the priority of the connection profile that matches the target AP.

In the event that the mobile station has determined that the target AP belongs to a SOHO-type WLAN deployment, as indicated at 314, the mobile station may configure itself at 816 to react to failure to connect to the target AP or to receipt of a decryption error message from the target AP by (i) banning the target AP if the cause of failure is invalid credentials and (ii) suppressing the target AP if the cause of failure is something other than invalid credentials or if a decryption error message was received. In other words, the second configuration may include reacting to failure to connect to the target AP or to receipt of a decryption error message from the target AP by (i) banning the target AP if the cause of failure is invalid credentials and (ii) suppressing the target AP if the cause of failure is something other than invalid credentials or if a decryption error message was received.

Detailed Description of Banning of Connection Profiles

Figures 4, 5, 6, 7, 8, 9:
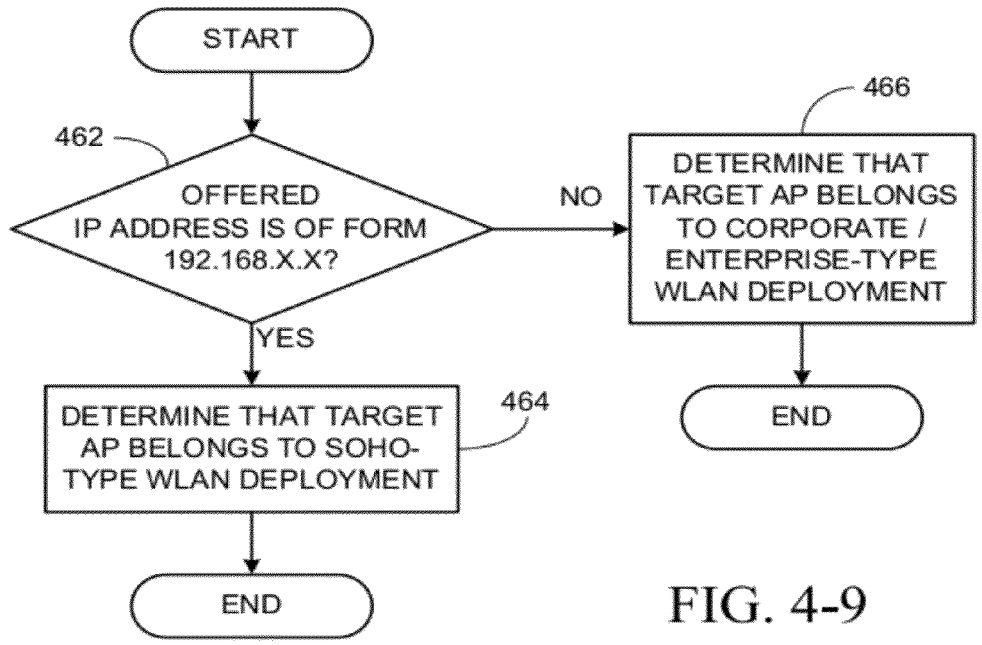
Figure 5:
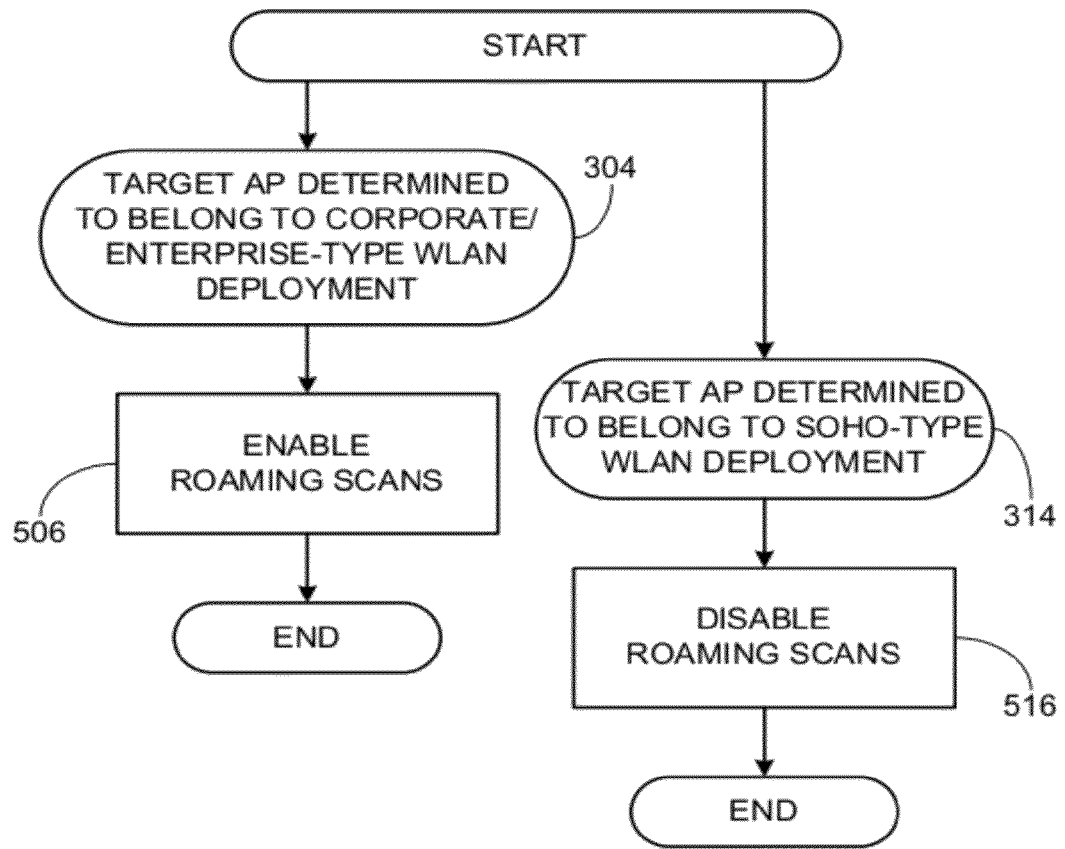
Figure 6:
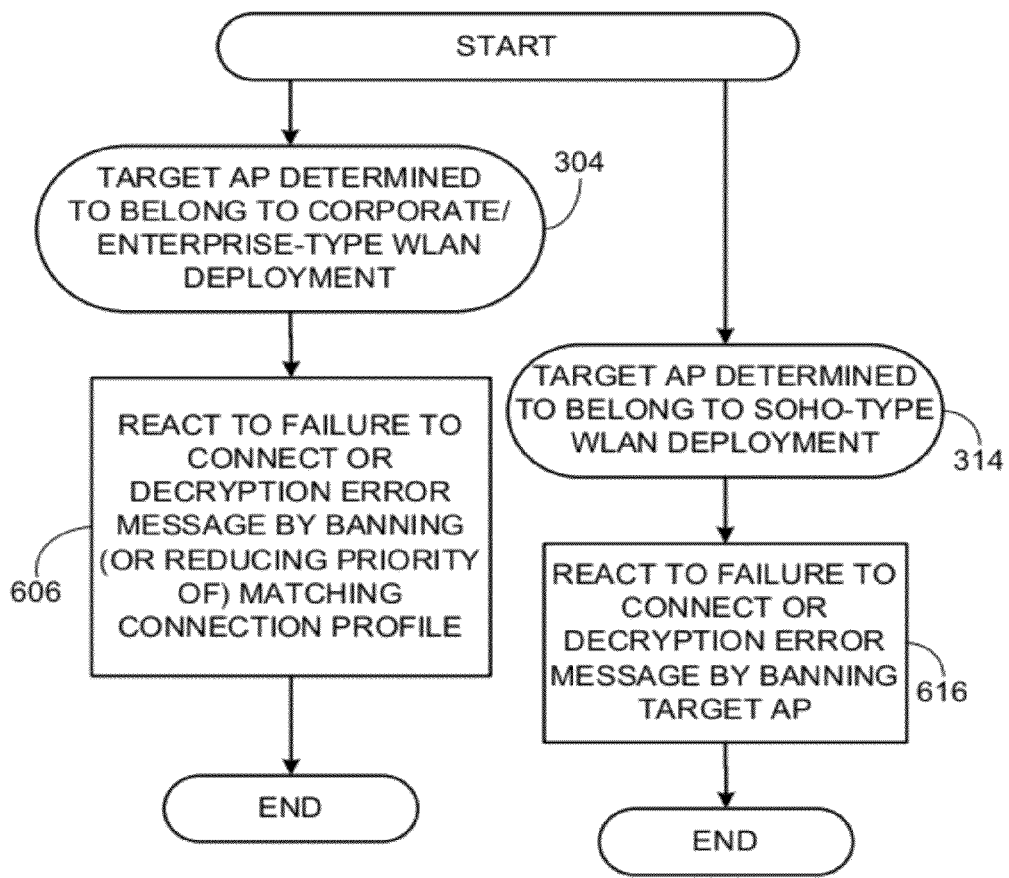
Figure 7:
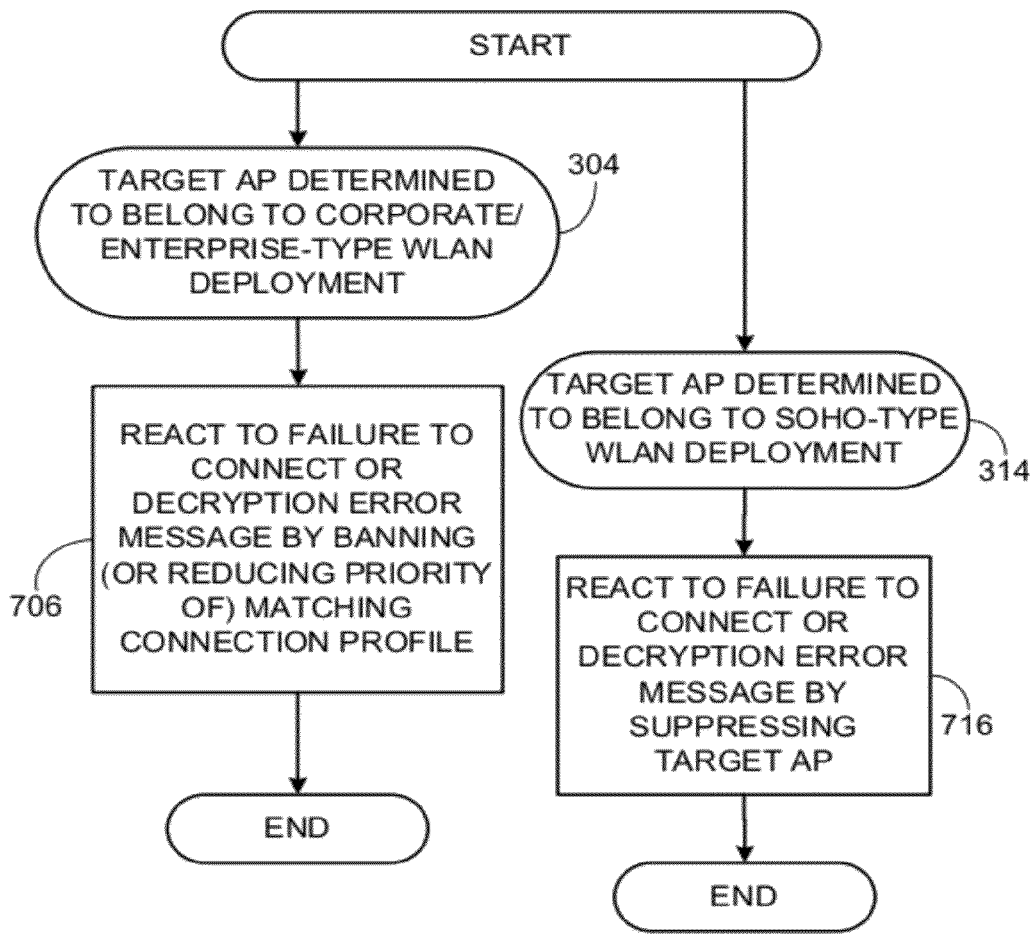
Figure 8:
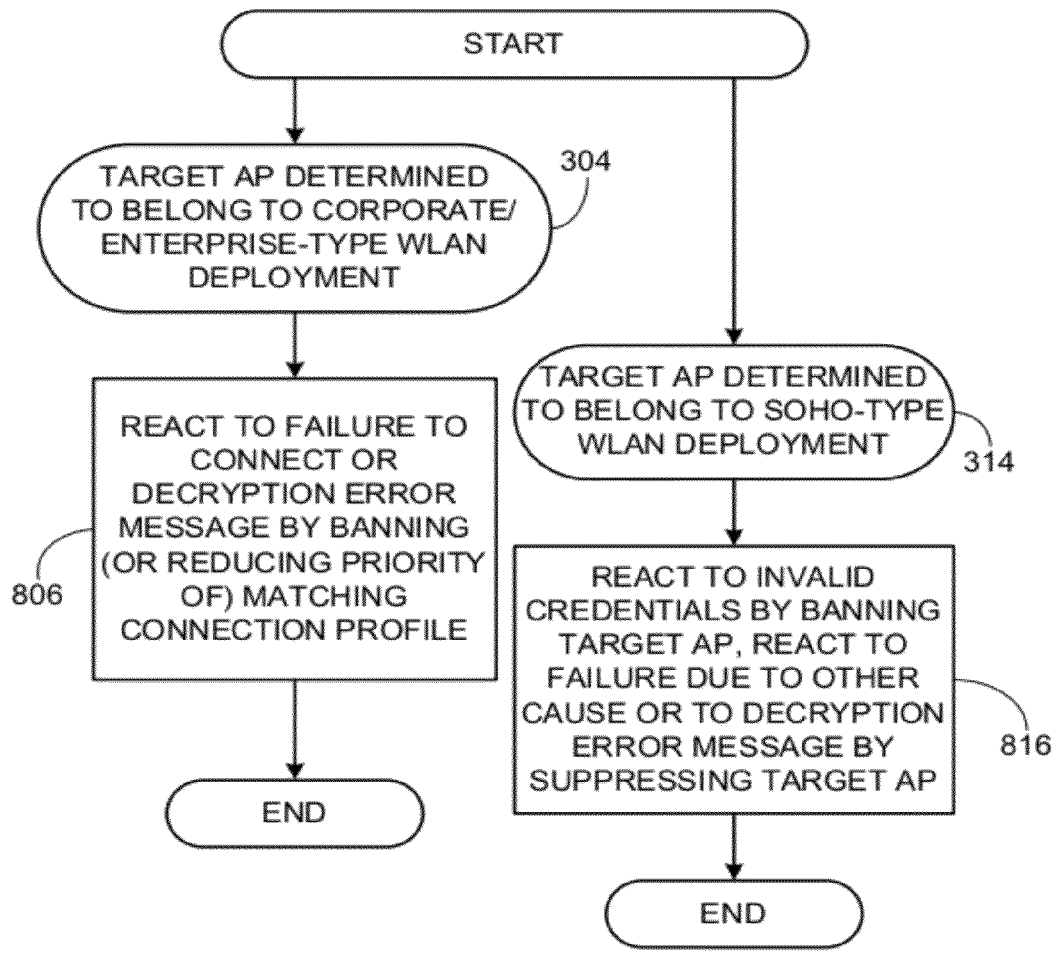
Figure 9:
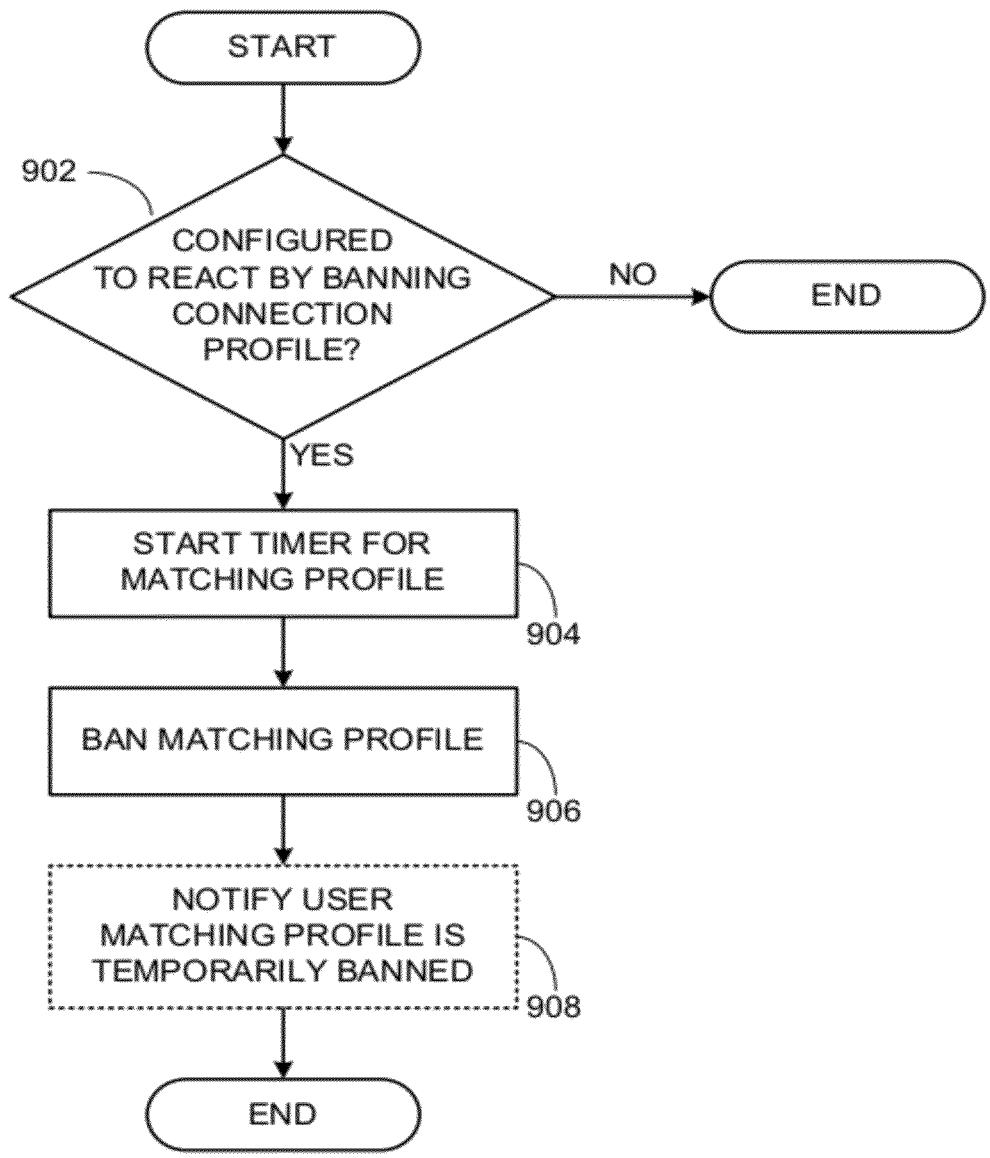

FIG. 9 is a flowchart illustrating an example method to be performed by a mobile station, for example, any one of mobile stations 106, 116 and 136, for banning a connection profile. The example method may be the action taken by the mobile station at 238 in the example method illustrated in FIG. 2 in reaction to failure to connect with a target AP or in reaction to receipt of a decryption error message from the target AP.

The example method is applicable in the situation where the mobile station has been configured to react to receipt of a decryption error message from a target AP or to failure—due to any cause, or only due to invalid credentials, or only due to a cause other than invalid credentials—of an attempt to connect with a target AP by banning the connection profile matching the target AP, as checked by the mobile station at 902.

At 904, the mobile station starts a timer for the connection profile that matches the target AP. At 906, the mobile station bans the matching connection profile.

Banning a connection profile may be implemented in the mobile station any suitable manner. For example, a connection profile may include a field which is set to a first value if the connection profile is not banned and set to a second value if the connection profile is banned. In another example, an indication of the connection profile, such as its network name, may be added to a list when the connection profile is banned, and may be removed from the list when the connection profile is un-banned.

The mobile station may at 908 optionally notify a user of the mobile station that the matching connection profile has been temporarily banned. This has been described in more detail previously in this document.

Figure 10:
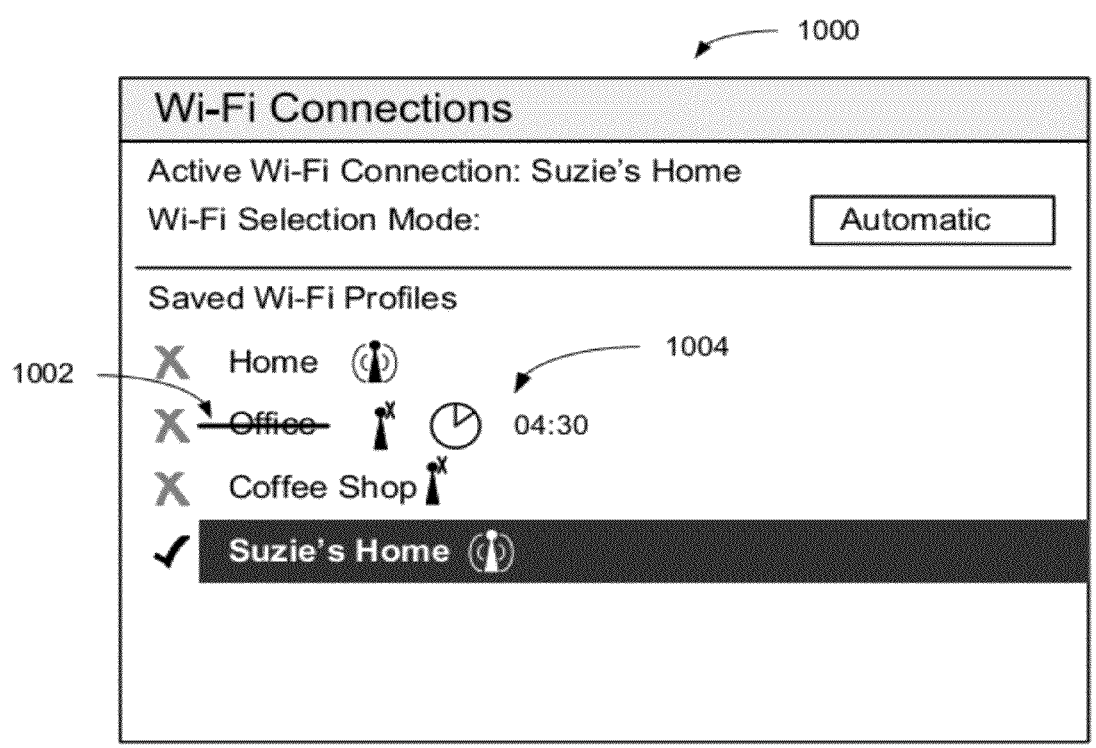
FIG. 10 is an illustration of an example screenshot listing connection profiles stored in a mobile station, in which a temporarily banned connection profile is identified by a visual indication.

When displayed as part of a list of connection profiles stored in the mobile station, any banned connection profile may optionally have its banned status indicated by a visual indication. FIG. 10 is an illustration of an example screenshot 1000 listing connection profiles stored in performed by a mobile station, for example, any one of mobile stations 106, 116 and 136, in which a temporarily banned connection profile, labeled "Office", is identified by a visual indication 1002, which in this example is a line through the label. Alternatively or additionally, a visual indication 1004 is used to identify the temporarily banned connection profile, where the visual indication 1004 is a timer showing how much time (in minutes and seconds) is left before the profile labeled "Office" is un-banned. In other implementations, the time may show how long the profile labeled "Office" has been banned.

Figure 11:
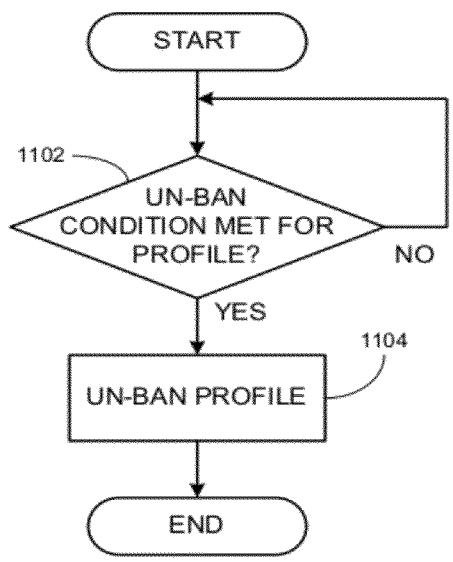
FIG. 11 is a flowchart illustrating an example method to be performed by a mobile station for un-banning a connection profile.
Figures 1, 11:
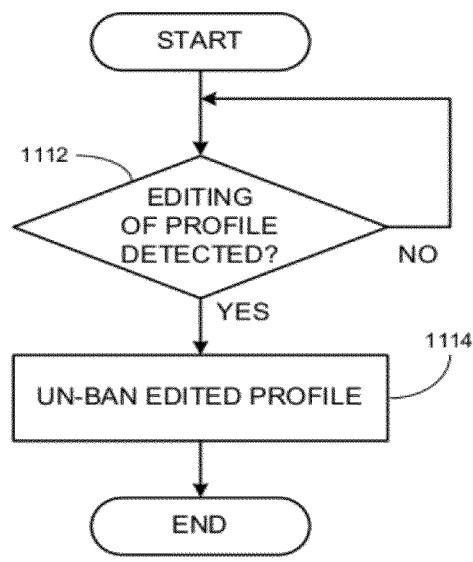
Figures 2, 11:
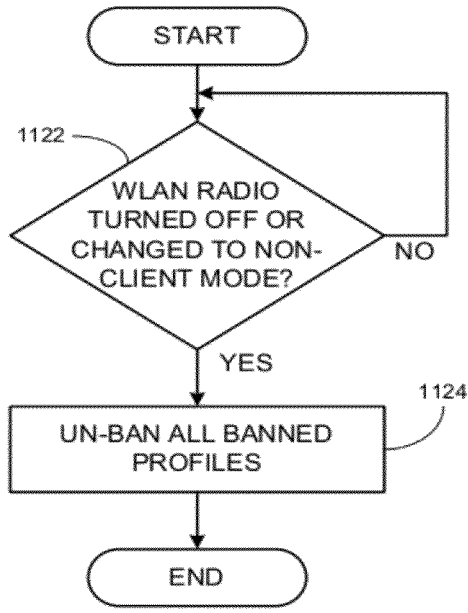
Figures 3, 11:
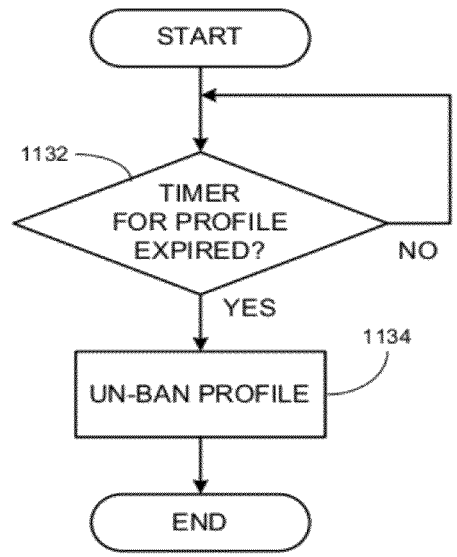
Figures 4, 11:
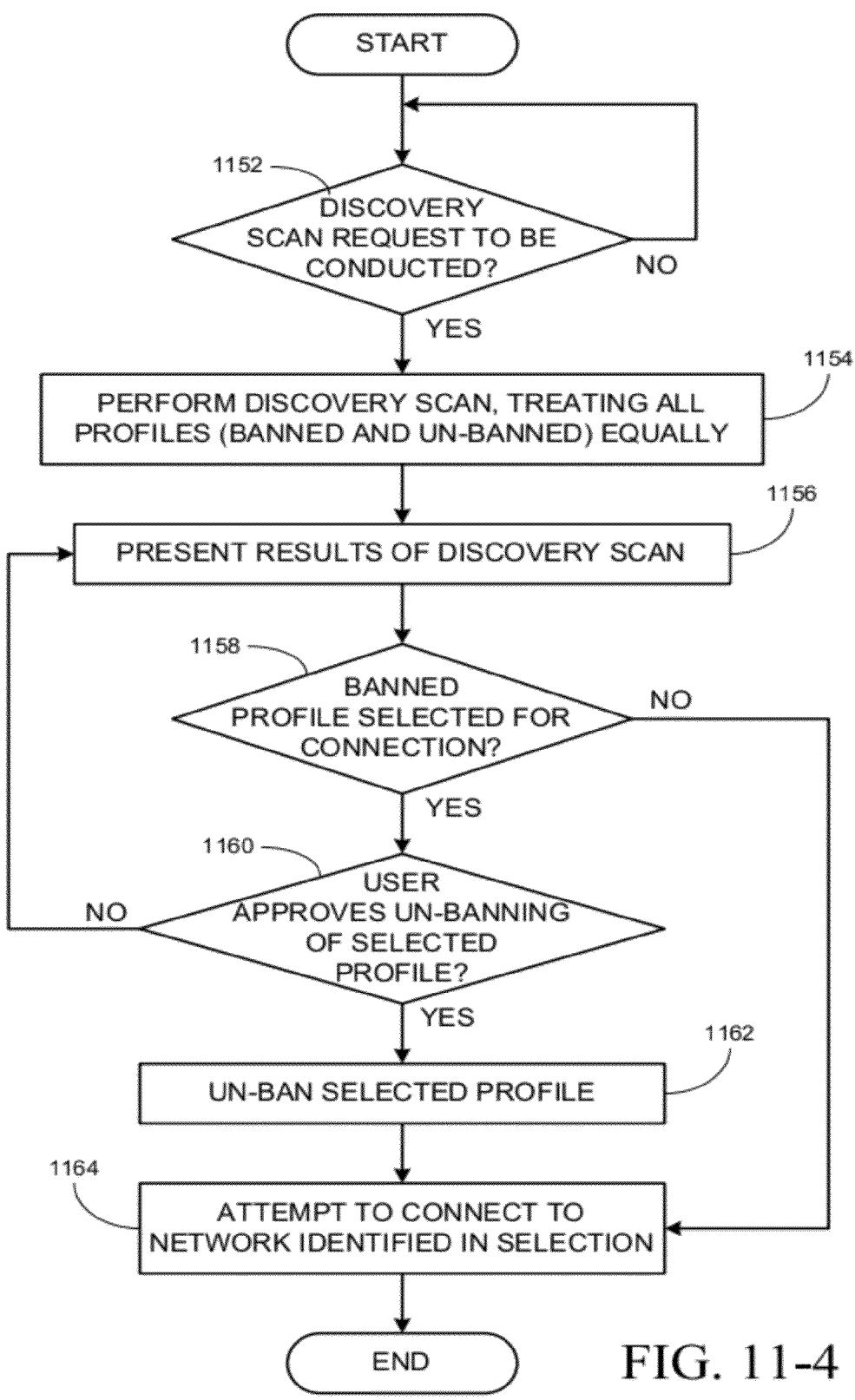

FIG. 11 is a flowchart illustrating an example method to be performed by a mobile station, for example, any one of mobile stations 106, 116 and 136, for un-banning a banned connection profile. Upon detecting at 1102 that an un-ban condition has been met for a particular banned connection profile, the mobile station proceeds at 1104 to un-ban the particular banned connection profile. Examples of un-ban conditions have been described previously in this document. Different conditions or different combinations of conditions may be used in different implementations.

FIGS. 11-1, 11-2 and 11-3 are flowcharts illustrating specific example methods to be performed by a mobile station, for example, any one of mobile stations 106, 116 and 136, for un-banning one or more connection profiles. In FIG. 11-1, upon detecting at 1112 that a particular banned connection profile has been edited, the mobile station proceeds at 1114 to un-ban the edited connection profile. In FIG. 11-2, upon detecting at 1122 that a WLAN radio of the mobile station has been turned off or upon detected at 1122 that the WLAN mode of the mobile station has been switched to mobile hotspot (MHS) mode or some other non-client mode that is supported by the WLAN functionality of the mobile station, the mobile station proceeds at 1124 to un-ban all banned connection profiles. In FIG. 11-3, upon detecting at 1132 that a timer set for a particular banned connection profile (see, for example, the timer started at 902 in FIG. 9) has expired, the mobile station proceeds at 1134 to un-ban the connection profile for which the timer has expired.

In FIG. 11-4, upon determining at 1152 that a discovery scan is to be conducted, the mobile station proceeds at 1154 to conduct the discovery scan in a manner that treats all connection profiles equally, regardless of their status as banned or unbanned. No connection profiles will be excluded from a discovery scan. At 1156, the mobile station presents the results of the discovery scan and a user may select one of the results for selection. In one implementation, only unbanned connection profiles found during the discovery scan are presented. In another implementation, all connection profiles found during the discovery scan are presented. In a further implementation, all connection profiles found during the discovery scan are presented, with banned connection profiles distinguished from the unbanned connection profiles. In either of the latter two implementations, if the user's selection is of a banned connection profile, as checked at 1158, then the mobile station may prompt for approval to un-ban the selected connection profile. If user input received at the mobile station is indicative of such approval, as checked at 1160, the mobile station may proceed at 1162 to un-ban the selected connection profile and to attempt at 1164 to connect to the wireless local area network identified in the selected connection profile. If the user's selection is not a banned connection profile, the mobile station may proceed directly at 1164 to attempt to connect to the wireless local area network identified in the selection. If the user input received at the mobile station following prompting for approval to un-ban a selected connection profile is indicative of lack of such approval, the method may return to the presentation of the results at 1156.

Figure 12:
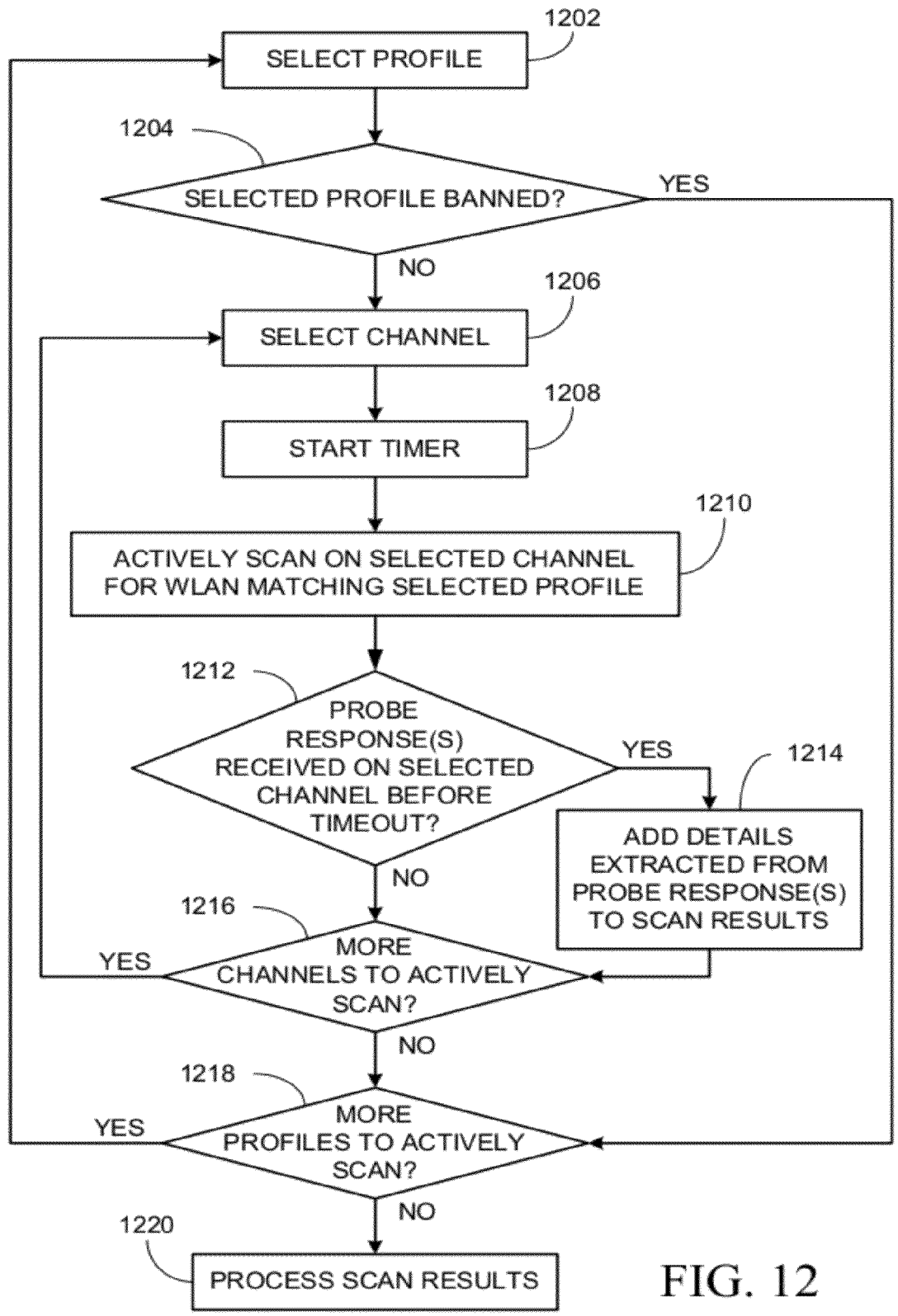
FIG. 12 is a flowchart illustrating an example of a method for active scanning that takes into account whether a profile is banned, the method to be performed by a mobile station.

As mentioned above, banning a connection profile affects how subsequent scans—other than discovery scans—and connection attempts are handled. FIG. 12 is a flowchart illustrating an example of a method for active scanning that takes into account whether a profile is banned, the method to be performed by a mobile station, for example, any one of mobile stations 106, 116 and 136. Variations on how active scanning is conducted by the mobile station are also contemplated, and the method illustrated in FIG. 12 is merely one example. The method illustrated in FIG. 12 does not apply to any active scanning that is performed as part of a discovery scan.

At 1202, the mobile station selects a connection profile, for example, from among the connection profiles stored in its memory. The mobile station determines at 1204 whether the selected connection profile is banned, for example, by sampling the value of the field of the profile mentioned previously in this document, or by checking whether the selected connection profile is included in the list mentioned previously in this document.

If the selected connection profile is not banned, the mobile station proceeds to select at 1206 a channel upon which to do the active scanning. The mobile station starts a timer at 1208, and the mobile station then actively scans at 1210 on the selected channel for a wireless local area network having the same network name as that of the selected connection profile. This typically involves the mobile station transmitting a probe request specifying the network name of the selected connection profile on the selected channel. The mobile station then waits to see if any probe responses are received on the selected channel before the timer started at 1208 has a timeout. Only APs configured with the network name specified in the probe request and configured to operate on the selected channel will respond to the probe request with a probe response.

If the mobile station has received one or more probe responses on the selected channel before the timeout, as checked at 1212, the mobile station adds at 1214 to the scan results one or more records containing details extracted from the received one or more probe responses, and then proceeds to check at 1216 whether there are any other channels to actively scan. If so, the method proceeds to 1206 where the mobile station selects another channel. If there are not any other channels to actively scan, the method proceeds to 1218 where the mobile station checks whether any other connection profiles are to be actively scanned.

If there is at least one more connection profile to be actively scanned, the method continues to 1202 where the mobile station selects another connection profile. If there are no other connection profiles to be actively scanned, then the mobile station processes at 1220 the scan results of the active scanning For example, processing the scan results may include automatically selecting a target AP from the scan results without user intervention. In another example, processing the scan results may include displaying, via a display of the mobile station, a list of available networks gleaned from the scan results, so that a user of the mobile station can select a target AP from the displayed list.

If no probe responses have been received by the mobile station before the timeout, as checked at 1212, the mobile station then proceeds directly to check at 1216 whether there are any other channels to actively scan.

If the selected profile is banned, as checked at 1204, the mobile station proceeds directly to check at 1218 whether any other connection profiles are to be actively scanned.

Figure 13:
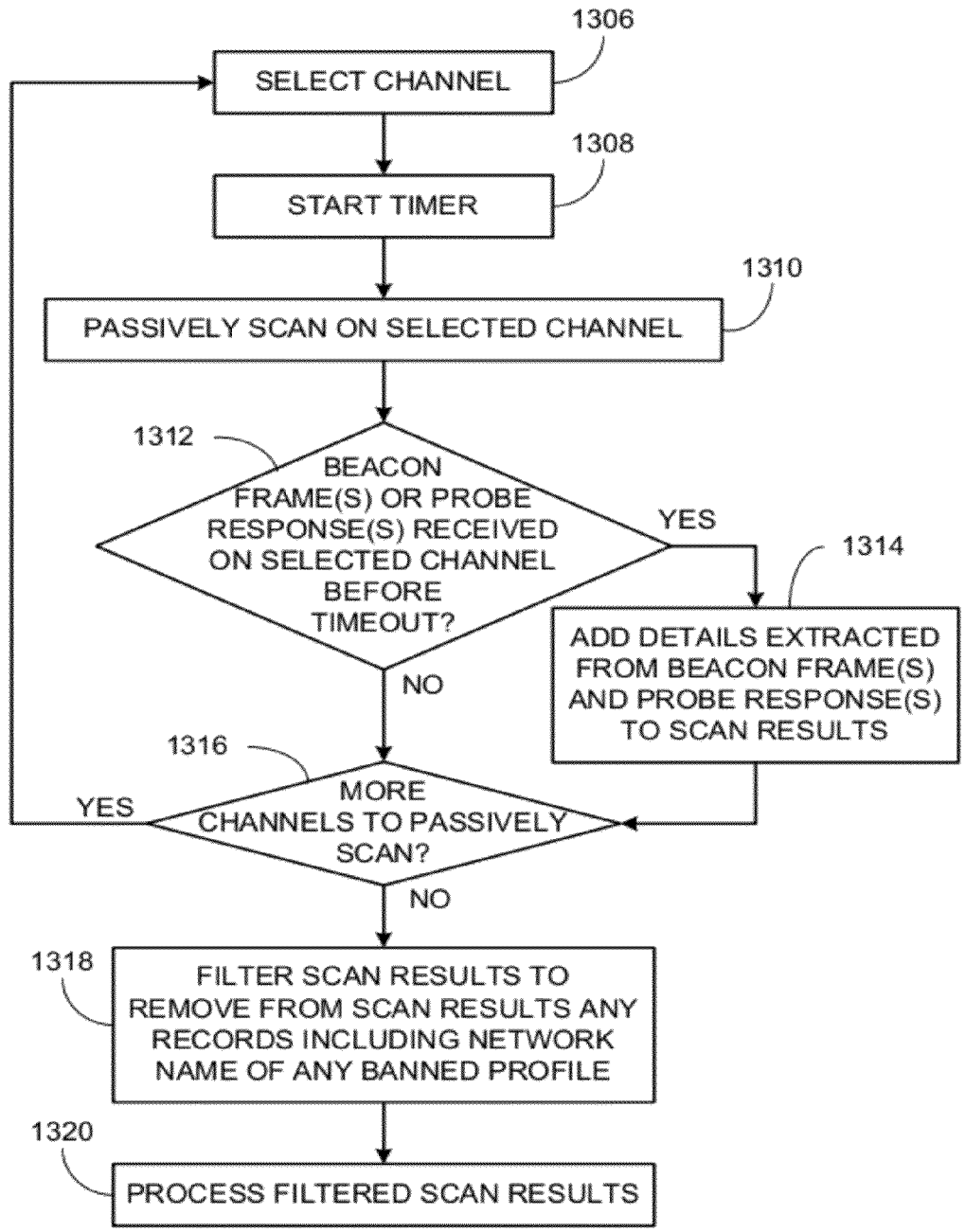
FIG. 13 is a flowchart illustrating an example of a method for passive scanning in the situation where at least one profile is banned, the method to be performed by a mobile station.

As mentioned above, banning a connection profile affects how subsequent scans—other than discovery scans—and connection attempts are handled. FIG. 13 is a flowchart illustrating an example of a method for passive scanning in the situation where at least one profile is banned, the method to be performed by a mobile station, for example, any one of mobile stations 106, 116 and 136. Variations on how passive scanning is conducted by the mobile station are also contemplated, and the method illustrated in FIG. 13 is merely one example. The method illustrated in FIG. 13 does not apply to any passive scanning that is performed as part of a discovery scan.

At 1306, the mobile station selects a channel upon which to do the passive scanning. The mobile station starts a timer at 1308, and the mobile station then passively scans at 1310 on the selected channel. This typically involves the mobile station listening for beacon frames transmitted by APs on the selected channel. The mobile station then waits to see if any beacon frames are received on the selected channel before the timer started at 1308 has a timeout. Only APs configured to operate on the selected channel will transmit beacon frames on the selected channel. APs configured to hide the network name will transmit beacon frames in which no network name is advertised. The mobile station may also receive one or more probe responses on the selected channel that are addressed to a different mobile station.

If the mobile station has received one or more beacon frames or probe responses or both on the selected channel before the timeout, as checked at 1312, the mobile station adds at 1314 to the scan results one or more records containing details extracted from the received one or more beacon frames or probe responses or both, and then proceeds to check at 1316 whether there are any other channels to passively scan. If so, the method proceeds to 1306 where the mobile station selects another channel.

If there are not any other channels to actively scan, the method proceeds to 1318 where the mobile station filters the scan results to remove from the scan results any records including the network name of any banned profile. To filter the scan results, the mobile station may sample the value of the field of the connection profile mentioned previously in this document, or may check whether the selected connection profile is included in the list mentioned previously in this document. In a modified method for passive scanning, the filtering to remove records including the network name of any banned profile may occur at 1314, for the selected channel, thus eliminating the need to filter the scan results after all channels to be passively scanned have been passively scanned.

After filtering the scan results, the mobile station processes at 1320 the filtered scan results of the passive scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

The results of active scanning and the filtered results of passive scanning may be combined, and then processing as described above with respect to 1220 and 1320 may be performed by the mobile station on the combined results.

Figure 14:
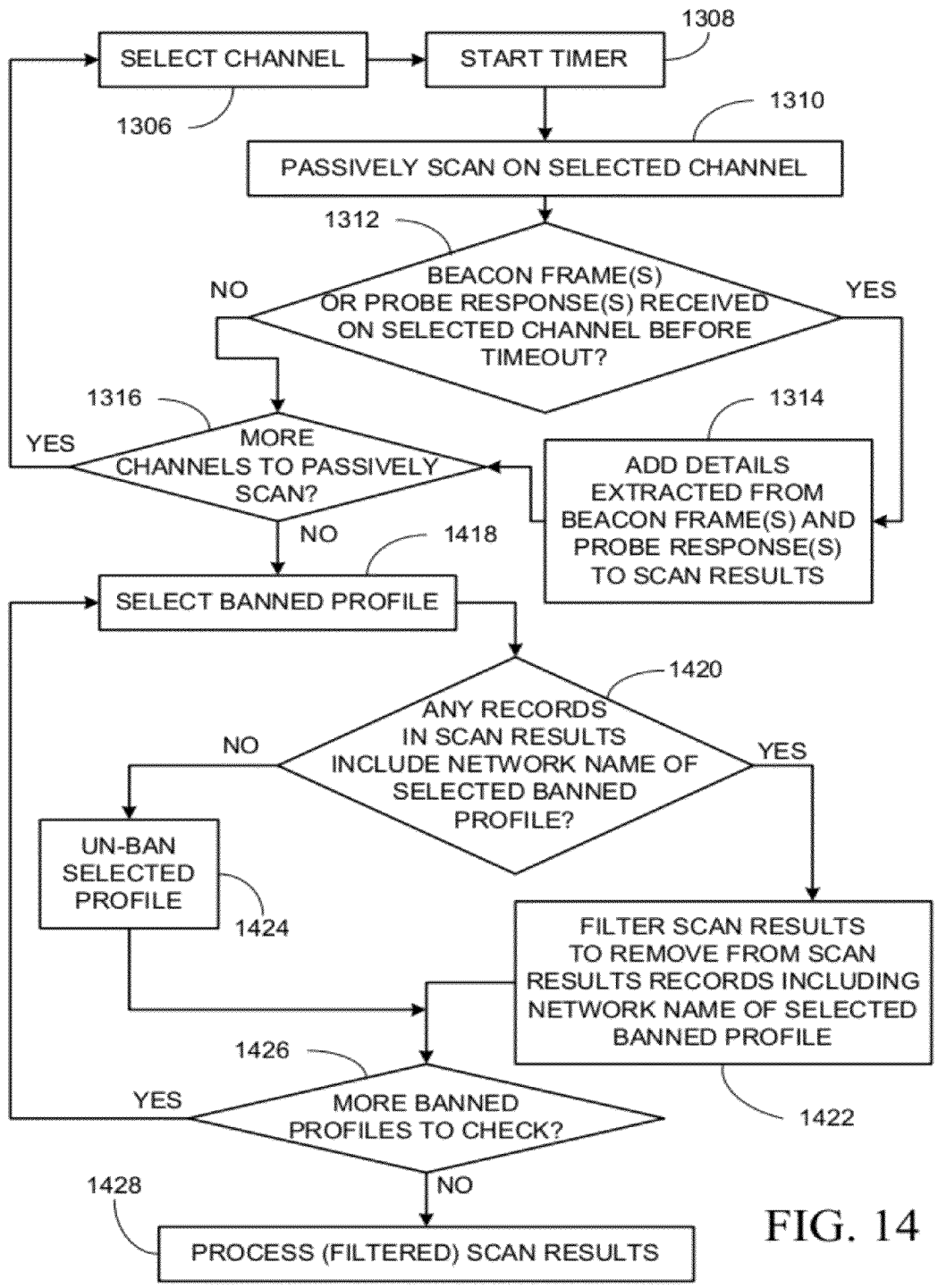
FIG. 14 is a flowchart illustrating another example of a method for passive scanning in the situation where at least one profile is banned, the method to be performed by a mobile station.

FIG. 14 is a flowchart illustrating another example of a method for passive scanning in the situation where at least one profile is banned, the method to be performed by a mobile station, for example, any one of mobile stations 106, 116 and 136. Variations on how passive scanning is conducted by the mobile station are also contemplated, and the method illustrated in FIG. 14 is merely one example. The method illustrated in FIG. 14 does not apply to any passive scanning that is performed as part of a discovery scan.

The method illustrated in FIG. 14 is similar to the method illustrated in FIG. 13, as indicated by the repeated use of reference numerals used in FIG. 13. The description of FIG. 13 with respect to those reference numerals is applicable also to the method illustrated in FIG. 14, except as noted below.

If, as checked at 1316, the mobile station determines that there are not any other channels to actively scan, the mobile station then checks the records in the scan results against the banned connection profiles, one banned connection profile at a time.

At 1418, the mobile station selects one of the banned connection profiles. At 1420, the mobile station checks whether any of the records in the scan results include the network name of the selected banned connection profile. If so, then mobile station filters at 1422 the scan results to remove those records from the scan results. If not, then this is an indication that the mobile station is no longer in the coverage area of any AP configured with the network name of the selected banned connection profile, and the mobile station therefore un-bans at 1424 the selected banned connection profile. There is a risk the AP configured with the network name of the selected banned connection profile hides the network name and therefore the mobile station, unaware that it actually is in the coverage area of the AP, will un-ban the selected banned connection profile.

Following the filtering at 1422 of the scan results or the un-banning at 1424 of the selected banned connection profile, the mobile station checks at 1426 whether there are any other banned profiles to check against the scan results. If so, the method proceeds to 1418 with the selection of another banned connection profile. If not, the mobile station processes at 1428 the filtered scan results of the passive scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

The results of active scanning and the filtered results of passive scanning may be combined, and then processing as described above with respect to 1220 and 1428 may be performed by the mobile station on the combined results.

Detailed Description of Banning of Access Points

Figure 15:
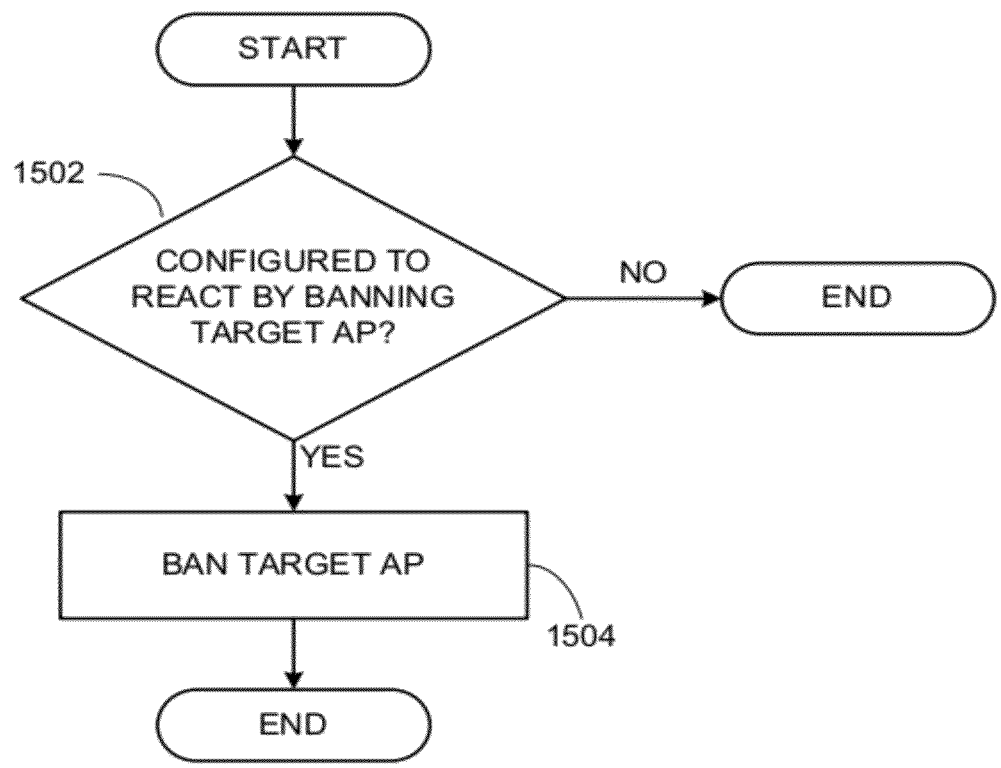
FIG. 15 is a flowchart illustrating an example method to be performed by a mobile station for banning a target access point.

FIG. 15 is a flowchart illustrating an example of a method performed by a mobile station, for example, any one of mobile stations 106, 116 and 136, for banning a target access point. The example method may be the action taken by the mobile station at 238 in the example method illustrated in FIG. 2 in reaction to failure to connect with a target AP or in reaction to receipt of a decryption error message from the target AP.

The example method is applicable in the situation where the mobile station has been configured to react to receipt of a decryption error message from a target AP or to failure—due to any cause, or only due to invalid credentials, or only due to a cause other than invalid credentials—of an attempt to connect with a target AP by banning the target AP, as checked by the mobile station at 1502.

At 1504, the mobile station bans the target AP.

Banning an access point may be implemented in the mobile station in any suitable manner. For example, a unique identifier of the access point, such as its MAC address, may be added to a ban list when the access point is banned, and may be removed from the ban list when the access point is un-banned.

Figures 1, 16:
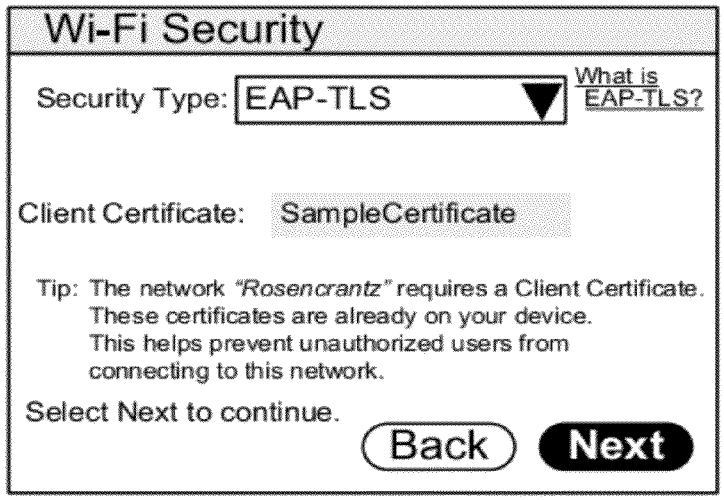
Figures 2, 16:
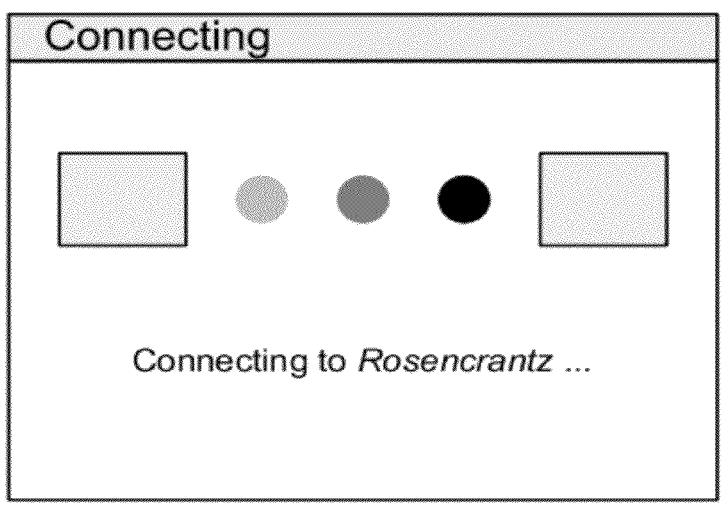
Figures 3, 16:
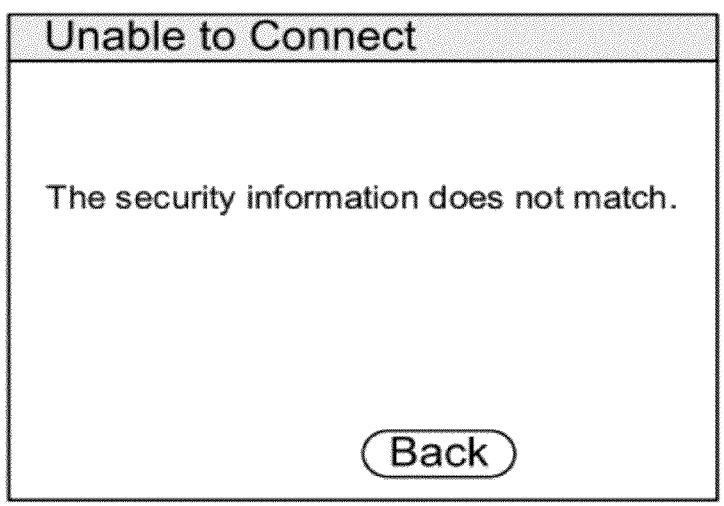

FIGS. 16-1, 16-2 and 16-3 are illustrations of example screenshots displayed at a mobile station, for example, any one of mobile stations 106, 116 and 136. FIG. 16-1 illustrates a screenshot for selection of a security type to be saved in a particular connection protocol. FIG. 16-2 illustrates a screenshot displayed when the mobile station is attempting to connect to a wireless local area network with the network name Rosencrantz. FIG. 16-3 illustrates a screenshot displayed when the authentication has failed because credentials supplied by the mobile station to the target access point for the authentication process do not match expected credentials.

Figures 1, 17:
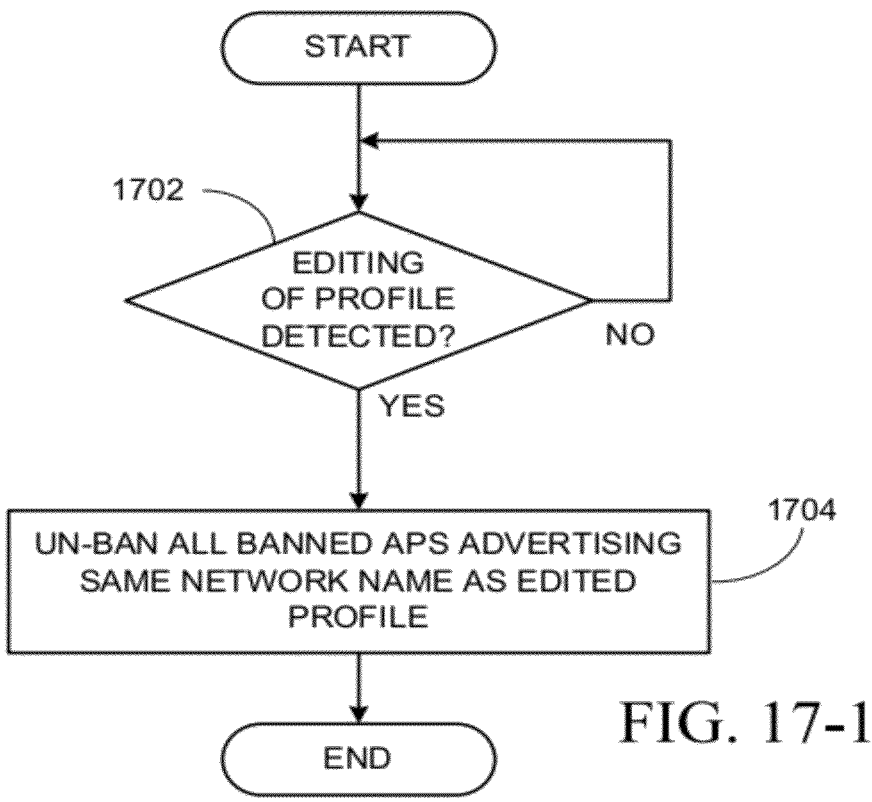
Figures 2, 17:
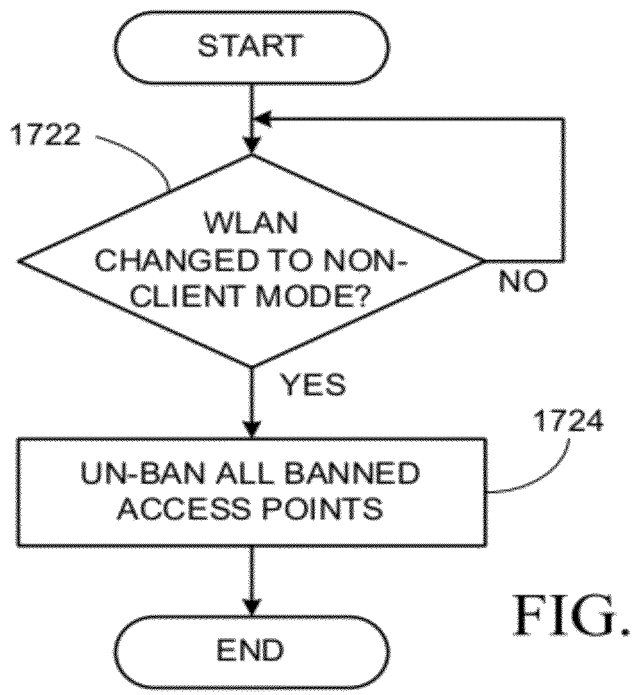

FIG. 17-1 is a flowchart illustrating an example method to be performed by a mobile station, for example, any one of mobile stations 106, 116 and 136, for un-banning an access point. Upon detecting at 1702 that a connection profile has been edited, the mobile station proceeds at 1704 to un-ban all banned APs advertising the same network name as that of the edited connection profile. For example, if banning APs is implemented in the mobile station using a ban list as described above, each time a unique identifier of an AP is added to the ban list, a copy of the record of extracted details, including the network name, is associated in the ban list with the unique identifier. The identification of banned APs having a particular network name is therefore straightforward.

FIG. 17-2 is a flowchart illustrating another example method to be performed by a mobile station, for example, any one of mobile stations 106, 116 and 136, for un-banning access points. Upon detecting at 1722 that the WLAN mode of the mobile station has been switched to mobile hotspot (MHS) mode or some other non-client mode that is supported by the WLAN functionality of the mobile station, the mobile station proceeds at 1724 to un-ban all banned APs.

Figure 18:
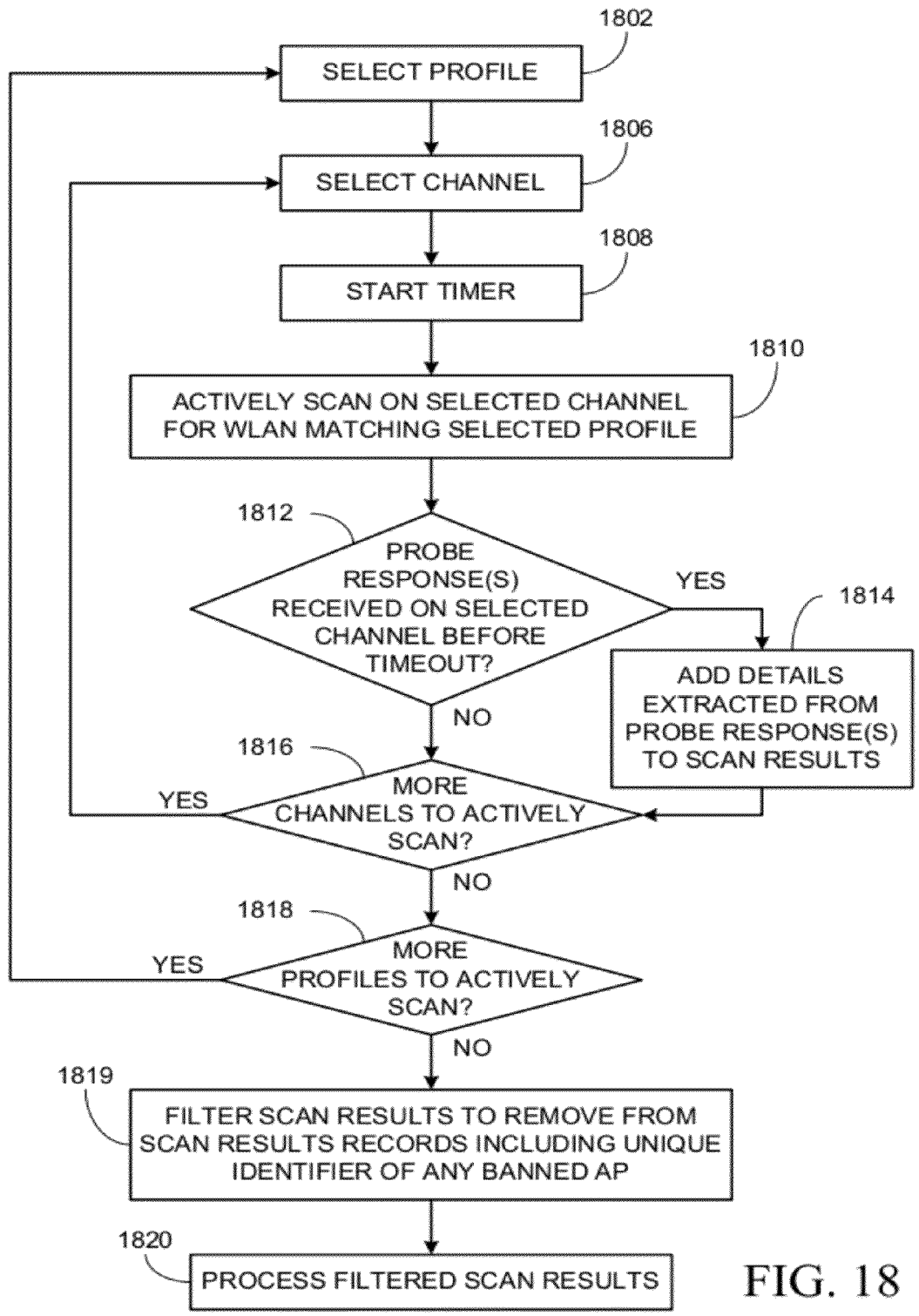
FIG. 18 is a flowchart illustrating an example of a method for active scanning that takes into account whether an access point is banned, the method to be performed by a mobile station.

As mentioned above, banning an access point affects how subsequent scans and connection attempts are handled. FIG. 18 is a flowchart illustrating an example of a method for active scanning that takes into account whether an access point is banned, the method to be performed by a mobile station, for example, any one of mobile stations 106, 116 and 136. Variations on how active scanning is conducted by the mobile station are also contemplated, and the method illustrated in FIG. 18 is merely one example.

At 1802, the mobile station selects a connection profile, for example, from among the connection profiles stored in its memory. The mobile station proceeds to select at 1806 a channel upon which to do the active scanning. The mobile station starts a timer at 1808, and the mobile station then actively scans at 1810 on the selected channel for a wireless local area network having the same network name as that of the selected connection profile. This typically involves the mobile station transmitting a probe request specifying the network name of the selected connection profile on the selected channel. The mobile station then waits to see if any probe responses are received on the selected channel before the timer started at 1808 has a timeout. Only APs configured with the network name specified in the probe request and configured to operate on the selected channel will respond to the probe request with a probe response.

If the mobile station has received one or more probe responses on the selected channel before the timeout, as checked at 1812, the mobile station adds at 1814 to the scan results one or more records containing details extracted from the received one or more probe responses, and then proceeds to check at 1816 whether there are any other channels to actively scan. If so, the method proceeds to 1806 where the mobile station selects another channel. If there are not any other channels to actively scan, the method proceeds to 1818 where the mobile station checks whether any other connection profiles are to be actively scanned.

If there is at least one more connection profile to be actively scanned, the method continues to 1802 where the mobile station selects another connection profile. If there are no other connection profiles to be actively scanned, then the mobile station filters the scan results of the active scanning at 1819 to remove from the scan results any records including the unique identifier of any banned AP. For example, if the mobile station maintains a list of MAC addresses of banned APs, the mobile station can compare at 1819 the MAC addresses in the records to the MAC addresses in the list. In a modified method for active scanning, the filtering to remove records including the unique identifier of any banned AP may occur at 1814, for the selected channel, instead of at 1819.

After filtering the scan results, the mobile station processes at 1820 the filtered scan results of the active scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

If no probe responses have been received by the mobile station before the timeout, as checked at 1812, the mobile station then proceeds directly to check at 1816 whether there are any other channels to actively scan.

Figure 19:
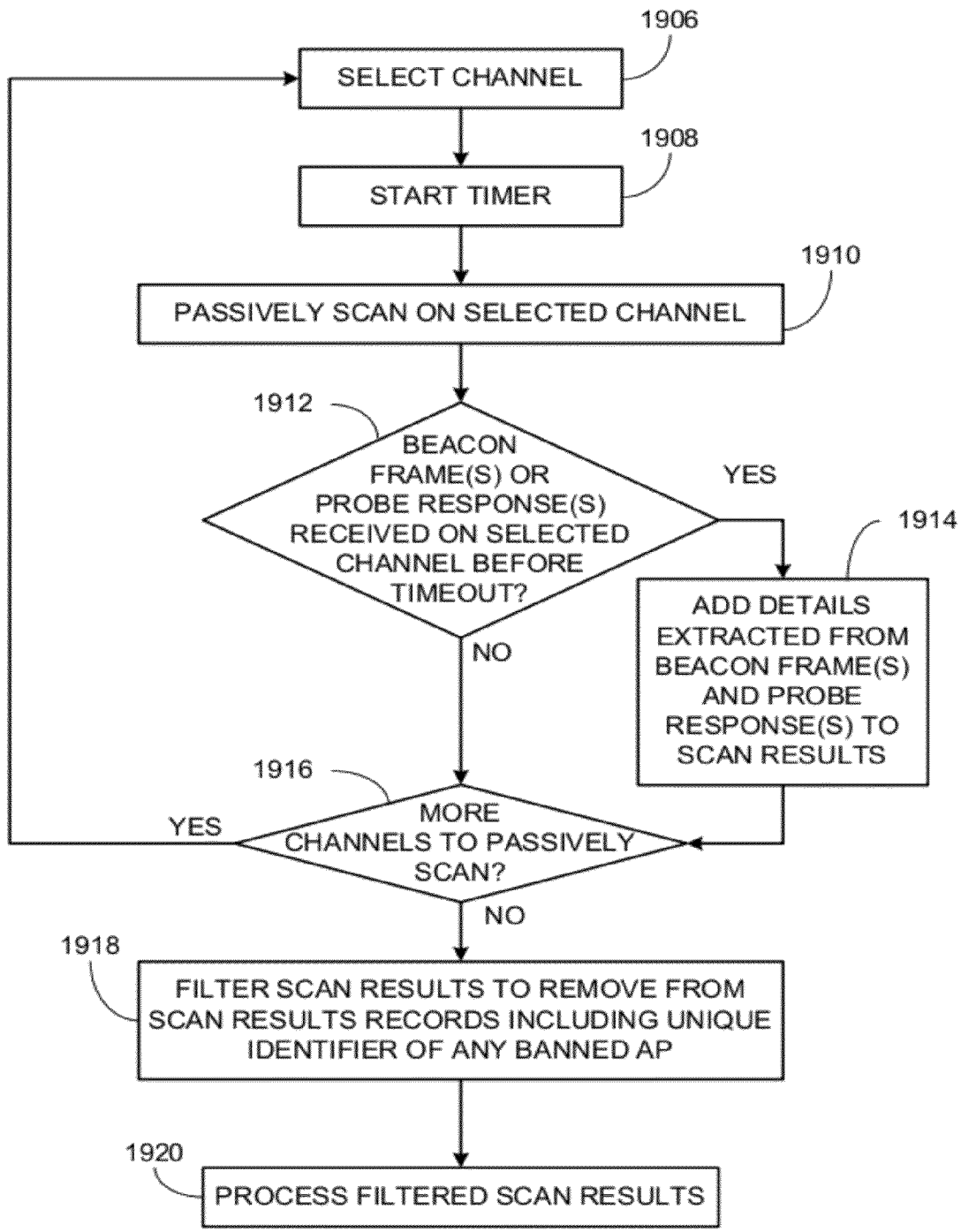
FIG. 19 is a flowchart illustrating an example of a method for passive scanning that takes into account whether an access point is banned, the method to be performed by a mobile station.

FIG. 19 is a flowchart illustrating an example of a method for passive scanning that takes into account whether an access point is banned, the method to be performed by a mobile station, for example, any one of mobile stations 106, 116 and 136. Variations on how passive scanning is conducted by the mobile station are also contemplated, and the method illustrated in FIG. 19 is merely one example.

At 1906, the mobile station selects a channel upon which to do the passive scanning. The mobile station starts a timer at 1908, and the mobile station then passively scans at 1910 on the selected channel. This typically involves the mobile station listening for beacon frames transmitted by APs on the selected channel. The mobile station then waits to see if any beacon frames are received on the selected channel before the timer started at 1908 has a timeout. Only APs configured to operate on the selected channel will transmit beacon frames on the selected channel. APs configured to hide the network name will transmit beacon frames in which no network name is advertised. The mobile station may also receive one or more probe responses on the selected channel that are address to a different mobile station.

If the mobile station has received one or more beacon frames or probe responses or both on the selected channel before the timeout, as checked at 1912, the mobile station adds at 1914 to the scan results one or more records containing details extracted from the received one or more beacon frames or probe responses or both, and then proceeds to check at 1916 whether there are any other channels to passively scan. If so, the method proceeds to 1906 where the mobile station selects another channel.

If there are not any other channels to actively scan, the method proceeds to 1918 where the mobile station filters the scan results to remove from the scan results any records including the unique identifier of any banned AP. For example, if the mobile station maintains a list of MAC addresses of banned APs, the mobile station can compare at 1918 the MAC addresses in the records to the MAC addresses in the list. In a modified method for passive scanning, the filtering to remove records including the unique identifier of any banned AP may occur at 1914, for the selected channel, thus eliminating the need to filter the scan results after all channels to be passively scanned have been passively scanned.

After filtering the scan results, the mobile station processes at 1920 the filtered scan results of the passive scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

The filtered results of active scanning and the filtered results of passive scanning may be combined, and then processing as described above with respect to 1820 and 1920 may be performed by the mobile station on the combined results.

Detailed Description of Suppression of Access Points

Figure 20:
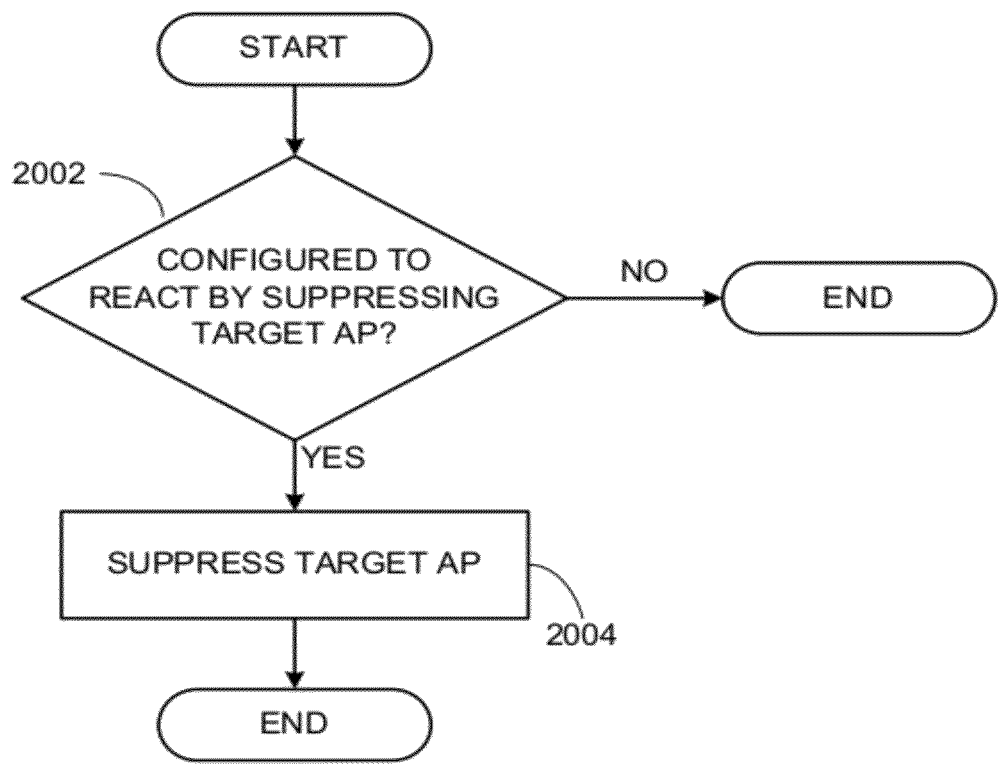
FIG. 20 is a flowchart illustrating an example method to be performed by a mobile station for suppressing a target access point.

FIG. 20 is a flowchart illustrating an example of a method performed by a mobile station, for example, any one of mobile stations 106, 116 and 136, for suppressing a target access point. The example method may be the action taken by the mobile station at 238 in the example method illustrated in FIG. 2 in reaction to failure to connect with a target AP or in reaction to receipt of a decryption error message from the target AP.

The example method is applicable in the situation where the mobile station has been configured to react to receipt of a decryption error message from a target AP or to failure—due to any cause, or only due to invalid credentials, or only due to a cause other than invalid credentials—of an attempt to connect with a target AP by suppressing the target AP, as checked by the mobile station at 2002.

At 2004, the mobile station suppresses the target AP.

Suppressing an access point may be implemented in the mobile station in any suitable manner. For example, a unique identifier of the access point, such as its MAC address, may be added to a suppression list when the access point is suppressed, and may be removed from the suppression list when the access point is un-suppressed.

Figure 21:
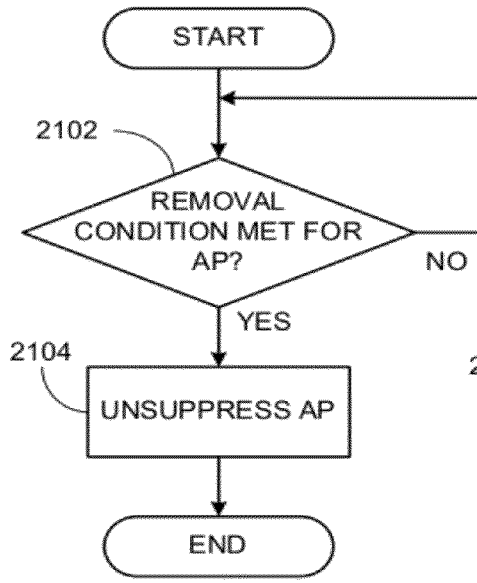
FIG. 21 is a flowchart illustrating an example method to be performed by a mobile station for un-suppressing an access point.
Figures 2, 21:
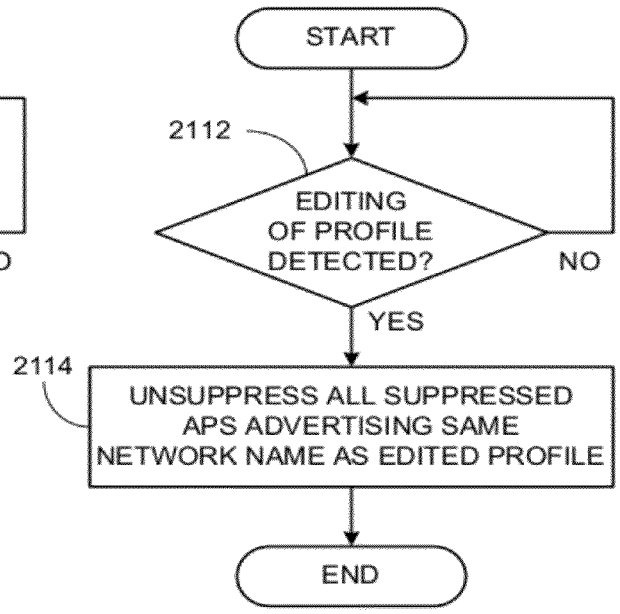
Figures 1, 21:
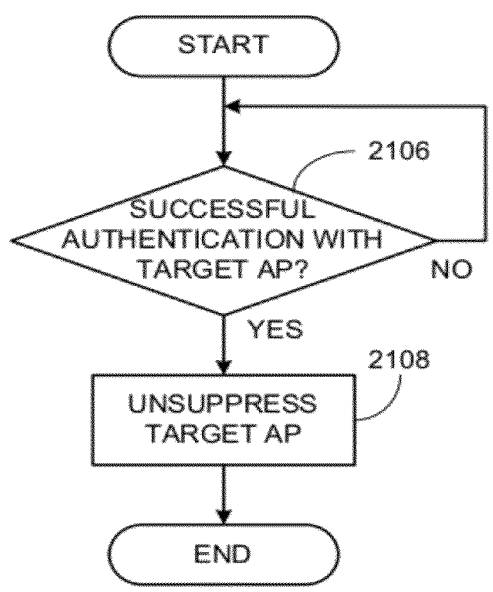
Figures 3, 21:
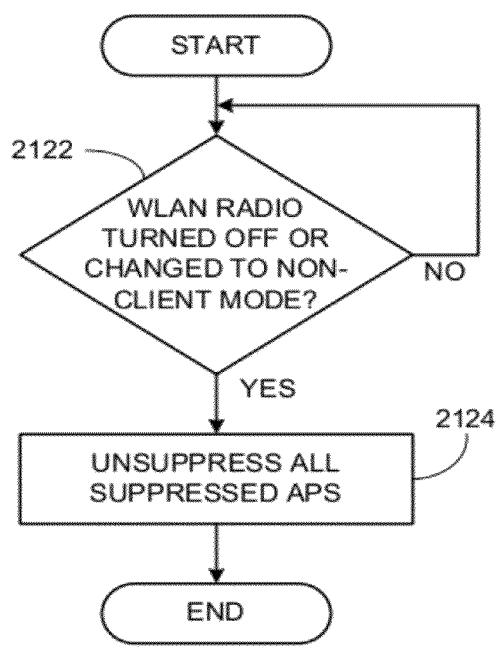

FIG. 21 is a flowchart illustrating an example method to be performed by a mobile station, for example, any one of mobile stations 106, 116 and 136, for un-suppressing an access point. Upon detecting at 2102 that an un-suppress condition has been met for a suppressed AP, the mobile station proceeds at 2104 to un-suppress the suppressed AP. FIGS. 21-1, 21-2 and 21-3 are flowcharts illustrating specific example methods to be performed by a mobile station, for example, mobile station 102, for un-suppressing one or more access points. In FIG. 21-1, upon detecting at 2106 that an authentication process with a suppressed target AP has succeeded, the mobile station proceeds at 2108 to un-suppress the target AP. In FIG. 21-2, upon detecting at 2112 that a connection profile has been edited, the mobile station proceeds at 2114 to un-suppress all suppressed APs advertising the same network name as that of the edited connection profile. For example, if suppressing APs is implemented in the mobile station using a suppression list as described above, each time a unique identifier of an AP is added to the suppression list, a copy of the record of the extracted details, including the network name, is associated in the suppression list with the unique identifier. The identification of suppressed APs having a particular network name is therefore straightforward. In FIG. 21-3, upon detecting at 2122 that a WLAN radio of the mobile station has been turned off or upon detected at 2122 that the WLAN mode of the mobile station has been switched to mobile hotspot (MHS) mode or some other non-client mode that is supported by the WLAN functionality of the mobile station, the mobile station proceeds at 2124 to un-suppress all suppressed APs.

Figure 22:
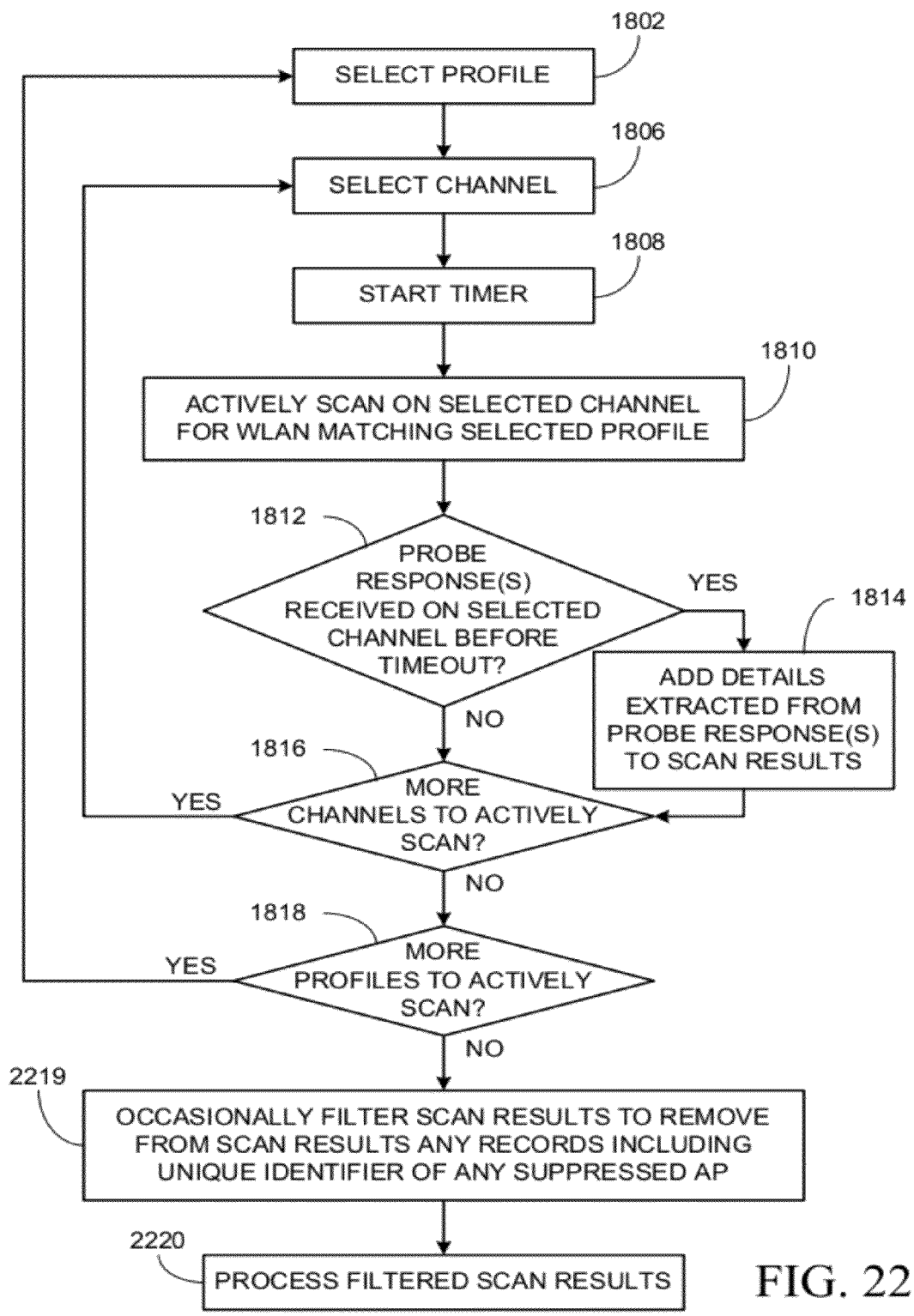
FIG. 22 is a flowchart illustrating an example of a method for active scanning that takes into account whether an access point is suppressed, the method to be performed by a mobile station.

FIG. 22 is a flowchart illustrating an example of a method for active scanning that takes into account whether an access point is suppressed, the method to be performed by a mobile station, for example, any one of mobile stations 106, 116 and 136. Variations on how active scanning is conducted by the mobile station are also contemplated, and the method illustrated in FIG. 22 is merely one example.

The method illustrated in FIG. 22 is similar to the method illustrated in FIG. 18, as indicated by the repeated use of reference numerals used in FIG. 18. The description of FIG. 18 with respect to those reference numerals is applicable also to the method illustrated in FIG. 22, except as noted below.

If there are no other connection profiles to be actively scanned, as checked at 1818, then the mobile station occasionally filters the scan results of the active scanning at 2219 to remove from the scan results any records including the unique identifier of any suppressed AP. For example, if the mobile station maintains a list of MAC addresses of suppressed APs, the mobile station can compare at 2219 the MAC addresses in the records to the MAC addresses in the list.

After filtering the scan results, the mobile station processes at 2220 the filtered scan results of the active scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

Figure 23:
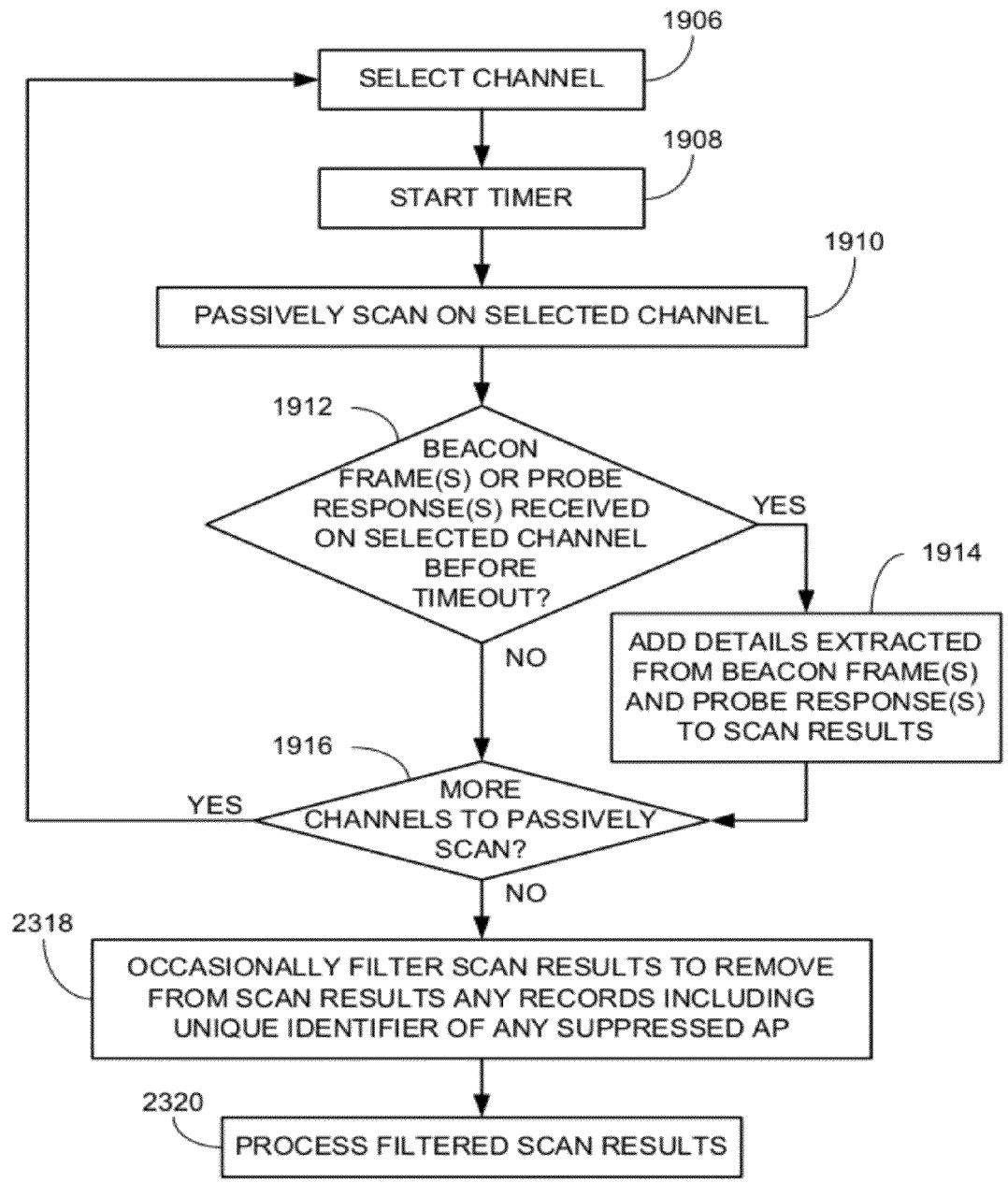
FIG. 23 is a flowchart illustrating an example of a method for passive scanning that takes into account whether an access point is suppressed, the method to be performed by a mobile station.

FIG. 23 is a flowchart illustrating an example of a method for passive scanning that takes into account whether an access point is suppressed, the method to be performed by a mobile station, for example, any one of mobile stations 106, 116 and 136. Variations on how passive scanning is conducted by the mobile station are also contemplated, and the method illustrated in FIG. 23 is merely one example.

The method illustrated in FIG. 23 is similar to the method illustrated in FIG. 19, as indicated by the repeated use of reference numerals used in FIG. 19. The description of FIG. 19 with respect to those reference numerals is applicable also to the method illustrated in FIG. 23, except as noted below.

If there are no other channels to be passively scanned, as checked at 1918, then the mobile station occasionally filters the scan results of the passive scanning at 2318 to remove from the scan results any records including the unique identifier of any suppressed AP. For example, if the mobile station maintains a list of MAC addresses of suppressed APs, the mobile station can compare at 2318 the MAC addresses in the records to the MAC addresses in the list.

After filtering the scan results, the mobile station processes at 2320 the filtered scan results of the passive scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

The filtered results of active scanning and the filtered results of passive scanning may be combined, and then processing as described above with respect to 2220 and 2320 may be performed by the mobile station on the combined results.

The issue of how often the mobile station filters the scan results to remove results including the unique identifier of any suppressed AP is a tradeoff between power consumption (filter more often) and responsiveness (filter less often). For example, the filtering may be done every other time the method illustrated in FIG. 22 or FIG. 23 is performed, or every third time. In another example, a timer may be used to determine how often to filter the scan results. For example, the scan results may be filtered every five minutes.

Detailed Description of Suppressing then Banning Access Points

Figure 24:
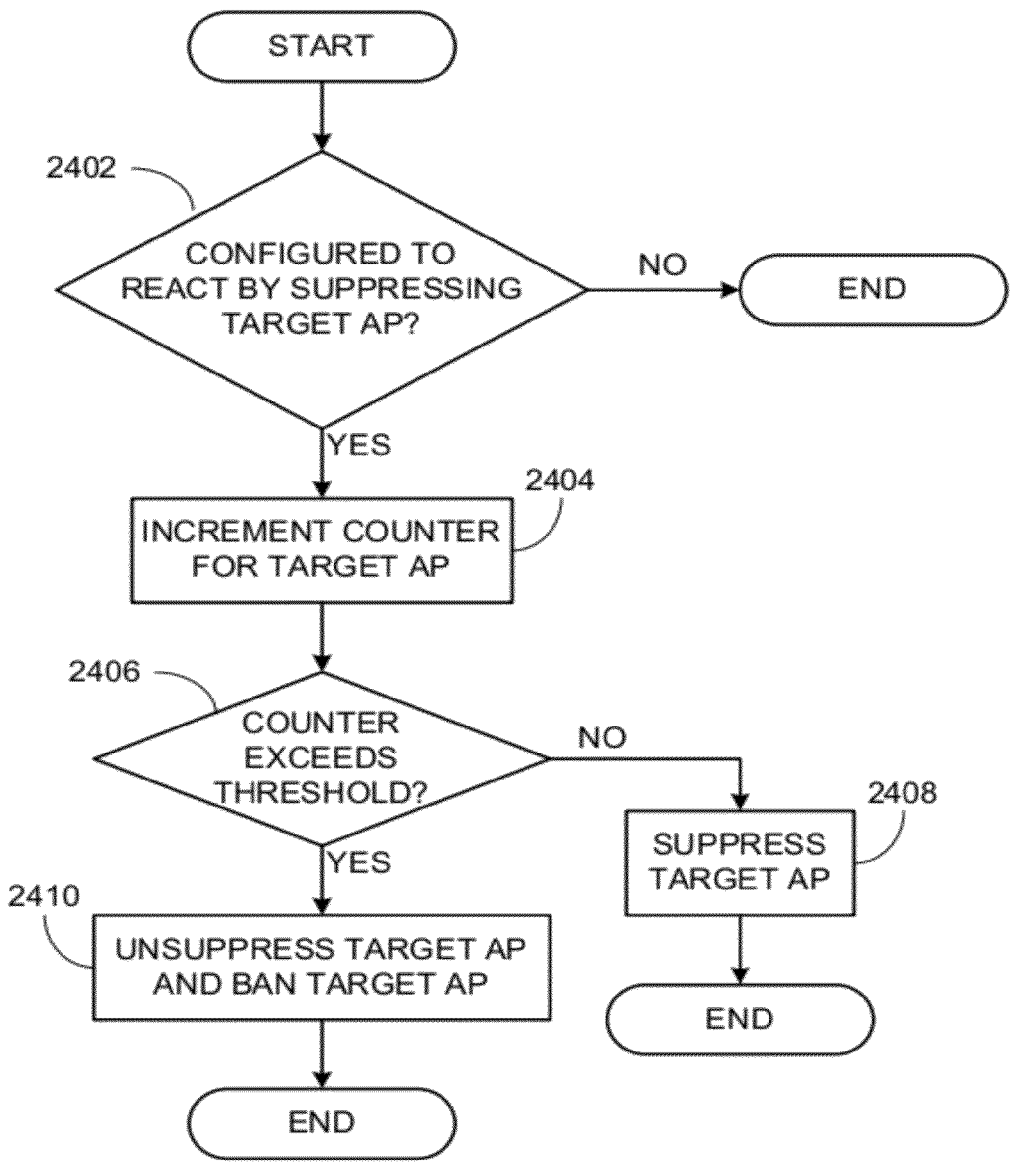
FIG. 24 is a flowchart illustrating an example method to be performed by a mobile station for suppressing or banning a target access point according to a number of times the authentication process has failed for the target access point.

FIG. 24 is a flowchart illustrating an example method to be performed by a mobile station, for example, any one of mobile stations 106, 116 and 136, for suppressing or banning a target access point according to a number of times the authentication process has failed for the target access point. The example method may be the action taken by the mobile station at 238 in the example method illustrated in FIG. 2 in reaction to failure to connect with a target AP or in reaction to receipt of a decryption error message from the target AP.

The example method is applicable in the situation where the mobile station has been configured to react to receipt of a decryption error message from a target AP or to failure—due to any cause, or only due to invalid credentials, or only due to a cause other than invalid credentials—of an attempt to connect with a target AP by suppressing the target AP, as checked by the mobile station at 2402. Despite this configuration, according to this example method, the mobile station will ban rather than suppress the target AP if the attempts to connect have failed too many times for the target AP.

A counter for a target AP is started upon the first instance of initiating an attempt to connect with the target AP. The counter is re-started when an attempt to connect with the target AP has succeeded.

At 2404, the mobile station increments the counter for the target AP, regardless of the cause for the failure of the attempt to connect with the target AP.

If the counter does not exceed a threshold, as checked at 2406 by the mobile station, the mobile station suppresses the target AP at 2408. If the counter exceeds the threshold, the mobile station un-suppresses the target AP and bans the target AP at 2410.

As explained above, a problem with an authentication server may lead to an authentication timeout. If a subsequent attempt by the mobile station to authenticate with the target AP involves the redirection of the authentication request to a different authentication server, the subsequent attempt may succeed. Therefore, in a modified version of the method illustrated in FIG. 24, the mobile station increments the counter for the target AP only if the cause for failure of the attempt to connect to the target AP is invalid credentials, and does not ban or suppress the target AP if the cause for failure is other than invalid credentials.

Figure 25:
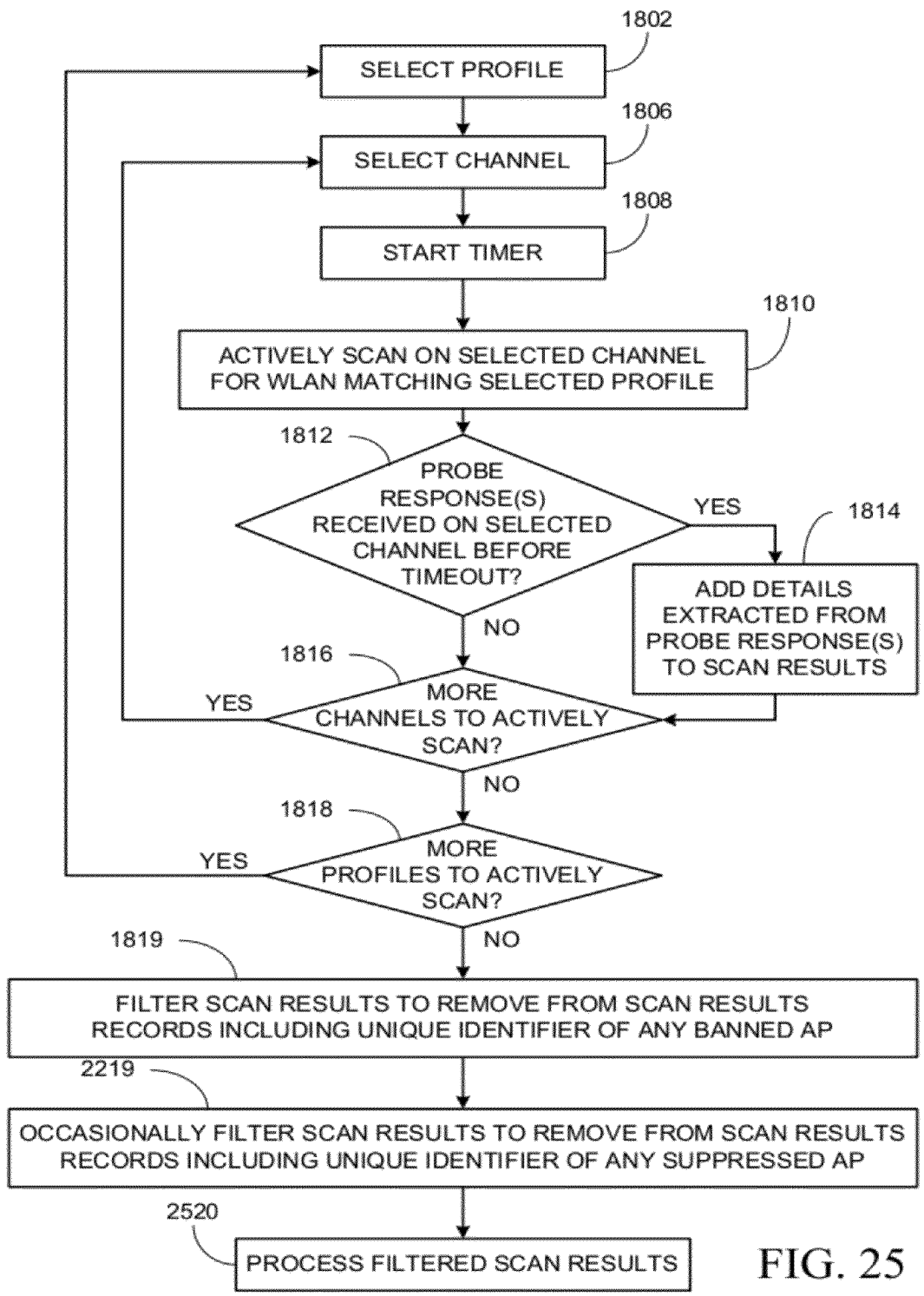
FIG. 25 is a flowchart illustrating an example of a method for active scanning that takes into account whether an access point is suppressed or banned, the method to be performed by a mobile station.

FIG. 25 is a flowchart illustrating an example of a method for active scanning that takes into account whether an access point is suppressed or banned, the method to be performed by a mobile station, for example, any one of mobile stations 106, 116 and 136. Variations on how active scanning is conducted by the mobile station are also contemplated, and the method illustrated in FIG. 25 is merely one example.

The method illustrated in FIG. 25 is similar to the methods illustrated in FIG. 18 and FIG. 22, as indicated by the repeated use of reference numerals used in FIG. 18 and FIG. 22. The description of FIG. 18 and FIG. 22 with respect to those reference numerals is applicable also to the method illustrated in FIG. 25, except as noted below.

If there are no other connection profiles to be actively scanned, as checked at 1818, then the mobile station filters the scan results of the active scanning at 1819 to remove from the scan results any records including the unique identifier of any banned AP, and the mobile station occasionally filters the scan results of the active scanning at 2219 to remove from the scan results any records including the unique identifier of any suppressed AP.

After filtering the scan results, the mobile station processes at 2520 the filtered scan results of the active scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

Figure 26:
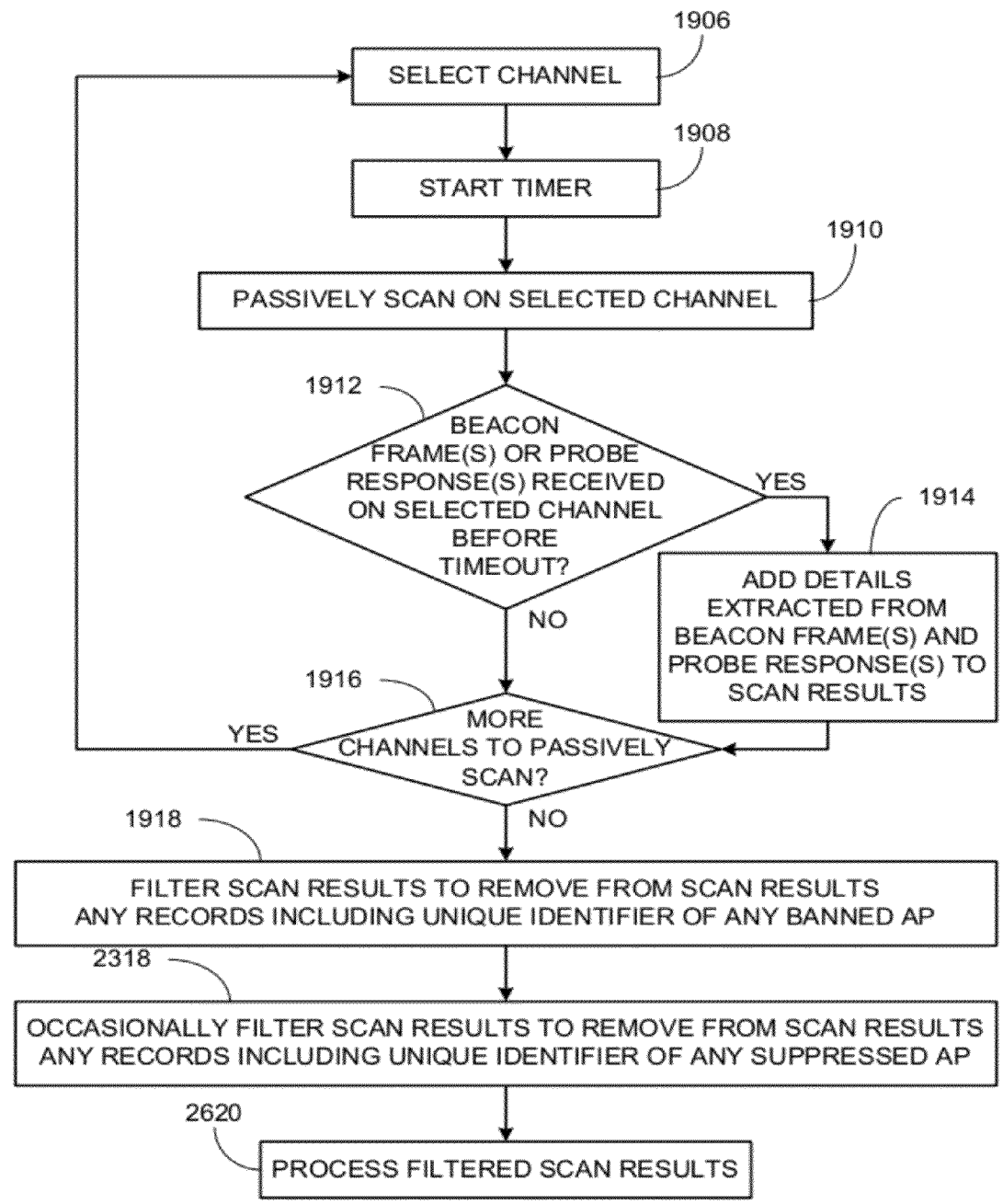
FIG. 26 is a flowchart illustrating an example of a method for passive scanning that takes into account whether an access point is suppressed or banned, the method to be performed by a mobile station.

FIG. 26 is a flowchart illustrating an example of a method for passive scanning that takes into account whether an access point is suppressed or banned, the method to be performed by a mobile station, for example, any one of mobile stations 106, 116 and 136. Variations on how passive scanning is conducted by the mobile station are also contemplated, and the method illustrated in FIG. 26 is merely one example.

The method illustrated in FIG. 26 is similar to the methods illustrated in FIG. 19 and FIG. 23, as indicated by the repeated use of reference numerals used in FIG. 19 and FIG. 23. The description of FIG. 19 and FIG. 23 with respect to those reference numerals is applicable also to the method illustrated in FIG. 26, except as noted below.

If there are no other channels to be passively scanned, as checked at 1918, then the mobile station filters the scan results of the passive scanning at 1918 to remove from the scan results any records including the unique identifier of any banned AP, and the mobile station occasionally filters the scan results of the passive scanning at 2318 to remove from the scan results any records including the unique identifier of any suppressed AP.

After filtering the scan results, the mobile station processes at 2620 the filtered scan results of the passive scanning. For example, processing the filtered scan results may include automatically selecting a target AP from the filtered scan results without user intervention. In another example, processing the filtered scan results may include displaying, via a display of the mobile station, a list of available networks gleaned from the filtered scan results, so that a user of the mobile station can select a target AP from the displayed list.

The filtered results of active scanning and the filtered results of passive scanning may be combined, and then processing as described above with respect to 2520 and 2620 may be performed by the mobile station on the combined results.

Modifications of the methods described previously in this document will occur to persons of ordinary skill in the art. For example, some of the methods described previously in this document automatically ban a connection profile or ban an access point or suppress an access point if authentication has failed. In an alternative implementation, the action to be taken upon failure of the authentication process could be chosen by a user of the mobile station, after being presented with two or more options (including, for example, the option of taking no action).

Detailed Description of Mobile Station

Figure 27:
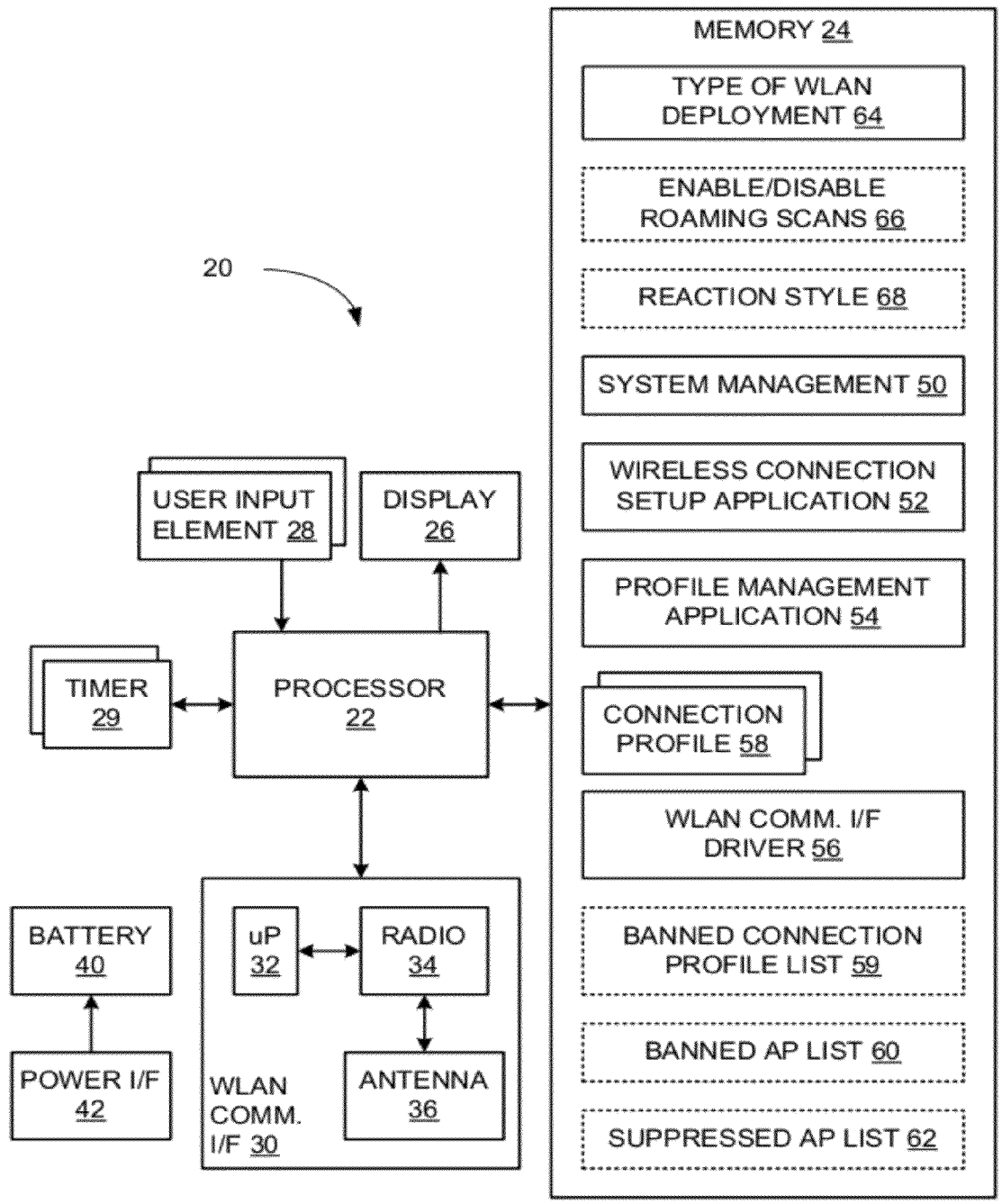
FIG. 27 is a functional block diagram illustration of an example mobile station.

FIG. 27 is a functional block diagram illustration of an example mobile station, which can be considered an example of any one of mobile stations 106, 116 and 136. The example mobile station, generally referenced 20, comprises a processor 22, a memory 24, a display 26, one or more user input elements 28, one or more timers 29, and a WLAN communication interface 30. A non-exhaustive list of examples for user input elements 28 includes a keypad, a keyboard, a trackball, and a thumbwheel. Some mobile stations use a touchscreen, which functions both as display 26 and as one of the user input elements 28. WLAN communication interface 30 comprises a baseband processor 32 coupled to a radio 34, which in turn is coupled to an antenna 36.

A battery 40 supplies power to the components of mobile station 20. Battery 40 is typically removable from mobile station 20. Mobile station 20 also comprises a power interface 42, for example, a universal serial bus (USB) interface connection or an AC/DC adapter, which enables battery 40 to be recharged from an external power source.

Mobile station 20 may comprise additional components, circuitry and functionality which, for clarity, have not been illustrated in FIG. 27.

Memory 24 is coupled to processor 22 and comprises volatile memory and non-volatile memory. Portions of memory 24 may be internal to processor 22. Memory 24 stores applications executable by processor 22, including, for example, a system management application 50, a wireless connection setup application 52, a connection profile management application 54, and a WLAN communication interface driver 56. Memory 24 also stores data files used by the applications, including, for example, one or more connection profiles 58.

If mobile station 20 implements the banning of connection profiles as described in this document through the use of a list of banned connection profiles, then memory 24 may optionally store a list 59 of banned connection profiles. A banned connection profile may be identified in list 59 by its network name.

If mobile station 20 implements the banning of access points as described in this document through the use of a list of banned access points, then memory 24 may optionally store a list 60 of banned APs. A banned AP may be identified in list 60 by its unique identifier, for example, by its MAC address.

If mobile station 20 implements the suppression of access points as described in this document through the use of a list of suppressed access points, then memory 24 may optionally store a list 62 of suppressed APs. A suppressed AP may be identified in list 62 by its unique identifier, for example, by its MAC address.

Memory 24 may store an indication 64 of the type of WLAN deployment determined by mobile station 20 for a particular target AP. Indication 64 may be stored by mobile station 20 in response to mobile station 20 having determined the type of WLAN deployment to which a target AP belongs, for example, as at 302 of FIG. 3 or, for example, as in any one or any combination of the methods illustrated in FIGS. 4-1, 4-2, 4-3, 4-4, 4-5, 4-6 and 4-7.

If mobile station 20 implements enablement/disablement of roaming scans as described in this document, memory 24 may optionally store an indication 66 of whether roaming scans are enabled or disabled. For example, when set to a first value, indication 66 may indicate that roaming scans are enabled, and when set to a second value different from the first value, indication 66 may indicate that roaming scans are disabled.

If mobile station 20 configures itself according to the determined type of WLAN deployment to react in a particular way to authentication failures, memory 24 may optionally store an indication 68 of how mobile station 20 is to react. Indication 68 may be set, for example, by mobile station 20 in accordance with any one of the methods illustrated in FIGS. 6-1, 6-2, 7-1, 7-2, 8-1 and 8-2.

Methods described in this document may be implemented by way of computer instructions to be executed by processor 22 or processor 32. For example, scanning is implemented by processor 32 under the control of WLAN communication interface driver 56. Profile management application 54 may be used to enable the editing of connection profiles 58. Wireless connection setup application 52 may be used to enable the creation of connection profiles 52 and to guide a user of mobile station through the process of scanning and connecting to a WLAN, including, for example, generating a list of available WLANs to be displayed via display 26.

The banning and un-banning of connection profiles may be implemented as computer instructions in WLAN communication interface driver 56, and the generation of a visual indication of a banned connection profile may be implemented as computer instructions in profile management application 54. If, as described in this document, connection profiles 58 include a field which is set to a first value if the connection profile is not banned and set to a second value if the connection profile is banned, then the setting of that field may be implemented as computer instructions in profile management application 54.

The banning and un-banning of access points may be implemented as computer instructions in WLAN communication interface driver 56, and the generation of a notification regarding invalid credentials may be implemented as computer instructions in wireless connection setup application 52.

The suppressing and un-suppressing of access points may be implemented as computer instructions in WLAN communication interface driver 56, and the generation of a notification regarding invalid credentials may be implemented as computer instructions in wireless connection setup application 52.

General Remarks Relating to Flowchart Illustrations and Block Diagrams

Some of these techniques are described in this document with reference to flowchart illustrations and/or block diagrams of methods, apparatus (systems) and computer program products. It will be understood that each block of the flowchart illustration and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions or actions specified in the flowchart illustration and/or block diagram block or blocks.

These computer program instructions may also be stored in a physical computer-readable medium that can direct a computer or other programmable data processing apparatus to function in a particular manner, such that the instructions stored in the computer-readable medium produce an article of manufacture including instruction means which implement the functions or actions specified in the flowchart illustration and/or block diagram block or blocks. Computer programs implementing the techniques described in this document can be distributed to users on a distribution medium such as a floppy disk, CD-ROM, or DVD, or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computing to act in accordance with the methods described in this document. All these operations are well-known to those skilled in the art of computer systems.

Each block of the flowchart illustrations and/or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending on the functionality involved. Each block of the flowchart illustration and/or block diagrams, and combinations of blocks in the flowchart illustrations and/or block diagrams, can be implemented by special purpose hardware-based systems that perform the specified functions or actions, or by combinations of special purpose hardware and computer instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a mobile station, the method comprising:
determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;
responsive to determining that the access point belongs to a corporate/enterprise-type WLAN deployment, configuring the mobile station in a first configuration;
responsive to determining that the access point belongs to a SOHO-type WLAN deployment, configuring the mobile station in a second configuration that differs from the first configuration; and
as part of a dynamic Internet Protocol (IP) address acquisition process, receiving from a dynamic host configuration protocol (DHCP) server an offer message including an offered IP address,
wherein determining whether the access point belongs to a corporate/enterprise-type WLAN deployment or to a SOHO-type WLAN deployment comprises:
determining that the access point belongs to a SOHO-type WLAN deployment where a source media access control (MAC) address in the offer message is identical to a MAC address of the access point, which is discernible from the results of the discovery scan; and
determining that the access point belongs to a corporate/enterprise-type WLAN deployment where the source MAC address in the offer message is not identical to the MAC address of the access point.

2. The method as claimed in claim 1, wherein determining whether the access point belongs to a corporate/enterprise-type WLAN deployment or to a SOHO-type WLAN deployment comprises:
determining that the access point belongs to a SOHO-type WLAN deployment where a security type of the access point, discernible from the results of the discovery scan, indicates no security.

3. The method as claimed in claim 1, wherein determining whether the access point belongs to a corporate/enterprise-type WLAN deployment or to a SOHO-type WLAN deployment comprises:
determining that the access point belongs to a corporate/enterprise-type WLAN deployment where a management frame from the access points in the result of the discovery scan indicates that the access point is enabled for Cisco Compatible Extensions (CCX).

4. The method as claimed in claim 1, wherein determining whether the access point belongs to a corporate/enterprise-type WLAN deployment or to a SOHO-type WLAN deployment comprises:
determining that the access point belongs to a corporate/enterprise-type WLAN deployment where a beacon frame or probe response or association response or reassociation response from the access point in the results of the discovery scan indicates that the access point supports Neighbor Reports.

5. The method as claimed in claim 1, wherein determining whether the access point belongs to a corporate/enterprise-type WLAN deployment or to a SOHO-type WLAN deployment comprises:
determining that the access point belongs to a corporate/enterprise-type WLAN deployment where a beacon frame or probe response from the access point in the results of the discovery scan indicates that the access point supports Wi-Fi Protected Access pre-authentication.

6. The method as claimed in claim 1, wherein determining whether the access point belongs to a corporate/enterprise-type WLAN deployment or to a SOHO-type WLAN deployment comprises:
determining that the access point belongs to a SOHO-type WLAN deployment where a connection profile stored in the mobile station that matches the access point includes an indication that the profile is for SOHO-type WLAN deployment; and
determining that the access point belongs to a corporate/enterprise-type WLAN deployment where the connection profile includes an indication that the profile is for corporate/enterprise-type WLAN deployment.

7. The method as claimed in claim 1, further comprising:
as part of a dynamic Internet Protocol (IP) address acquisition process, receiving from a dynamic host configuration protocol (DHCP) server an offer message including an offered IP address,
wherein determining whether the access point belongs to a corporate/enterprise-type WLAN deployment or to a SOHO-type WLAN deployment comprises:
determining that the access point belongs to a SOHO-type WLAN deployment where the offered IP address is of the form 192.168.X.X; and
determining that the access point belongs to a corporate/enterprise-type WLAN deployment where the offered IP address is not of the form 192.168.X.X.

8. The method as claimed in claim 1, wherein configuring the mobile station in the first configuration comprises:
enabling roaming scans.

9. The method as claimed in claim 1, wherein configuring the mobile station in the second configuration comprises:
disabling roaming scans.

10. The method as claimed in claim 1, wherein configuring the mobile station in the first configuration comprises:
configuring the mobile station to react to receipt of a decryption error message from the access point or to failure of an attempt to connect to the access point by banning an editable connection profile stored in the mobile station that matches the access point, the editable connection profile including a network name.

11. The method as claimed in claim 1, wherein configuring the mobile station in the second configuration comprises:
configuring the mobile station to react to receipt of a decryption error message from the access point or to failure of an attempt to connect to the access point by banning the access point.

12. The method as claimed in claim 1, wherein configuring the mobile station in the first configuration comprises enabling roaming scans.

13. The method as claimed in claim 1, wherein configuring the mobile station in the second configuration comprises disabling roaming scans.

14. A method in a mobile station, the method comprising:
determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;

responsive to determining that the access point belongs to a corporate/enterprise-type WLAN deployment, configuring the mobile station in a first configuration; and responsive to determining that the access point belongs to a SOHO-type WLAN deployment, configuring the mobile station in a second configuration that differs from the first configuration, wherein more than one access point is identifiable from the results of the discovery scan, and wherein determining whether the access point belongs to a corporate/enterprise-type WLAN deployment or to a SOHO-type WLAN deployment comprises:

determining that the access point belongs to a SOHO-type WLAN deployment where none of the other access points identified from the results of the discovery scan have exactly the same characteristics—other than media access control (MAC) address—as the access point; and determining that the access point belongs to a corporate/enterprise-type WLAN deployment where at least one of the other access points identified from the results of the discovery scan has exactly the same characteristics—other than MAC address—as the access point.

15. The method as claimed in claim 14, wherein configuring the mobile station in the first configuration comprises enabling roaming scans.

16. The method as claimed in claim 14, wherein configuring the mobile station in the second configuration comprises disabling roaming scans.

17. A method in a mobile station, the method comprising:

determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;

responsive to determining that the access point belongs to a corporate/enterprise-type WLAN deployment, configuring the mobile station in a first configuration, wherein configuring the mobile station in the first configuration comprises configuring the mobile station to react to receipt of a decryption error message from the access point or to failure of an attempt to connect to the access point by banning an editable connection profile stored in the mobile station that matches the access point, the editable connection profile including a network name; and responsive to determining that the access point belongs to a SOHO-type WLAN deployment, configuring the mobile station in a second configuration that differs from the first configuration;

attempting to connect to the access point, including transmitting in a manner receivable by the access point parameters from the editable connection profile;

determining that the attempt has failed or receiving the decryption error message from the access point and consequently banning the editable connection profile;

if any active scanning for wireless local area networks—other than active scanning performed as part of any discovery scan—is performed by the mobile station while the editable connection profile is banned, excluding the editable connection profile from the active scanning; and if any passive scanning for wireless local area networks—other than passive scanning performed as part of any discovery scan—is performed by the mobile station while the editable connection profile is banned, removing from results of the passive scanning any records including the network name.

18. A method in a mobile station, the method comprising:

determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;

responsive to determining that the access point belongs to a corporate/enterprise-type WLAN deployment, configuring the mobile station in a first configuration; and responsive to determining that the access point belongs to a SOHO-type WLAN deployment, configuring the mobile station in a second configuration that differs from the first configuration, wherein configuring the mobile station in the first configuration comprises configuring the mobile station to react to receipt of a decryption error message from the access point or to failure of an attempt to connect to the access point by reducing a priority of a connection profile stored in the mobile station that matches the access point.

19. A method in a mobile station, the method comprising:

determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;

responsive to determining that the access point belongs to a corporate/enterprise-type WLAN deployment, configuring the mobile station in a first configuration;

responsive to determining that the access point belongs to a SOHO-type WLAN deployment, configuring the mobile station in a second configuration that differs from the first configuration, wherein configuring the mobile station in the second configuration comprises configuring the mobile station to react to receipt of a decryption error message from the access point or to failure of an attempt to connect to the access point by banning the access point;

attempting to connect to the access point;

determining that the attempt has failed or receiving the decryption error message from the access point and consequently banning the access point; and refraining from transmitting any communications addressed to a unique identifier of the access point while the access point is banned.

20. A method in a mobile station, the method comprising:

determining whether an access point belongs to a corporate/enterprise-type wireless local area network (WLAN) deployment or to a small office/home office (SOHO)-type WLAN deployment, the access point having been selected by the mobile station from results of a discovery scan for a connection attempt;

responsive to determining that the access point belongs to a corporate/enterprise-type WLAN deployment, configuring the mobile station in a first configuration; and responsive to determining that the access point belongs to a SOHO-type WLAN deployment, configuring the mobile station in a second configuration that differs from the first configuration, wherein configuring the mobile station in the second configuration comprises configuring the mobile station to react to receipt of a decryption error message from the access point or to failure of an attempt to connect to the access point by suppressing the access point.

21. The method as claimed in claim 20, further comprising:
attempting to connect to the access point;
determining that the attempt has failed or receiving the decryption error message from the access point and consequently suppressing the access point;
on some occasions that the access point is suppressed, refraining from transmitting any communications addressed to the unique identifier; and
on other occasions that the access point is suppressed, permitting transmission of communications addressed to the unique identifier.

22. A mobile station comprising:
a processor;
a memory coupled to the processor; and
a wireless local area network (WLAN) communication interface coupled to the processor,
the mobile station operative to determine whether an access point belongs to a corporate/enterprise-type wireless local area network (WLAN) deployment or to a small office/home office (SOHO)-type WLAN deployment, the access point having been selected by the mobile station from results of a discovery scan for a connection attempt,
the mobile station further operative to configure the mobile station in a first configuration responsive to the mobile station determining that the access point belongs to a corporate/enterprise-type WLAN deployment, and
the mobile station further operative to configure the mobile station in a second configuration that differs from the first configuration responsive to the mobile station determining that the access point belongs to a SOHO-type WLAN deployment,
the mobile station further operative, as part of a dynamic Internet Protocol (IP) address acquisition process, to receive from a dynamic host configuration protocol (DHCP) server an offer message including an offered IP address,
wherein the mobile station is operative to determine whether the access point belongs to a corporate/enterprise-type WLAN deployment or to a SOHO-type WLAN deployment by:
determining that the access point belongs to a SOHO-type WLAN deployment where a source media access control (MAC) address in the offer message is identical to a MAC address of the access point, discernible from the results of the discovery scan; and
determining that the access point belongs to a corporate/enterprise-type WLAN deployment where the source MAC address in the offer message is not identical to the MAC address of the access point.

* * * * *